(12) United States Patent
Page

(10) Patent No.: US 10,899,071 B2
(45) Date of Patent: Jan. 26, 2021

(54) SYSTEMS AND METHODS FOR IMPROVED 3D PRINTING

(71) Applicant: Autodesk, Inc., San Rafael, CA (US)

(72) Inventor: James Sherwood Page, Berkeley, CA (US)

(73) Assignee: Autodesk, Inc., San Rafael, CA (US)

( * ) Notice: Subject to any disclaimer, the term of this patent is extended or adjusted under 35 U.S.C. 154(b) by 218 days.

(21) Appl. No.: 16/017,765

(22) Filed: Jun. 25, 2018

(65) Prior Publication Data

US 2018/0345376 A1 Dec. 6, 2018

Related U.S. Application Data

(62) Division of application No. 14/663,393, filed on Mar. 19, 2015, now Pat. No. 10,005,126.

(Continued)

(51) Int. Cl.
  *B29C 64/118* (2017.01)
  *B29C 64/393* (2017.01)
  (Continued)

(52) U.S. Cl.
  CPC .......... *B29C 64/118* (2017.08); *B29C 64/106* (2017.08); *B29C 64/393* (2017.08); *B33Y 50/02* (2014.12)

(58) Field of Classification Search
  CPC ... B29C 64/106; B29C 64/118; B29C 64/386; B29C 64/393; B33Y 50/02
  See application file for complete search history.

(56) References Cited

U.S. PATENT DOCUMENTS 5,303,141 A 4/1994 Batchelder et al.
5,316,219 A 5/1994 Christyson et al.
(Continued)

FOREIGN PATENT DOCUMENTS

DE 10 2011 119 735 6/2013

OTHER PUBLICATIONS

Huang, Bin, "Development of a software procedure for curved layered fused deposition modelling", thesis, Auckland University of Technology, 2009; https://openrepository.aut.ac.nz/bitstream/handle/10292/730/HuangB.pdf?sequence=4 (Year: 2009).*

(Continued)

*Primary Examiner* — Joseph S Del Sole
*Assistant Examiner* — Jerzi H Moreno Hernandez
(74) *Attorney, Agent, or Firm* — Fish & Richardson P.C.

(57) ABSTRACT

A system for fabricating an object includes an extruder for one or more deposition materials. The extruder has at least one nozzle with a nozzle tip that includes an exit orifice and has a width that is equal to or larger than a width of the exit orifice. The system also includes a controller coupled with the extruder, the controller configured to apply a correction factor that has been calculated for a path of the nozzle based on a slope of a surface of an object to be fabricated. The correction factor for a positive slope is different from that for a negative slope. The extruder is configured to cause movement of the nozzle along the path to deposit material on the slope of the surface of the object, and the correction factor removes differences in thickness of the deposited material caused by the slope in relation to the path.

18 Claims, 40 Drawing Sheets

Related U.S. Application Data

(60) Provisional application No. 61/955,214, filed on Mar. 19, 2014.

(51) Int. Cl.
  *B33Y 50/02* (2015.01)
  *B29C 64/106* (2017.01)

(56) References Cited

U.S. PATENT DOCUMENTS

| | | |
|---|---|---|
| 5,866,058 A | 2/1999 | Batchelder et al. |
| 5,943,235 A | 8/1999 | Earl et al. |
| 5,960,411 A | 9/1999 | Hartman et al. |
| 6,722,872 B1 | 4/2004 | Swanson et al. |
| 6,749,414 B1 | 6/2004 | Hanson et al. |
| 6,814,907 B1 | 11/2004 | Comb |
| 6,823,230 B1 | 11/2004 | Jamalabad et al. |
| 7,122,246 B2 | 10/2006 | Comb et al. |
| 7,754,807 B2 | 7/2010 | Priedeman, Jr. et al. |
| 8,512,024 B2 | 8/2013 | Pax |
| 9,339,974 B2 | 5/2016 | Spalt |
| 9,533,449 B2 | 1/2017 | Page |
| 10,076,880 B2 * | 9/2018 | Page ..................... B33Y 30/00 |
| 2001/0017085 A1 | 8/2001 | Kubo et al. |
| 2005/0129941 A1 | 6/2005 | Comb et al. |
| 2006/0158470 A1 | 7/2006 | Vanheusden et al. |
| 2010/0021580 A1 | 1/2010 | Swanson et al. |
| 2010/0100224 A1 | 4/2010 | Comb et al. |
| 2011/0059256 A1 | 3/2011 | Ebisawa |
| 2011/0070394 A1 | 3/2011 | Hopkins et al. |
| 2011/0079936 A1 | 4/2011 | Oxman |
| 2013/0095302 A1 | 4/2013 | Pettis et al. |
| 2014/0034214 A1 | 2/2014 | Boyer et al. |
| 2014/0048970 A1 | 2/2014 | Batchelder et al. |
| 2014/0070461 A1 | 3/2014 | Pax |
| 2014/0284252 A1 | 9/2014 | Novikov et al. |
| 2014/0291886 A1 | 10/2014 | Mark et al. |
| 2014/0309764 A1 | 10/2014 | Socha-Leialoha et al. |
| 2014/0328963 A1 | 11/2014 | Mark et al. |
| 2014/0361460 A1 | 12/2014 | Mark |
| 2015/0077215 A1 * | 3/2015 | Ranky ..................... B33Y 40/00 338/47 |
| 2015/0093465 A1 | 4/2015 | Page |
| 2015/0108677 A1 | 4/2015 | Mark et al. |
| 2015/0182811 A1 * | 7/2015 | Bender ............... A63B 37/0038 473/376 |
| 2015/0183167 A1 | 7/2015 | Molinari et al. |
| 2015/0266235 A1 | 9/2015 | Page |
| 2015/0266244 A1 | 9/2015 | Page |
| 2015/0324490 A1 | 11/2015 | Page |
| 2015/0367375 A1 | 12/2015 | Page |
| 2015/0367576 A1 | 12/2015 | Page |
| 2016/0263806 A1 | 9/2016 | Gardiner |
| 2017/0106601 A1 | 4/2017 | Page |

OTHER PUBLICATIONS

*3-way extruder and colour blending nozzle Part 2—Build up and Printed things.* YouTube. Published Aug. 23, 2012. Retrieved on Sep. 10, 2014. Retrieved from the Internet: URL <http://www.youtube.com/watch?v=nkkbjpHVNZQ>, 2 pages.

*CubePro 3D Printer.* CubePro. Published Jan. 6, 2014. Retrieved on Sep. 10, 2014. Retrieved from the Internet: URL <http://cubify.com/en/CubePro?gclid=CJbWgJizlcACFUiGfgod7zgA6A>, 7 pages.

Douglass, Carl. *Next Generation 3D Printer Extruders: The Rugged-HPX Line.* Kickstarter. Published Feb. 17, 2014. Retrieved on Sep. 10, 2014. Retrieved from the Internet: URL <https://www.kickstarter.com/projects/dglass3d/next-generation-3d-printer-extruders-the-rugged-hp>, 22 pages.

*MakerBot Replicator 2X.* MakerBot. Published Sep. 18, 2012. Retrieved on Sep. 10, 2014. Retrieved from the Internet: URL <http://store.makerbot.com/replicator2x>, 9 pages.

*Multicolor-extruder.* RepRap. Published Aug. 11, 2014. Retrieved on Sep. 10, 2014. Retrieved from the Internet: URL <http://reprap.org/wiki/Multicolor-extruder>, 3 pages.

*RepRap 3D printer 3-way extruder and colour blending nozzle Part 1—intro video.* YouTube. Published Aug. 23, 2012. Retrieved on Sep. 10, 2014. Retrieved from the Internet: URL <http://www.youtube.com/watch?v=_g0fiWx8RyM>, 3 pages.

*RUG/Pennsylvania/State College/Software/Parts/Dual Extruder.* PepRap. Published Aug. 6, 2014. Retrieved on Sep. 10, 2014. Retrieved from the Internet: URL <http://reprap.org/wiki/RUG/Pennsylvania/State_College/Software/Parts/Dual_Extruder>, 13 pages.

"Nike Air Huarache Run ID Shoe," [online] [Retrieved on Jan. 28, 2015]; Retrieved from the Internet URL: http://store.nike.com/us/en_us/product/air-huarache-run-id/?piid=39329&pbid=712882438, 6 pages.

"Style sheet (web development)," [online] [Retrieved on Jan. 28, 2015]; Retrieved from the Internet URL: http://en.wikipedia.org/wiki/Style_sheet_(web_development), 4 pages.

"T-shirt," [online] [Retrieved on Jan. 28, 2015]; Retrieved from the Internet URL: http://en.wikipedia.org/wiki/T-shirt, 7 pages.

"Upload your 3D Design," [online] [Retrieved on Jan. 28, 2015]; Retrieved from the Internet URL:http://www.shapeways.com/create?li=home-2ndPring-promo-create, 8 pages.

"3D printing," [online] [Retrieved on Jan. 28, 2015]; Retrieved from the Internet URL: http://en.wikipedia.org/wiki/3D_printing, 39 pages.

"3D Printer Software & Apps," [online] [Retrieved on Jan. 28, 2015]; Retrieved from the Internet URL: https://3dprinter.dremel.com/3d-printer-software-apps, 11 pages.

"How Shapeways 3D Printing Works," [online] [Retrieved on Jan. 28, 2015]; Retrieved from the Internet URL: http://www.shapeways.com/how-shapeways-works, 14 pages.

Moto X (1st generation), [online] [Retrieved on Jan. 28, 2015]; Retrieved from the Internet URL: http://en.wikipedia.org/wiki/Moto_X_(1st_generation), 10 pages.

Neri Oxman, U.S. Appl. No. 61/248,555, "Variable Property Rapid Prototyping (VPRP)," filed Oct. 5, 2009, 36 pages.

USPTO Non-final Office Action, U.S. Appl. No. 14/745,285, dated May 25, 2016, 17 pages.

Reply to USPTO Non-final Office Action dated May 25, 2016, U.S. Appl. No. 14/745,285, filed Aug. 25, 2016, 10 pages.

USPTO Notice of Allowance, U.S. Appl. No. 14/745,285, dated Oct. 19, 2016, 10 pages.

* cited by examiner

Section View A-A

SYSTEMS AND METHODS FOR IMPROVED 3D PRINTING

CROSS-REFERENCE TO RELATED APPLICATIONS

This is a divisional of U.S. application Ser. No. 14/663,393, entitled SYSTEMS AND METHODS FOR IMPROVED 3D PRINTING, filed on Mar. 19, 2015, which claims the benefit under 35 U.S.C. § 119(e) of U.S. application Ser. No. 61/955,214, entitled SYSTEMS AND METHODS FOR IMPROVED 3D PRINTING, filed Mar. 19, 2014. The disclosures of the above applications are incorporated herein by reference in their entirety.

BACKGROUND

This specification relates to three dimensional (3D) printing or additive manufacturing, such as fused deposition modeling (FDM).

FDM using extruded polymer filament has evolved rapidly and is useful for creating reasonably accurate three dimensional objects quickly. Current FDM printing is typically accomplished by forcing a solid plastic feedstock through a heated nozzle with smaller diameter than the original feedstock. The filament is liquefied before or as it passes through the constriction in the nozzle, and the feed pressure causes material to be extruded with a cross section approximately equal to the nozzle exit. Other 3D printing techniques referred to in this application include selective laser sintering (SLS), stereolithography (SLA), direct metal laser sintering (DMLS) and material jetting processes such as ObJet.

SUMMARY

This specification relates to 3D printing or additive manufacturing, such as FDM.

According to one aspect, a system for fabricating an object includes: an extruder for one or more deposition materials, the extruder including at least one nozzle having a nozzle tip that includes an exit orifice, the tip having a width that is equal to or larger than a width of the exit orifice; and a controller coupled with the extruder, the controller configured and arranged to apply a correction factor that has been calculated for a path of the nozzle based on a slope of a surface of an object to be fabricated, the correction factor for a positive slope being different from the correction factor for a negative slope. The extruder is configured and arranged to cause movement of the nozzle along the path to deposit a material on the slope of the surface of the object, and the correction factor removes differences in thickness of the deposited material caused by the slope in relation to the path.

Implementations according to this aspect may include one or more of the following features. For example, based on the slope being negative, the correction factor can cause the path of the nozzle to become farther from the surface of the object for all path points along the path that correspond to the negative slope. Based on the slope being negative, the correction factor can move the path of the nozzle vertically upward by an amount equal to a half width of the nozzle tip multiplied by the absolute value of the slope. Based on the slope being positive, the correction factor can cause the path of the nozzle to become closer to the surface of the object for all path points along the path that correspond to the positive slope. Based on the slope being positive, the correction factor can move the path of the nozzle vertically downward by an amount equal to a half width of the exit orifice multiplied by the absolute value of the slope. Based on the slope being negative, the correction factor can cause the path of the nozzle to become farther from the surface of the object, based on the slope being positive, the correction factor can cause the path of the nozzle to become closer to the surface of the object, and the controller can be configured to apply the correction factor after the correction factor has been calculated for all path points along the path. The path can form at least a portion of a first layer of the object to be fabricated, the first layer defining a first gap, and the controller can be configured and arranged to direct the nozzle to form a second and a third layer above the first layer, the second layer defining a second gap that overlaps with the first gap, the third layer including a protruded portion that at least partially fills the first and second gaps to thereby interlock the first, second, and third layers.

According to this aspect, the path can form at least a portion of a first layer of the object to be fabricated, the controller is configured and arranged to direct the nozzle to form a second layer after the first layer, and a portion of the first layer extends vertically upward past the second layer. A portion of the second layer can extend vertically upward, and the vertically extended portions of the first and second layers can contact and become connected to each other. The controller can be configured and arranged to direct the nozzle to form a second layer after the first layer, and the vertically extended portion of the first layer can be bent over on top of the second layer. The controller can be configured and arranged to direct the nozzle to form a third layer on top of second layer and the bent portion of the first layer. The controller can be configured and arranged to direct the nozzle to push and bend the vertically extended portion of the first layer. The path can form at least a portion of a non-horizontal layer of the object to be fabricated on a separate core. At least a portion of the non-horizontal layer of the object can be formed on the separate core that was made using at least one of selective laser sintering (SLS), stereolithography (SLA), direct metal laser sintering (DMLS), or material-jet techniques. The path can form at least a portion of a non-planar layer of the object to be fabricated, and the controller can be configured and arranged to dynamically adjust a flow rate of deposition material while creating the non-planar layer to vary a thickness of the non-planar layer. The path can form at least a portion of a first layer of the object to be fabricated, and the controller can be configured and arranged to define one or more paths for one or more layers of the object to be fabricated based on a reference angle for an upper surface of the object where material is to be deposited. The system can further include: a path planning system that is configured to calculate the correction factor to be applied by the controller, and to generate machine control instructions corresponding to the movement path of the nozzle; and a data transfer system configured to transfer the generated machine control instructions from the path planning system to the controller.

According to another aspect, a non-transitory computer-readable medium storing software includes instructions executable by one or more computers, which, upon such execution, cause the one or more computers to perform operations for controlling a 3D printer, the 3D printer including an extruder for one or more deposition materials, the extruder including at least one nozzle having a nozzle tip that includes an exit orifice, the tip having a width that is equal to or larger than a width of the exit orifice. The operations include: applying a correction factor that has been calculated for a path of the nozzle based on a slope of a surface of an object to be fabricated, wherein the correction factor for a positive slope is different from the correction factor for a negative slope; and causing movement of the nozzle along the path to deposit a material on the slope of the surface of the object, wherein the correction factor removes differences in thickness of the deposited material caused by the slope in relation to the path.

Implementations according to this aspect may include one or more of the following features. For example, applying the correction factor can include: based on the slope being negative, applying the correction factor that causes the path of the nozzle to become farther from the surface of the object; based on the slope being positive, applying the correction factor that causes the path of the nozzle to become closer to the surface of the object; and applying the correction factor based on the corrector factor having been calculated for all path points along the path. The operations can further include calculating the correction factor to be applied.

According to another aspect, a system for fabricating an object includes: an extruder for one or more deposition materials, the extruder including at least one nozzle. The extruder is configured and arranged to cause movement of the nozzle along a path to deposit one or more deposition materials to fabricate the object.

Implementations according to this aspect may include one or more of the following features. For example, the path can form at least a portion of a first layer of the object to be fabricated, the first layer defining a first gap, and the extruder can be configured and arranged to direct the nozzle to form a second and a third layer above the first layer, the second layer defining a second gap that overlaps with the first gap, the third layer including a protruded portion that at least partially fills the first and second gaps to thereby interlock the first, second, and third layers. In some cases, the path can form at least a portion of a first layer of the object to be fabricated, the extruder being configured and arranged to direct the nozzle to form a second layer after the first layer, and a portion of the first layer can extend vertically upward past the second layer. A portion of the second layer can extend vertically upward, and the vertically extended portions of the first and second layers can contact and become connected to each other. The extruder can be configured and arranged to direct the nozzle to form a second layer after the first layer, and the vertically extended portion of the first layer can be bent over on top of the second layer. The extruder can be configured and arranged to direct the nozzle to form a third layer on top of second layer and the bent portion of the first layer. The extruder can be configured and arranged to direct the nozzle to push and bend the vertically extended portion of the first layer.

According to another aspect, a method for manufacturing a 3D object includes depositing a first layer of a first layer material, depositing a second layer of a second layer material on the first layer, wherein depositing the second layer includes forming a cleavage plane between the first layer and the second layer, and depositing a third layer of a third layer material on the first and second layers, wherein at least a first portion of the third layer is in the cleavage plane, and wherein at least a second portion of the third layer is on the opposite side of the second layer from the first layer.

According to another aspect, a method for manufacturing a 3D object includes depositing a first plane of a first plane material, depositing a second plane a second plane material on the first plane layer, and depositing a third layer of a third layer material on the first and second planes, wherein at least a first portion of the third layer traverses the first plane.

According to another aspect, a method for manufacturing a 3D object includes: depositing a first layer, wherein the first layer is horizontal, and wherein the first layer has a terminal edge; depositing a second layer, wherein the second layer is non-horizontal, and wherein the second layer contacts the later terminal edge; and depositing a third layer, wherein the third layer is horizontal, and wherein the third layer is on the opposite side of the second layer from the first layer.

According to another aspect, a method for manufacturing a 3D object includes depositing a first layer of a first material with a first orientation with respect to horizontal, and depositing a second layer of a second material with a second orientation with respect to horizontal, wherein the first and second orientations are not the same. The first and second orientations may differ by more than 5 degrees. At least one of the layers may have a thickness that varies. The variable thickness may vary by more than 10%.

According to another aspect, a method for manufacturing a 3D object includes defining a reference angle from horizontal, and depositing one or more primary layers of material, wherein a primary layer of material is deposited in a shape that matches the shape of the part design in areas where the part design does not exceed the reference angle.

The details of one or more implementations of the subject matter described in this specification are set forth in the accompanying drawings and the description below. Other features, aspects, and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
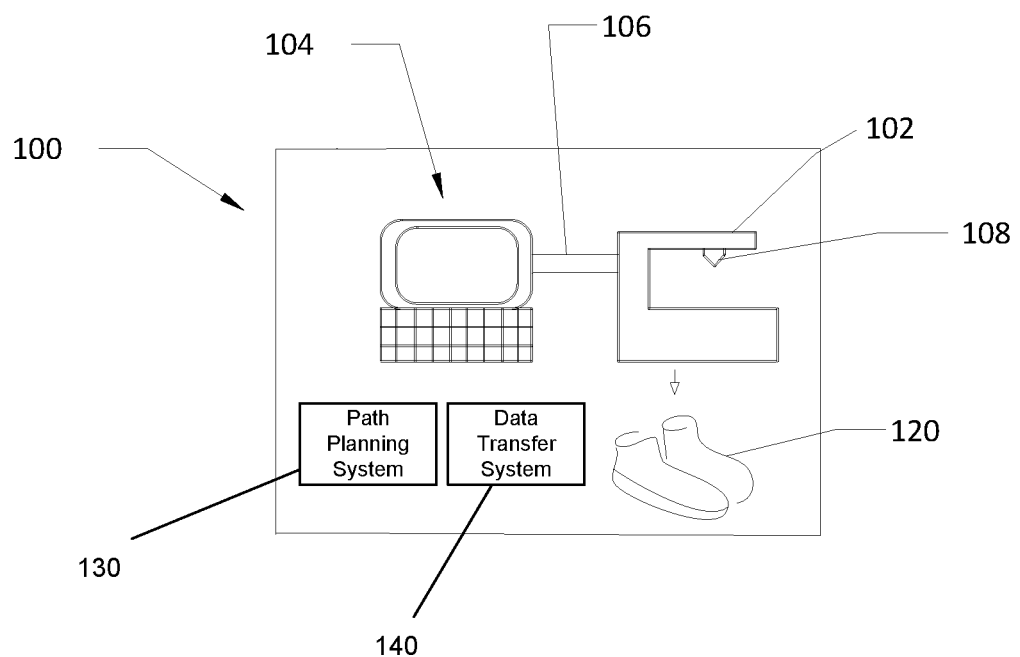
FIG. 1 shows an example FDM 3D printing system.

Referring to FIG. 1, an example FDM 3D printing system 100 includes an extruder or 3D printer 102, a controller 104, and a communication link 106 that links the extruder 102 to the controller 104. The 3D printer 102 includes an extruder nozzle 108. The FDM system 100 can produce 3D products such as item 120. The controller 104 may include one or more processors, memory, hard drive, solid-state drive, and/or inputs such as touch screen, mouse, or voice input capability. In some cases, the controller 104 may be an internet server or some other device, computer, processor, phone, or tablet. In some case, the controller 104 and extruder 102 are integrated into a single 3D printing device.

Figure 2A:
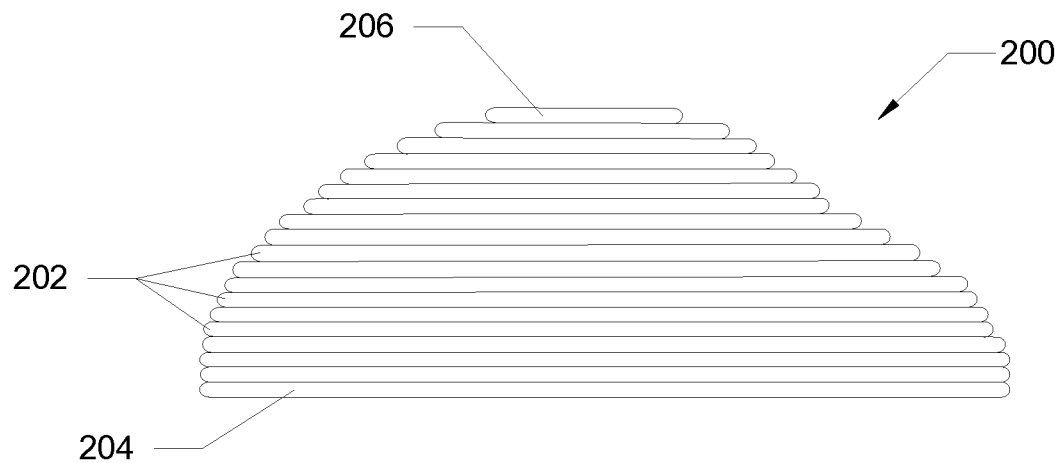
FIG. 2A illustrates a side view of an example part made by FDM.

Referring to FIG. 2A, a 3D part 200 made by conventional FDM 3D printing techniques is shown. As illustrated, layers 202 are planar and horizontal. Layers 200 may be deposited sequentially starting with lower layer 204 first and proceeding upward one layer at a time until finally top layer 206 is deposited. Layers 202 may be formed from a thermoplastic material that is extruded from a heated nozzle (not shown) in the form of a filament that adheres to itself where it touches itself along its length within a particular layer 202 and where it touches other layers. Only the outermost filament surfaces may be visible.

Each layer 202 may typically have a convoluted filament structure that touches itself along its edges either continuously or at intervals to create a structure with desirable mechanical properties. However, adhesion at areas where the filament touches itself or other filament layers may not be sufficiently strong and may only be able to attain a fraction of the breaking strength of a part made by molding or other techniques where the material can be in solid form. In particular, inter-layer strength is typically lacking because layers 202 are only held together by adhesion at relatively few or weak polymer bonds that form during extrusion of one layer on top of the previous one and also because there is no continuous filament material joining them. Parts made by current state of the art FDM techniques, as a consequence, may often break or fail by layers coming apart or cracking. Parts may often start to fail between layers, for example, merely due to thermal stresses inherently created as hot material deposited on top of cooler material layers then cools and either shrinks or remains affixed to the previous layer but with internal stresses effectively stretching it to keep it adhered to the other layers. These stresses may be strong enough to cause layers to shear or peel away from one another or to warp the part.

Figure 2B:
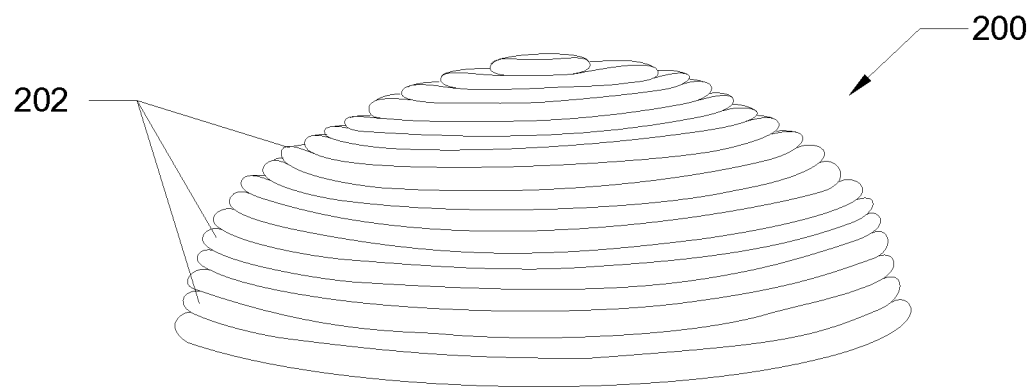
FIG. 2B illustrates a perspective view of the part of FIG. 2A.

Referring also to FIG. 2B, the part 200 has a curved or domed form. Here, each layer 202 effectively forms a horizontal slice of the desired shape and together with other layers 202 form an imperfect approximation of the desired 3D form.

Figure 2C:
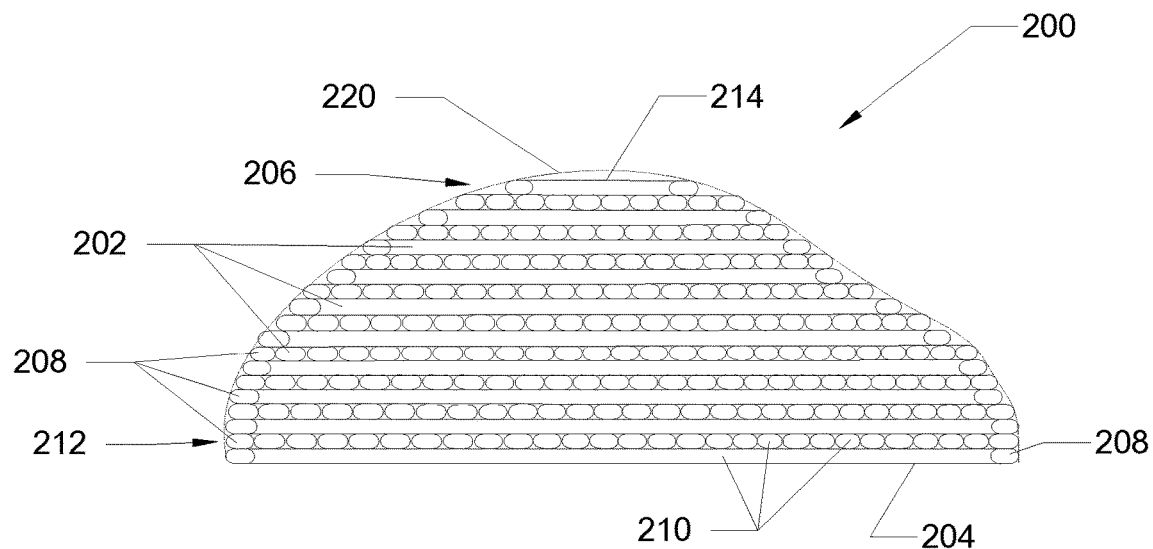
FIG. 2C illustrates a cross section view of the example part of FIG. 2A.

In the cross section view of FIG. 2C, more of the filament structure of layers 202 can be seen. Here, edge filaments 208 approximate the ideal cross section 220 of the part 200. Edge filaments 208 have a circular, oval, or rounded rectangular cross section shape which is typical of the cross sectional shape of the filament material elsewhere in the part. Bottom layer 204 has an internal filament structure inside the boundary created by its respective edge filaments 208 that runs largely parallel to the cutting plane used to create this cross section view. Thus internal filament 210 for this layer appears to run continuously from one edge filament 208 to the other. A second layer 212 has similar edge filaments 208 and has internal filaments 210 running largely perpendicular to the cross section plane. Subsequent layers alternate the direction of their internal filaments. In this view, the part 200 is shown to be largely solid, except for small voids between filaments. In practice, parts may also have voids intentionally built into their internal filament structure to reduce mass or filament material used. As illustrated, the top layer 206 has a distinctly flat top face 214 that does not match the ideal cross section 220 very well.

Figure 2D:
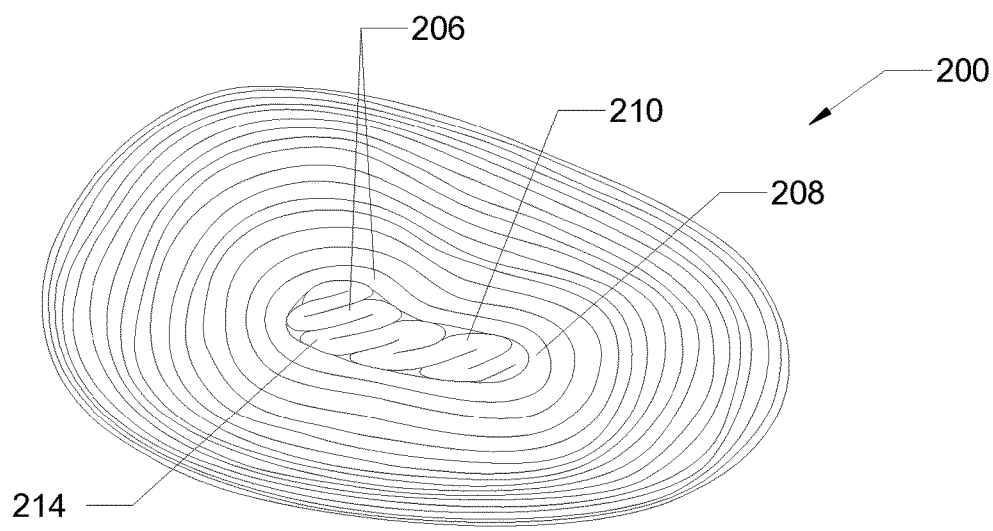
FIG. 2D illustrates a top view of the part of FIG. 2A.

FIG. 2D shows a top view of the part 200. The full filament structure of top layer 206 can be seen. The top layer 206 includes an edge filament 208 and an internal filament 210. Internal filament 210 can follow a zig-zag path so that it touches itself along most of its edges. Even though the desired form of the part 200 is curved in all directions in the vicinity of top layer 206, the top layer 206 has a discrete flat, planar top face 214. The flatness and other artifacts of the discretization or approximation of a desired shape by flat layer slices are often aesthetically undesirable and/or functionally undesirable or intolerable.

The shape artifacts of flat layers and the inter-layer weakness inherent to flat layers, as discussed above, often prevent FDM from being used to make components or products even though it may be a cost effective manufacturing technique. If the negative consequences of these flat layers could be eliminated or mitigated, many more components and products could be feasibly manufactured via FDM and thus enable great economic and other benefits such as on-demand manufacturing, eliminating inventory cost, product customization and bespoke products, localized manufacturing, reduced or eliminated shipping, eliminating unwanted or surplus product inventory problems, achieving a greater degree of product recyclability and material reuse, creating local, direct product recycling and material reuse. To address some of the problems with conventional FDM techniques described above, implementations of new techniques and improvements are described below.

Figure 3A:
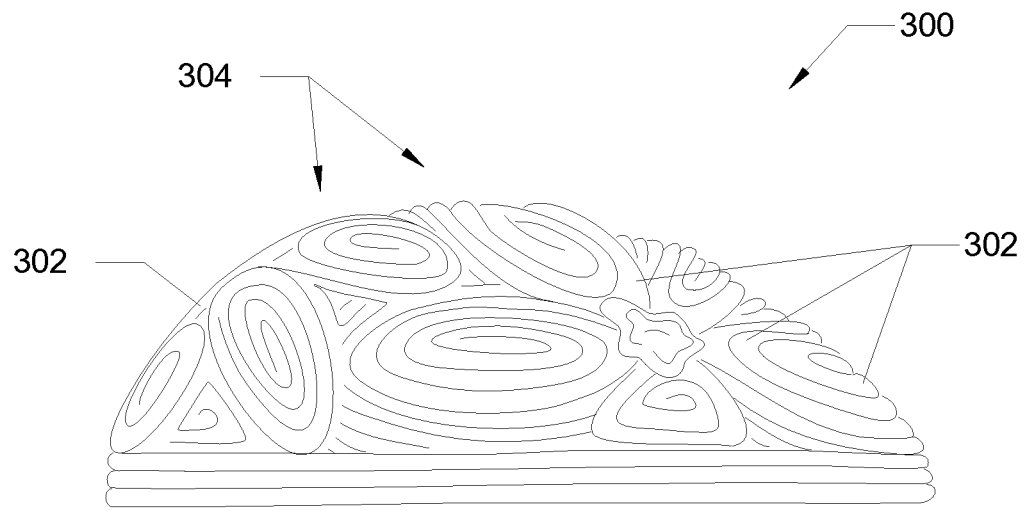
FIG. 3A shows a side view of an example part made by FDM according to an implementation of this disclosure.
Figure 3B:
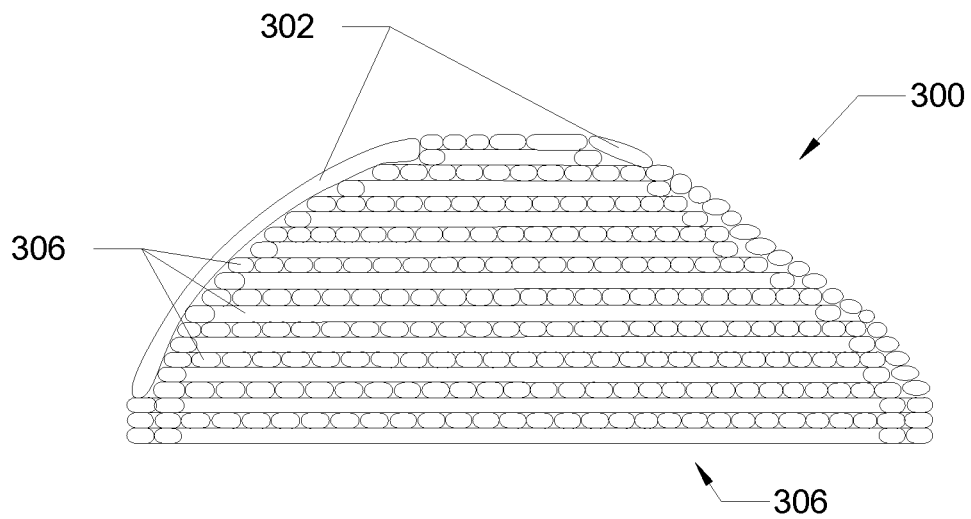
FIG. 3B shows a cross section view of the part in FIG. 3A.

FIGS. 3A and 3B show a part 300 made by FDM with improved toolpath techniques according to an implementation of the current disclosure. Here, a flower-shape is shown. FIG. 3A shows a side view of the part 300, and FIG. 3B shows a cross section view of the part 300. Visible in FIG. 3A is an outer non-horizontal shell of filaments 302, which may also be non-planar. Generally, non-planar layers may be created via non-planar relative motion (e.g., relative motion in all three axes) of an extruder or other material deposition system relative to the part 300 so that the form of shell filaments 302 more closely matches the desired part shape than does the part 200 of FIGS. 2A-2C. Shell filaments 302 may also incorporate decorative and/or structural filament patterns 304. In FIG. 3B, one possible arrangement of the underlying filament layers 306 is shown. Underlying layers 306 may be similar to or identical to the flat layers 202 of FIGS. 2A-2C. As illustrated, the shell 302 crosses and adheres to underlying layers 306. It therefore ties all underlying layers 306 together and helps to reduce or eliminate the aforementioned weakness of the part 200 in which underlying layers are only connected by weak inter-filament bonds that can peel apart. The shell 302 reinforces the part 300 particularly across internal layers 306 to make the part 300 much stronger.

Compared to the part 200 shown in FIGS. 2A-2C, the part 300 has the following benefits: 1) it is much stronger and more mechanically robust; 2) it more closely matches the ideal or intended part shape; and 3) it may contain decorative and structural filament patterns on its exterior which are not constrained to be planar and which can better meet the aesthetic, structural and functional requirements for a given part.

Figure 4A:
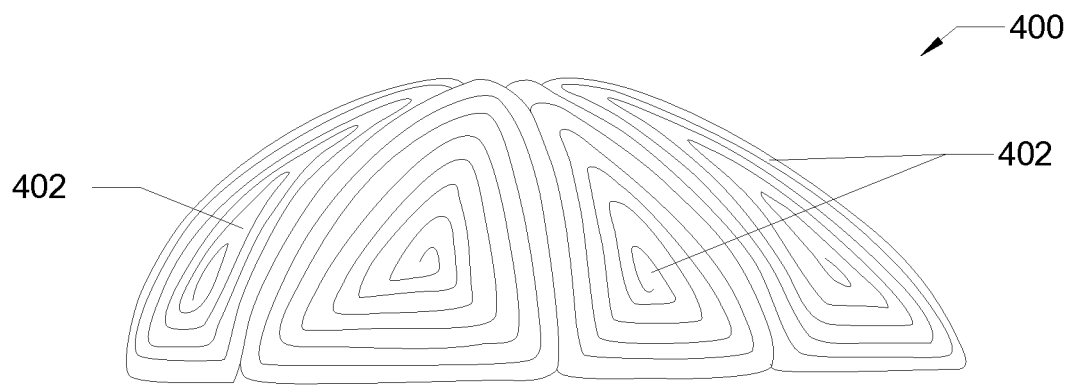
FIG. 4A shows a side view of another example part made by FDM according to an implementation of this disclosure.
Figure 4B:
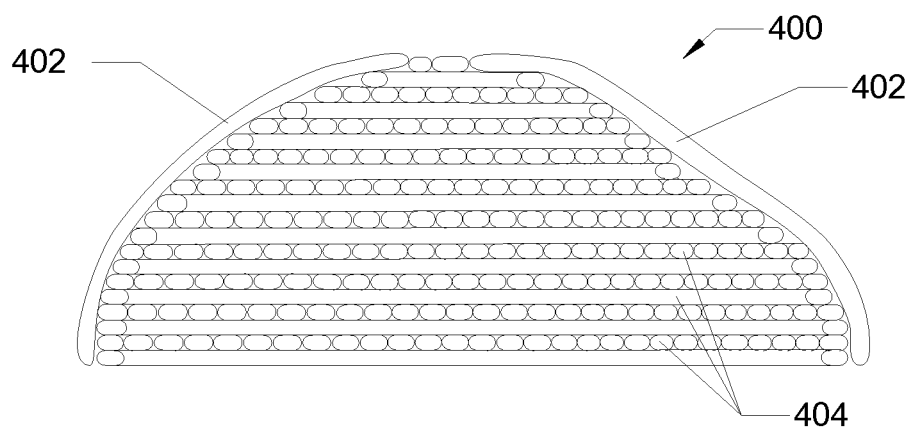
FIG. 4B shows a cross section view of the part in FIG. 4A.

FIG. 4A shows a side view of another example part 400 made by FDM with improved toolpath techniques. In this case, a triangular-spiral design has been implemented. FIG. 4B shows a cross section view of the part 400. The part 400 has one or more outer non-planar shells of filaments 402, which are created by non-planar motion of an extruder or other material deposition system so that the form of shell filaments 402 closely matches the desired part shape. The part 400 is similar to part 300 of FIGS. 3A-B except that it shows a different filament pattern or arrangement in shell 402. Underlying layers 404 are visible in FIG. 4B. The pattern of filaments 402 in this case has been designed to regularly cross underlying layers 404 in a direction which best reinforces across layers 404.

Figure 4C:
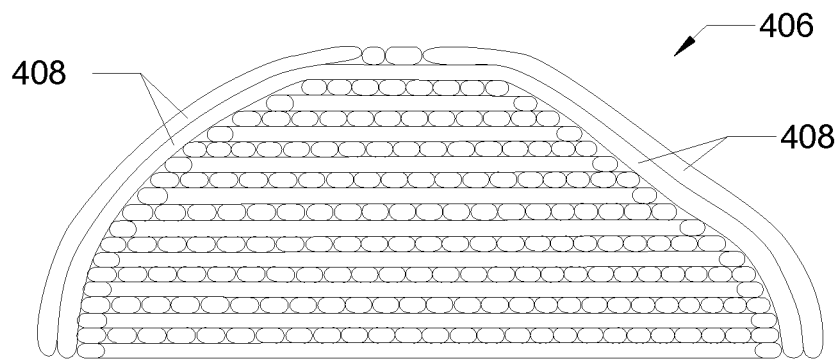
FIG. 4C shows a cross section view of the part in FIG. 4A.

FIG. 4C shows an a part 406, which differs from part 400 in that it has multiple filament shells 408 which are similar to shell 402. Two layers 408 are shown, but three, four, five, or nearly any number of shells are possible in practice. A set of internal flat layers, which may or may not be needed, may be reinforced by shells 408.

Figure 5:
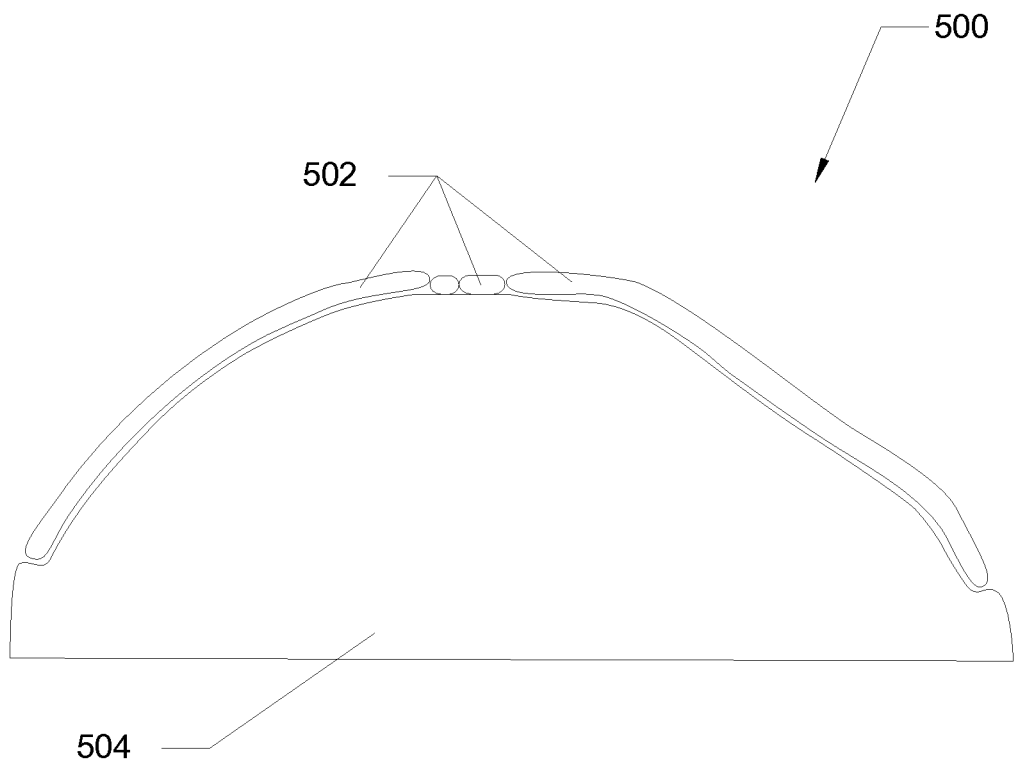
FIG. 5 shows a cross section view of material deposited on a pre-made part.

Referring now to FIG. 5, a part 500 is formed by applying filaments 502 to a base part 504. The base part 504 may be a pre-made molded part or a part made by another 3D printing technique such as SLS (selective laser sintering) or SLA (stereolithography) or it may be made by some other plastic manufacturing method or it may be wood or metal or some other material. The base part 504 may be a mass-produced part where many identical base parts are produced, or the base part 504 may be a unique, bespoke, or custom part. Filaments 502 may be applied after the base part 504 is made. The pattern of filaments 502 may be custom, unique, or bespoke even if base part 502 is mass-produced. In this way, customized parts are possible which take advantage of the low cost of injection molding for most of the mass and/or volume of the part. This also has the advantage of making available multiple materials and multiple colors in a single part which are difficult or sometimes impossible to achieve in an injection molded part. For example, filaments 502 may be an elastomer material formed in continuously variable color or full color on top of a rigid molded polymer base part 504. This technique can also greatly simplify product designs by allowing multiple parts to be combined into a single component and enabling geometries that cannot be produced by molding, machining or other traditional manufacturing techniques. The combined processes may be automated so that base parts 504 may be produced automatically by molding or other mass production methods and then each base part 504 may be transferred to an FDM system automatically where filaments 502 may be automatically applied, all without specific human attention or intervention. Packing and shipping processes may also be automated.

In some cases, the base part 504 may be made bespoke and made via SLS or some other 3D printing method or direct manufacturing method. 3D printing methods such as SLS, SLA, direct metal laser sintering (DMLS), and several others are typically limited to a single material per part but may offer high resolution for fine details. By adding filaments 502 in different colors and/or materials to the base part 504 made by a different 3D printing method or direct manufacturing method such as machining, fully custom parts can be produced which take advantage of the strengths of one technique for the base part 504 such as excellent yield strength via SLS and also still have the ability to have multiple colors and materials. The combined processes may be automated so that the base part 504 may be produced automatically and transferred to an FDM system automatically where filaments 502 may be automatically applied, all without specific human attention or intervention. Packing and shipping processes may also be automated.

In some cases, filaments 502 may be produced first, and if they enclose or define a volume, then filaments 502 may serve as a mold so that base part 504 may be cast or formed in-place afterward. A molding or forming process for creating base part 504 with filaments 502 already in place may optionally also employ additional mold core(s), inserts or other mold components (not shown). The process of creating the pattern of filaments 502 may also optionally involve a separate form (not shown), so that filaments 502 are made over a form, then removed before base part 504 is formed onto them. Other variations of this process are also possible. This process may be automated so that filaments 502 may be formed automatically and then base part 504 may be formed into them automatically so that the entire process is automatic and requires little or no human attention or intervention.

In some cases, the base part 504 may be made of a dissolvable or meltable material so that after processing of filaments 502 is complete, the part 500 may be removed and the base part 504 may be dissolved or melted away to leave behind only filaments 502. The base part 504 may also be printed in the form of dissolvable filaments to achieve this result.

In some cases, the base part 504 may be made of several parts which form a collapsing core so that when processing of filaments 502 is complete, a first part of the base part 504 may be removed which then leaves space to allow other parts of the base part 504 to collapse inward in directions appropriate for allowing them to separate from the portion of filaments 502 that they supported. This technique may be particularly useful if filaments 502 take on a shape with undercuts or protuberances. In such a case, the collapsing core technique can allow the part 504 to be removed where a solid base part would not be removable.

In some cases, the base part 504 may be made of wood or other natural materials. Alternatively, the base part 504 may be a temporary "programmable" support structure composed of an array of pin, shaft, or prism shapes which may be individually adjusted up or down, each to a specified position. Pins or shafts may be pushed down into individual positions by the nozzle of an FDM system. If base part 504 is a programmable support structure, it may be removed from filaments 502 and reprogrammed or reshaped and reused as a support to make additional similar or different parts.

In some cases, the base part 504 may be rotated as filaments 502 are applied to allow creation of different shapes than would be possible if base part 504 remains in a fixed orientation. In particular, the base part 504 may be rotated about an axis that is not vertical or an axis that is horizontal or some other angle which allows filaments 502 to be deposited on a larger portion of base part 504 or even the entire surface of base part 504. Alternatively, or additionally, the material deposition nozzle may be rotated so its axis does not stay vertical as filaments 502 are deposited so that filaments 502 may be deposited in patterns not possible with a vertical nozzle. This type of rotation of the material deposition nozzle is possible with additional axes on a printer such as a 4, 5 or 6 axis printer.

Figure 6A:
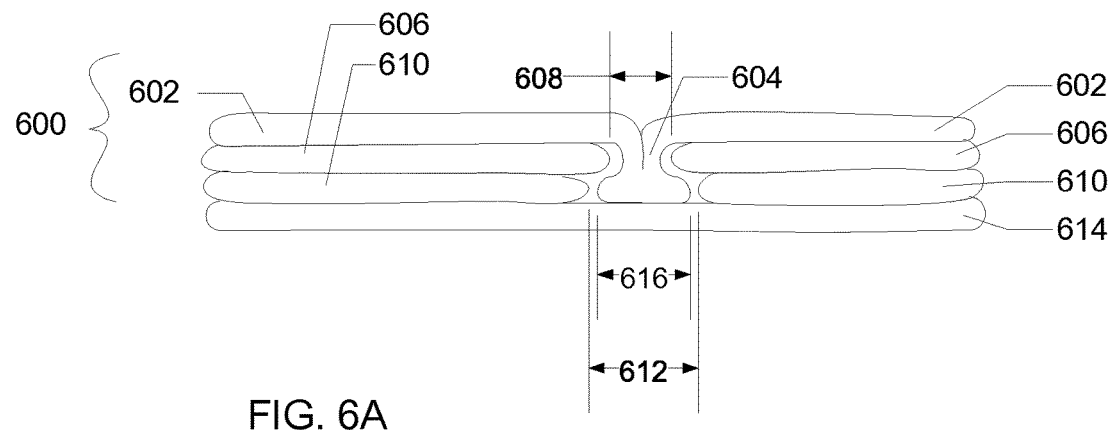
FIGS. 6A-6D show cross section views of example structures made by FDM according to another implementation.

Referring now to FIG. 6A, a cross section view of an FDM filament arrangement 600, made based on another implementation of an FDM process according to the present disclosure, is shown. FDM parts can suffer from inter-layer (vertical) weakness because filament polymer chains only weakly interlink between layers. In contrast, as shown, the filament arrangement 600 vertically links, or interlocks, layers together to create stronger parts. The filament arrangement 600 includes a top filament 602 which has a protruded portion 604, a first lower layer 606 which has a first gap 608, an optional second lower layer 610 with a second gap 612, and an optional base layer 614. An FDM process for producing vertically interlinked layers involves optionally first depositing base layer 614 if needed, then depositing layer 610 on top of base layer 614 (if present), and leaving gap 612, then depositing layer 606 on top of layer 610 and leaving gap 608, then depositing filament 602 and pausing or slowing horizontal motion of the extruder while extruding extra material to form the protruded portion 604 which fills the gaps 608 and 612 and locks filament 602 to layer 606 and to a lesser extent, layer 610. The gap 612 may be larger than gap 608 or offset from it so that the protruded portion 604 has a wide portion 616 which is wider than gap 608 so that portion 616 may not pass through gap 608 even if inter-layer bonds between the filament 602 and the layer 606 fail. The protruded portion 604 is formed with molten or soft material which subsequently hardens or solidifies. For clarity, gaps 608 and 612 are shown leaving space around the protruded portion 604, but in practice the protruded portion 604 may form tightly against the perimeter of gaps 608 and 612 leaving little or no space. One instance of filament arrangement 600 is shown, but a part may contain many such arrangements and any given material layer may incorporate protrusions such as 604, gaps such as 608 and gaps such as 612 so that all layers may be vertically linked together.

Figure 6B:
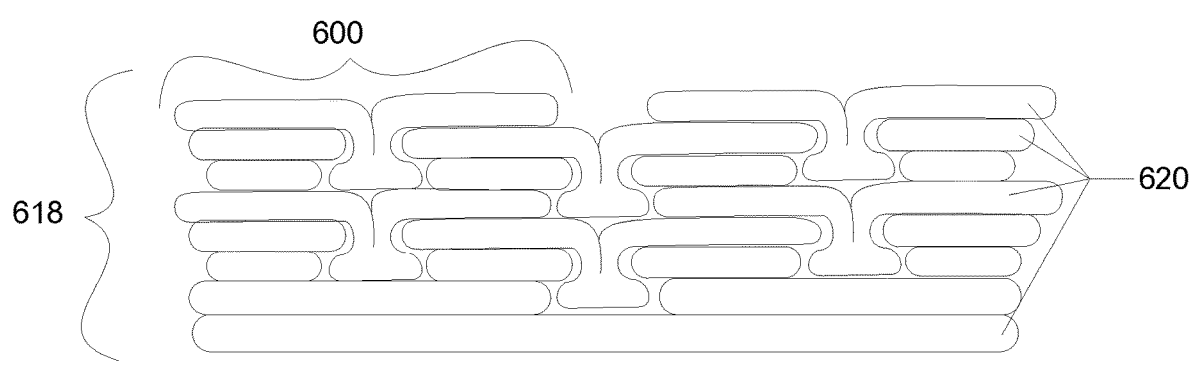

FIG. 6B shows a part 618 including eight layers 620. As shown, the part 618 includes six instances of interlocked filament arrangements 600 which link the top six layers 620 together.

Figure 6C:
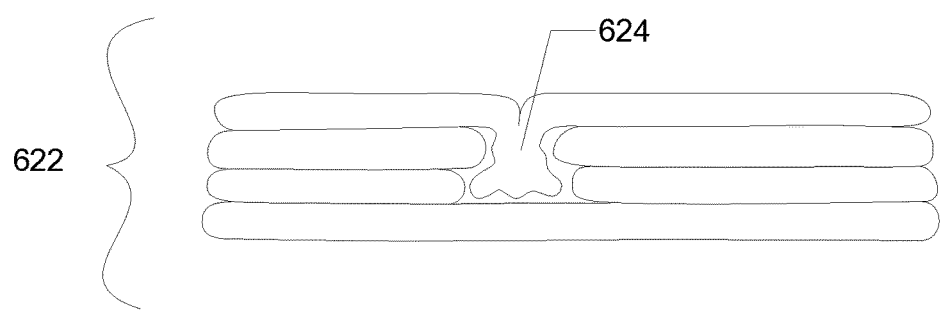

FIG. 6C shows a filament arrangement 622 which is a variation of the arrangement 600. In filament arrangement 622, a protruded portion 624 is shown having a lumpier shape than the protruded portion 604 of FIG. 6A. Despite the variation in the shape of the two protrusions, the interlocking function works similarly.

Figure 6D:
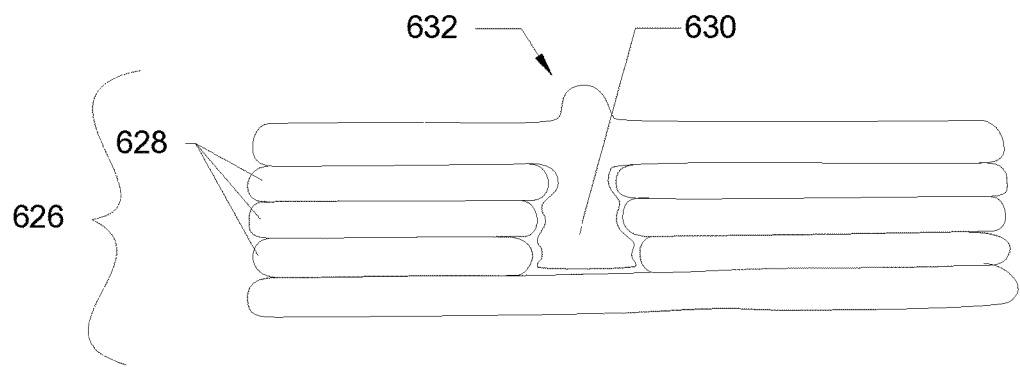

FIG. 6D shows a filament arrangement 626 which is similar to arrangement 600 except that three gap layers 628 are shown and a protruded portion 630 physically interlocks with the upper two of layers 628 rather than just a single layer interlock as in arrangement 600. An optional upward protrusion 632 may be remelted and its polymer chains more effectively linked to an upper adjacent layer (not shown) by physical mixing as the extrusion nozzle moves over protrusion 632 to deposit the upper adjacent layer.

Figure 6E:
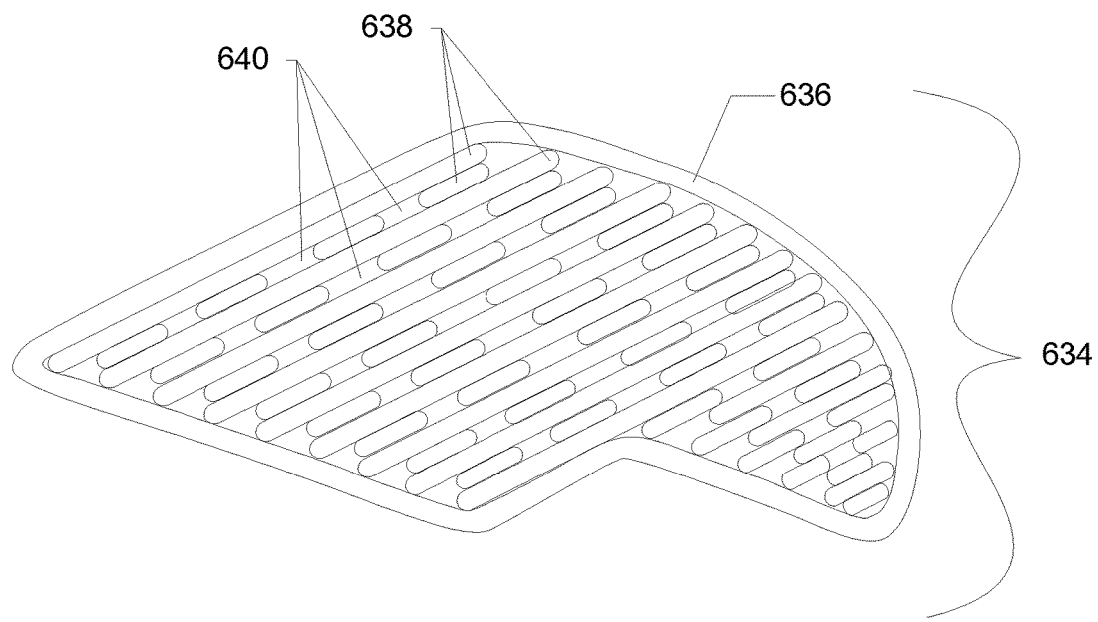
FIG. 6E shows an isometric view of an example layer of the structures in FIGS. 6A-6D.

FIG. 6E shows an isometric view of one layer 634 of a part made with improved toolpaths for FDM as discussed in FIGS. 6A-D. One or more boundary filaments 636 are used to create a structural and potentially aesthetic outer boundary with few or no gaps. Inner filaments 638 fill some portion of the interior space and primarily serve to create structural integrity. Filaments 638 may take a variety of lengths, shapes, or forms. Filaments 638 are shown here as straight segments, but they may be curves or some other shape volumes created by depositing material. Defined at intervals between filaments 638 are gaps 640. Gaps 640 provide locations where extra material can flow or be deposited from above, typically as the next layer is being created, so that additional vertically stacked layers will be physically interlocked.

Figure 6F:
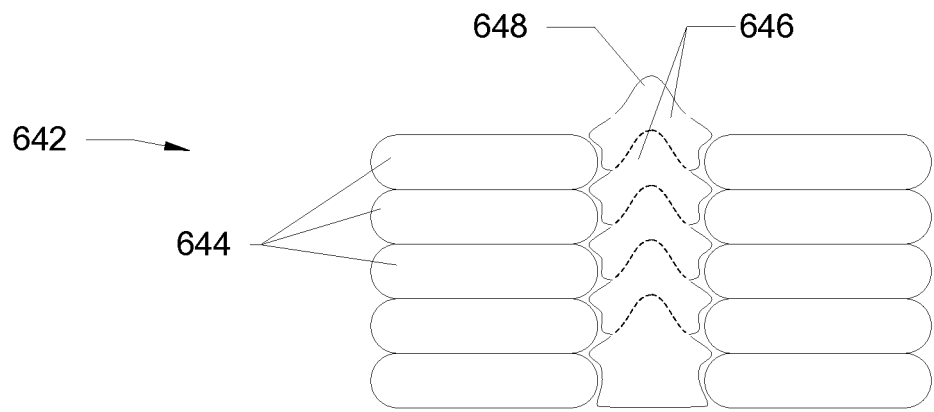
FIGS. 6F-6G show cross section views of example structures made by FDM according to another implementation.
Figure 6G:
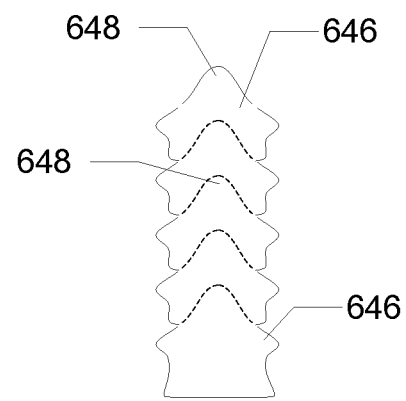

FIG. 6F shows a cross section view of a different interlocking structure arrangement 642. The structure 642 is formed as a set of layers 644. A set of connector segments 646 is formed with each additional segment 646 being added as a new layer 644 is added to structure 642. Each connector 646 includes a protruded portion 648 that protrudes above the surrounding material of that layer. As each connector 646 is formed, an extrusion nozzle (not shown) remelts the protruded portion 648 of the underlying connector and may move in a repetitive path over it while extruding more material. Thus, material from the previous connector is remelted and inextricably mixed with new material that is deposited for the new connector. This process enables connector segments 646 to function as a structurally integral unit, linking layers 644 together. Connectors 646 are formed from molten material which also flows to take on the shape of layers 644 which serves to enhance the vertical linking of layers 644. Just the connectors 646 are shown in FIG. 6G for improved clarity.

Figure 7:
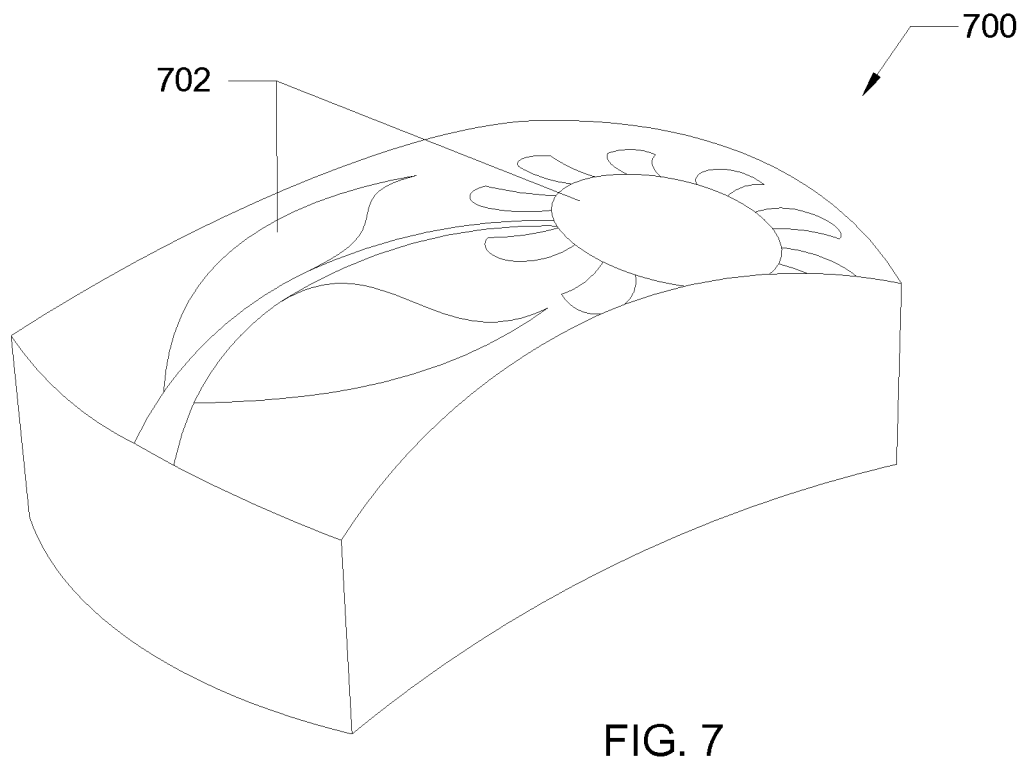
FIG. 7 shows an idealized version of an example part.

Referring now to FIG. 7, an ideal 3D part 700 including graphic design elements 702 is shown. Design of the part 700 is difficult to realize with current FDM techniques both in terms of function and aesthetics.

Figure 8A:
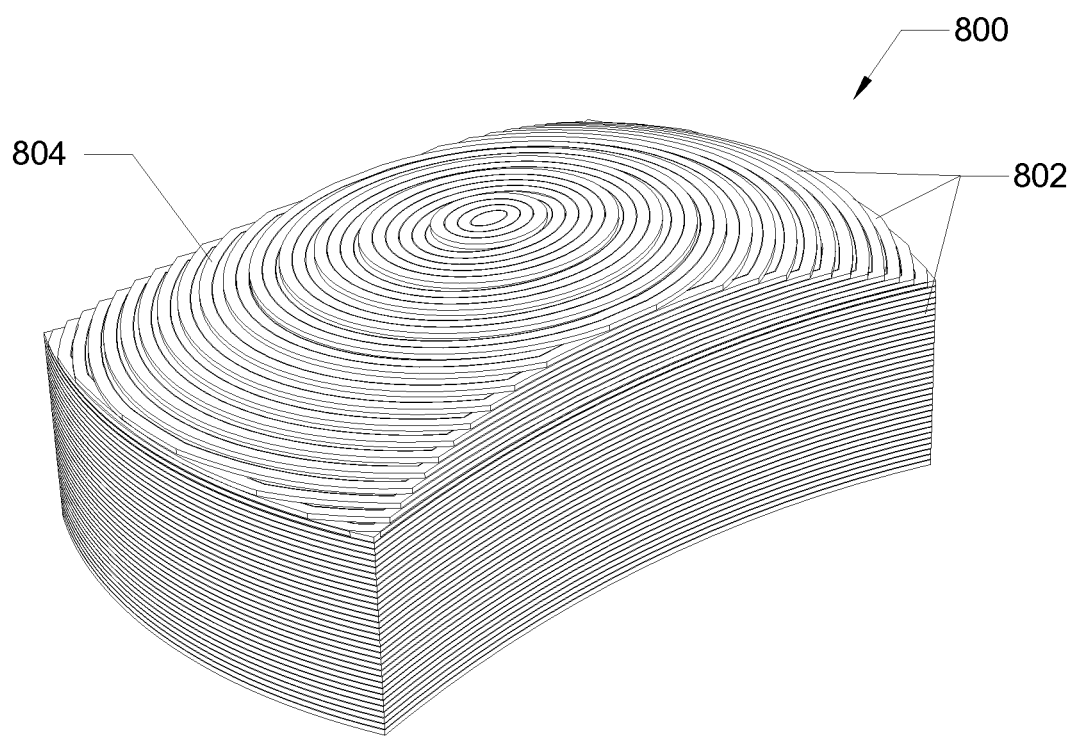
FIG. 8A shows an example part made by FDM.

For example FIG. 8A illustrates a typical part 800 created using current FDM techniques and toolpath planning using the geometry of the part 700 as input to the path planning process. As shown, the part 800 is built as a series of vertically stacked horizontal layers 802. The lower portion of part 800 has vertical sides so layers 802 reasonably approximate the ideal shape. Upper portion of part design 800, however, has a gentle arcing sloped shape. The sloped shape when approximated by discrete FDM layers 802 creates a stair-stepped surface 804 which is a non-ideal representation of the design intent of part 700. Another shortcoming of part 800 is inter-layer strength. Because layers 802 are formed sequentially, each on top of the previous one, there is no mechanical interconnection to improve inter-layer strength.

Typically a relatively poor degree of cross linking between polymer chains may be achieved at the interface between layers as compared with the polymer cross linking in the bulk material within each layer. This may result in layers that can pop apart or shear at their junctions with much less force than if the part was molded in a similar shape with a similar amount of material.

Figure 8B:
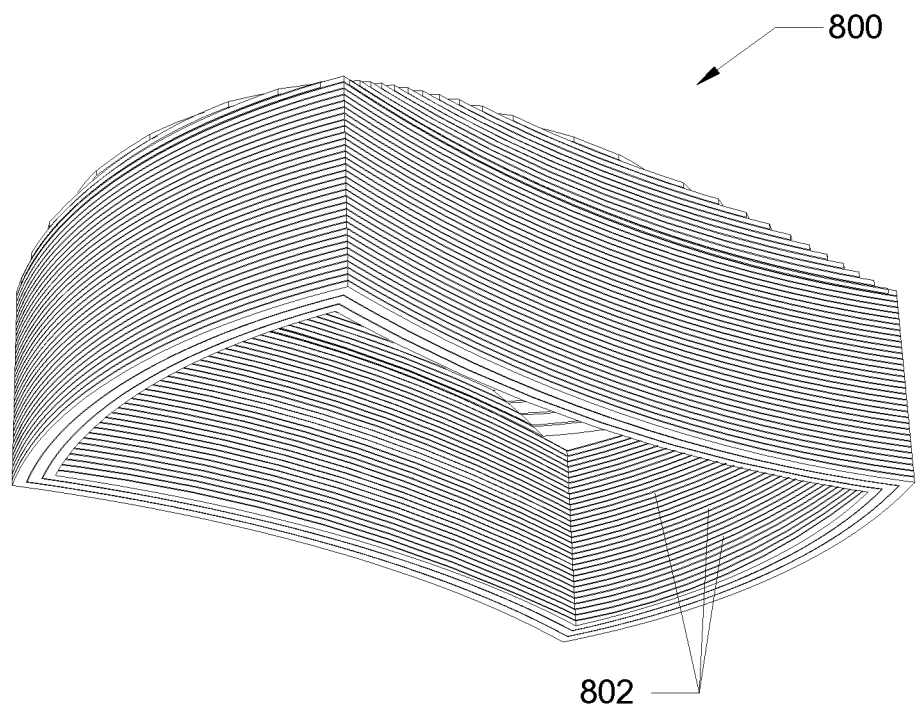
FIG. 8B shows a bottom perspective view of the part in FIG. 8A.
Figure 8C:
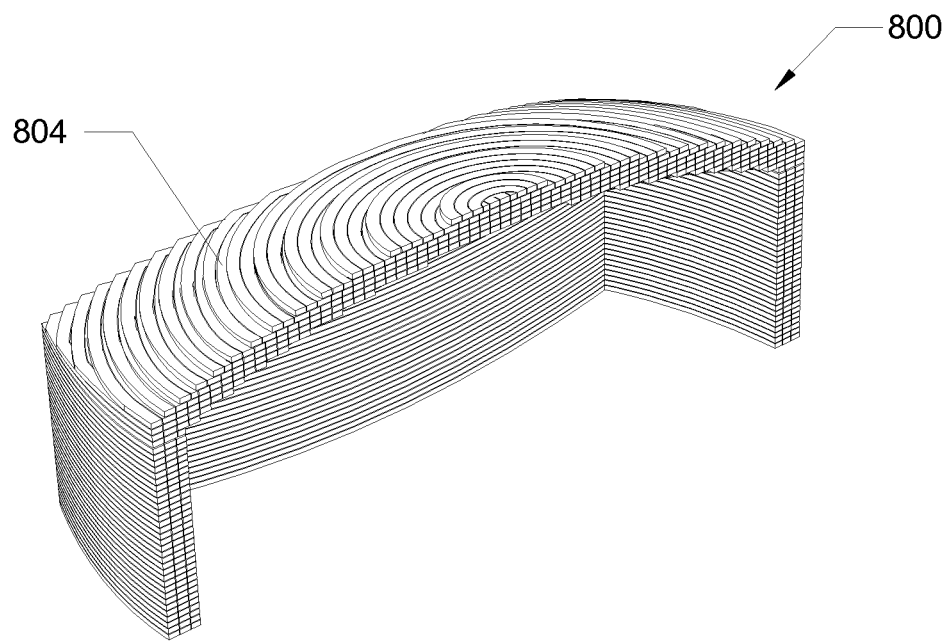
FIG. 8C shows a cross section view of the part in FIG. 8A.

FIG. 8B shows an underside view of part 800 which shows that the part is hollow and shows the inside walls of layers 802. Inter-layer weakness may be a particular problem for a part such as this with thin walls. FIG. 8C shows a cross section view of part 800 which clearly illustrates the stair-step nature of surface 804.

Figure 9A:
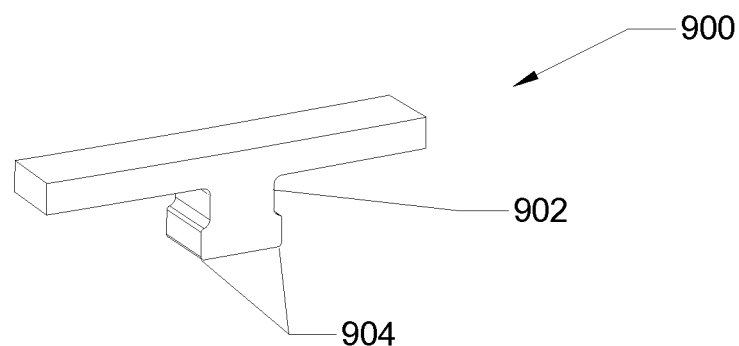
FIGS. 9A-9I show various stages of an example interlocking material deposition pattern according to an implementation.

Referring now to FIG. 9A, a structural filament element 900 may be repeated to form an interlocking structure. Filament element 900 has a lower extension 902 with protruding tabs 904. Filament element 900 may be formed by extruding material through a moving nozzle (not shown). Lower extension 902 can be formed by having the nozzle pause its motion while continuing to extrude material into a gap in elements below (not shown).

Figure 9B:
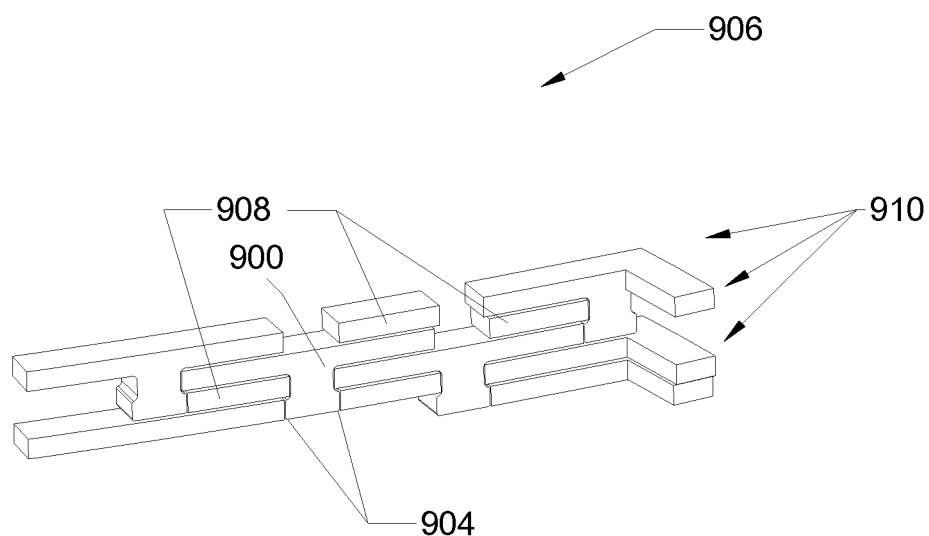

FIG. 9B shows an interlocking structure 906 made up of interlocking filament elements 900 plus additional supporting filament elements 908. Tabs 904 of one element 900 extend and interlock under adjacent elements 900 and 908. Structure 906 is built in layers 910 which are mechanically interlocked so that inter-layer weakness shown in FIGS. 8A-C is reduced.

Figure 9C:
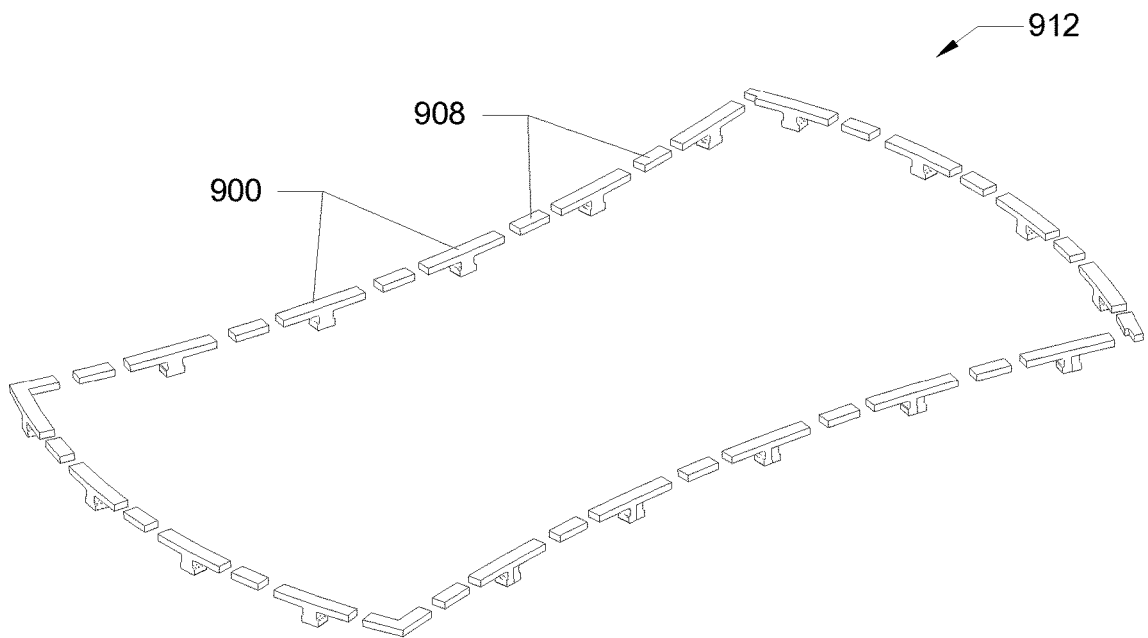

FIG. 9C shows a partial single layer 912 of interlocking filament elements 900 and supporting filament elements 908 as they would be formed by an extruder moving around to deposit material on one layer of a part.

Figure 9D:
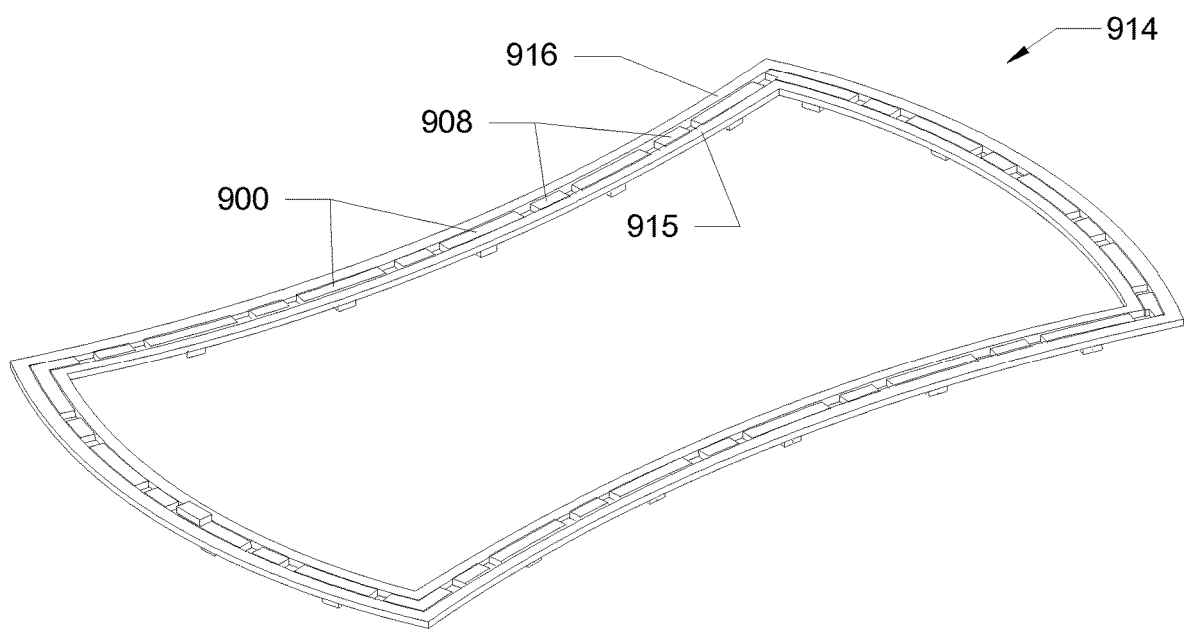

FIG. 9D shows a complete single layer 914 of filament elements 900 and 908 with surrounding inner perimeter filament 915 and external perimeter filament 916.

Figure 9E:
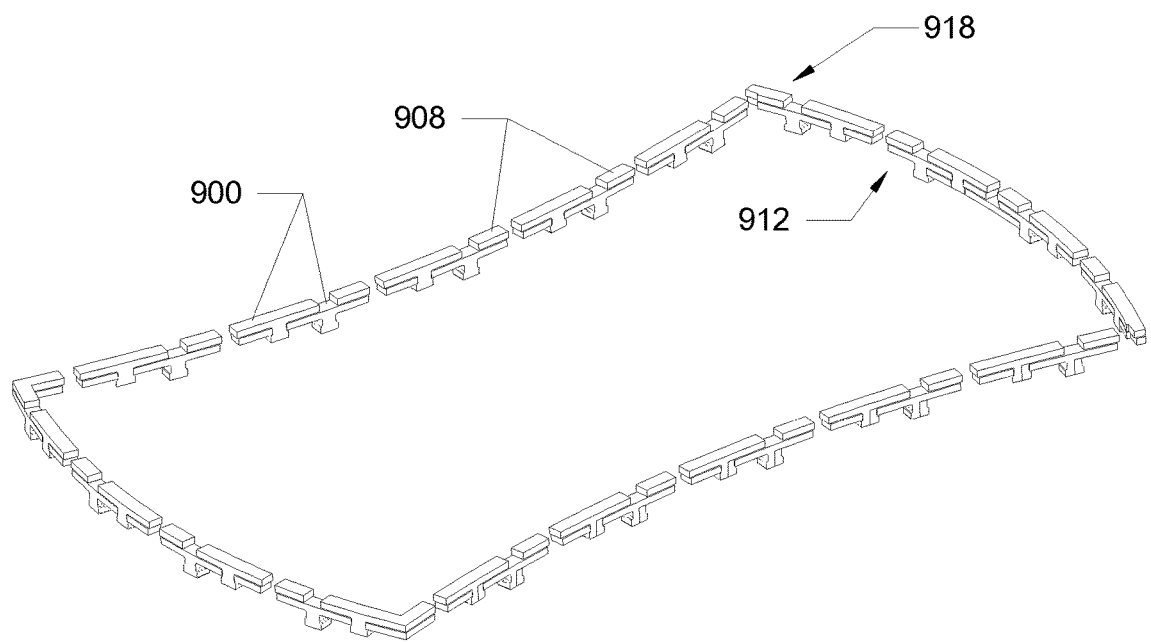

FIG. 9E shows partial layer 912 with a next partial layer 918 applied on top of it. Both layers are made up of interlocking filament elements 900 and supporting structural elements 908.

Figure 9F:
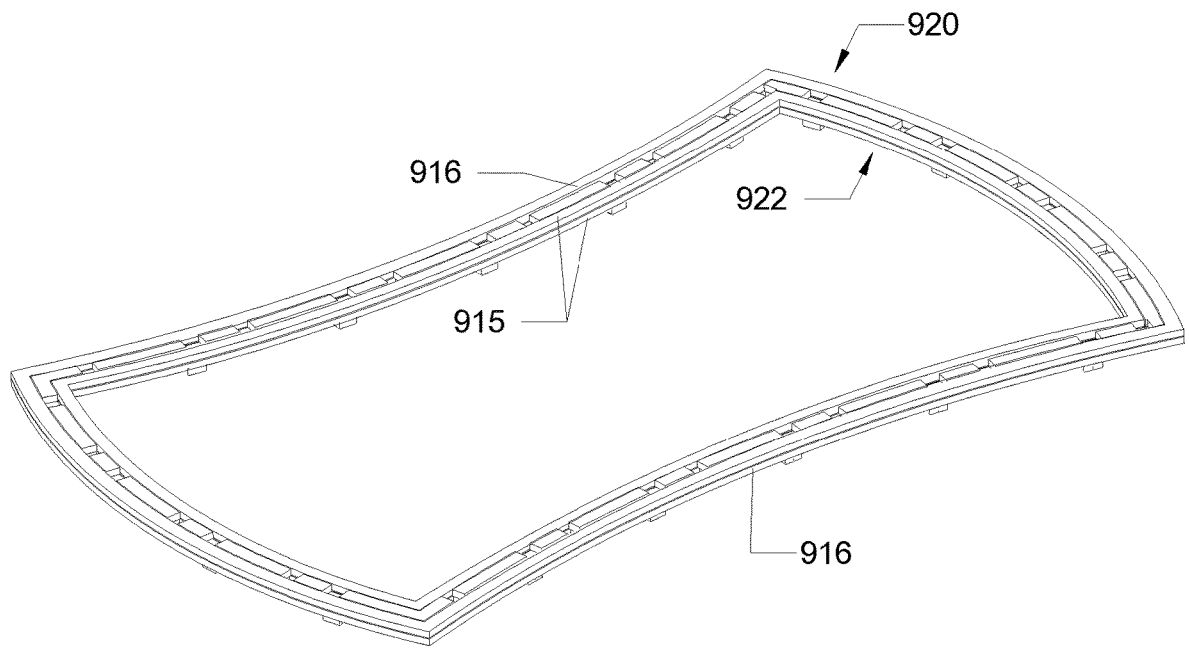

FIG. 9F shows complete layers 920 and 922 with internal perimeter filaments 915 and external perimeter filaments 916.

Figure 9G:
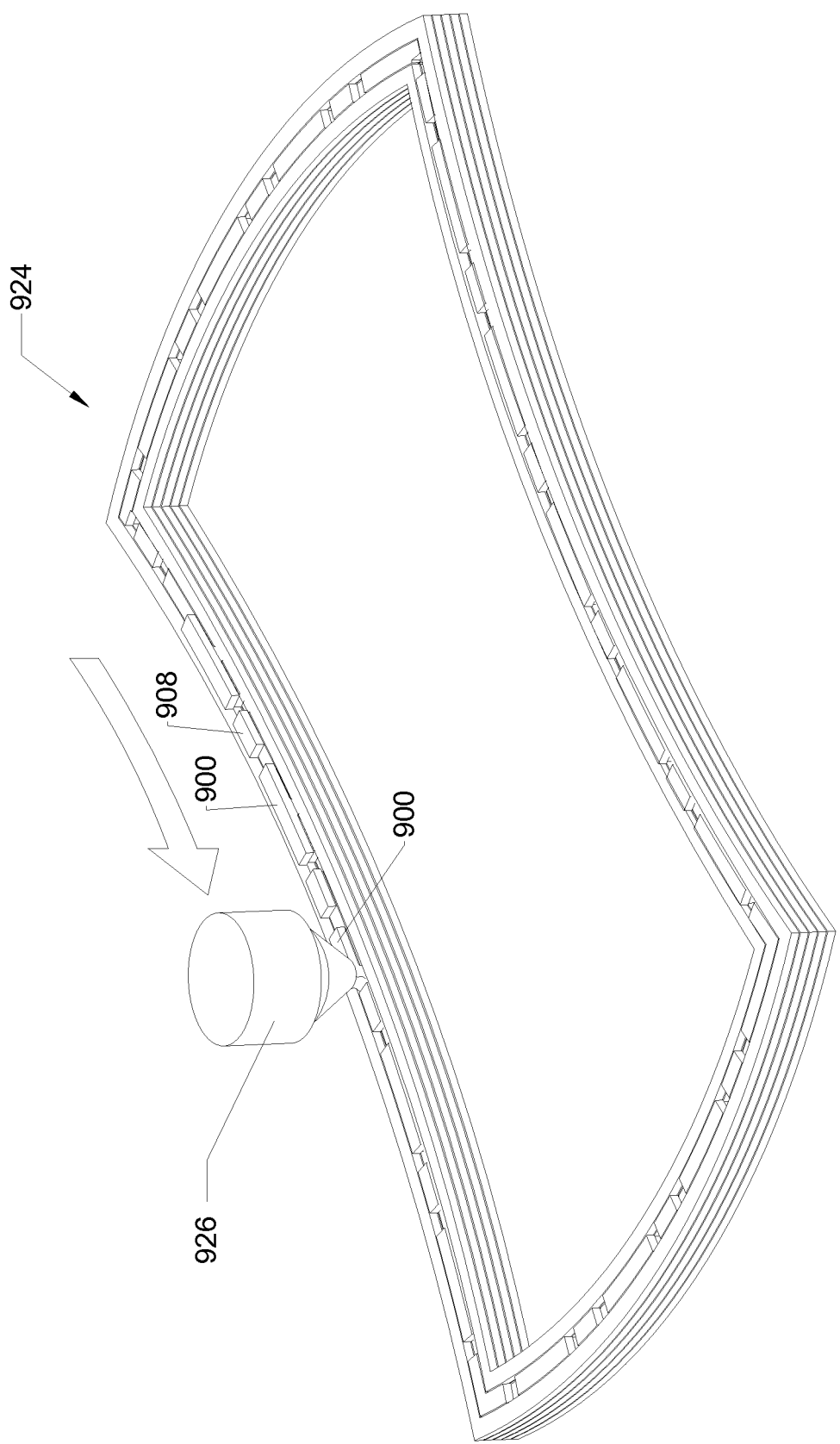

FIG. 9G shows interlocking partial layers 924 being formed by a moving extruder nozzle 926. Nozzle 926 is shown forming a next layer of filament elements 900 and 908. External and internal filaments are not shown for clarity.

Figure 9H:
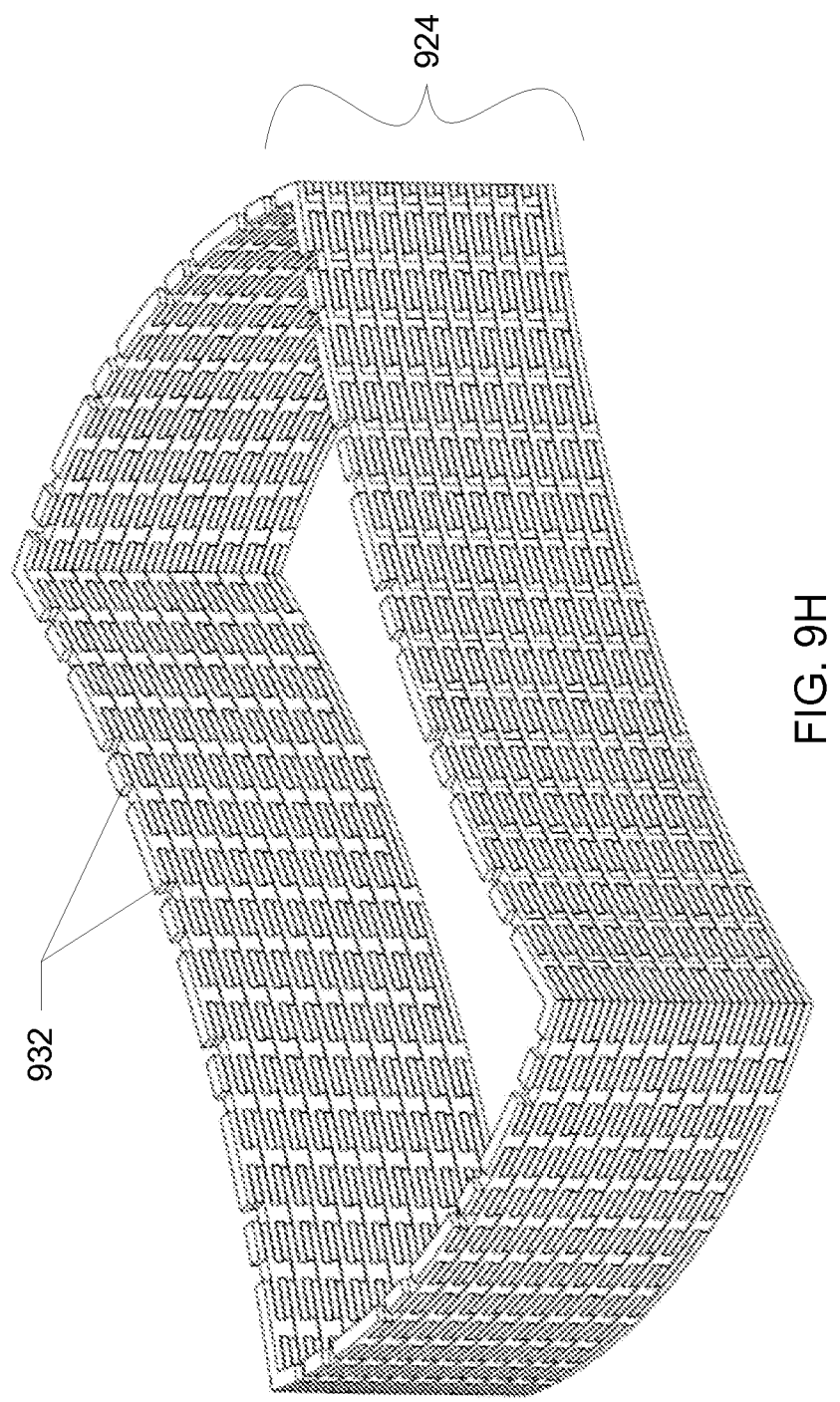

FIG. 9H shows a larger structure of interlocking layers 924. External and internal filaments are not shown for clarity. Gaps 932 are visible.

Figure 9I:
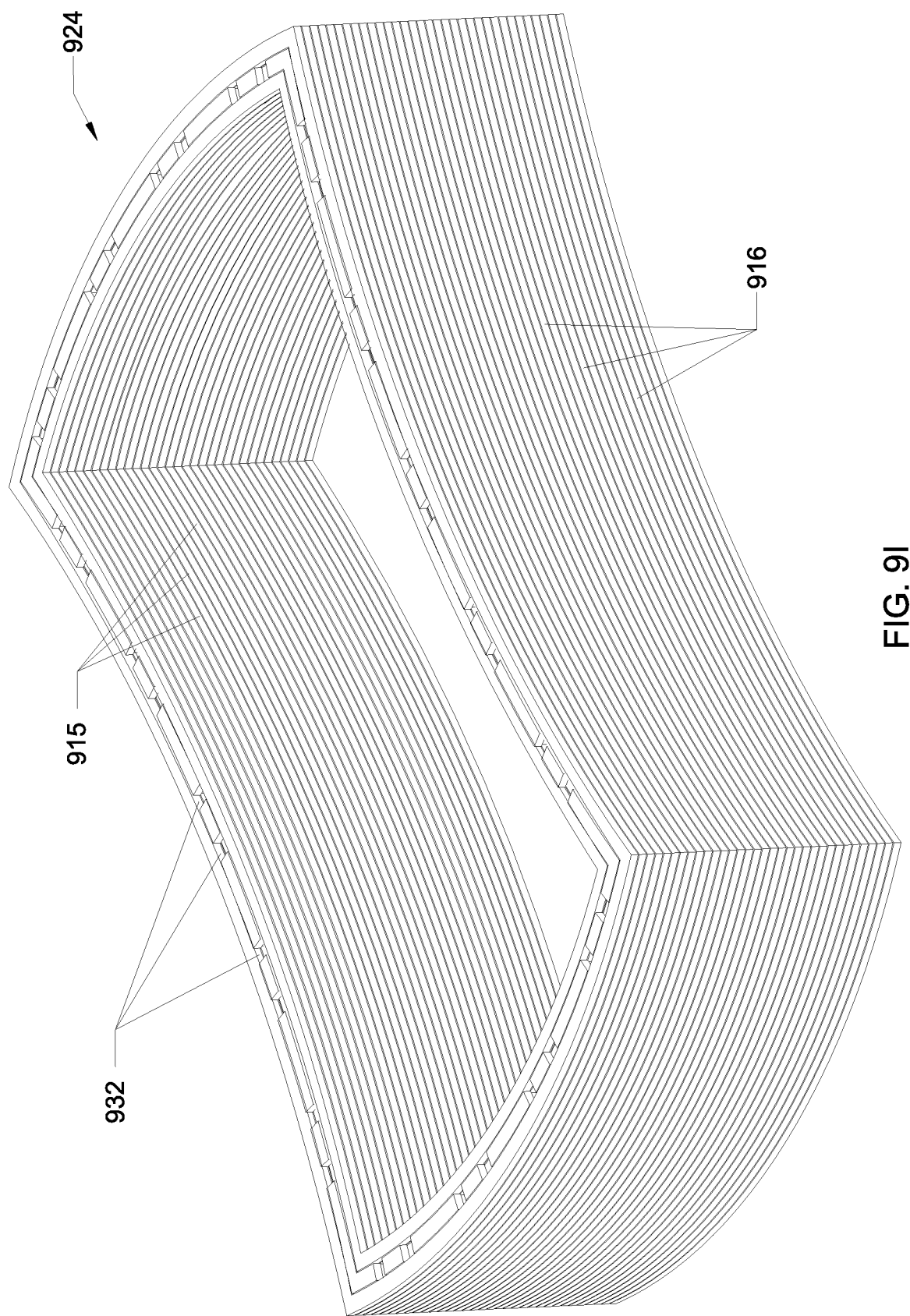

FIG. 9I shows a structure of complete interlocking vertical layers 924 with external perimeter filaments 916 and internal perimeter filaments 915 shown. Perimeter filaments 915 and 916 serve to create smooth, structural inner and outer surfaces. Gaps 932 are visible. Gaps 932 are provided for anchoring the next layer to be applied above.

Figure 9J:
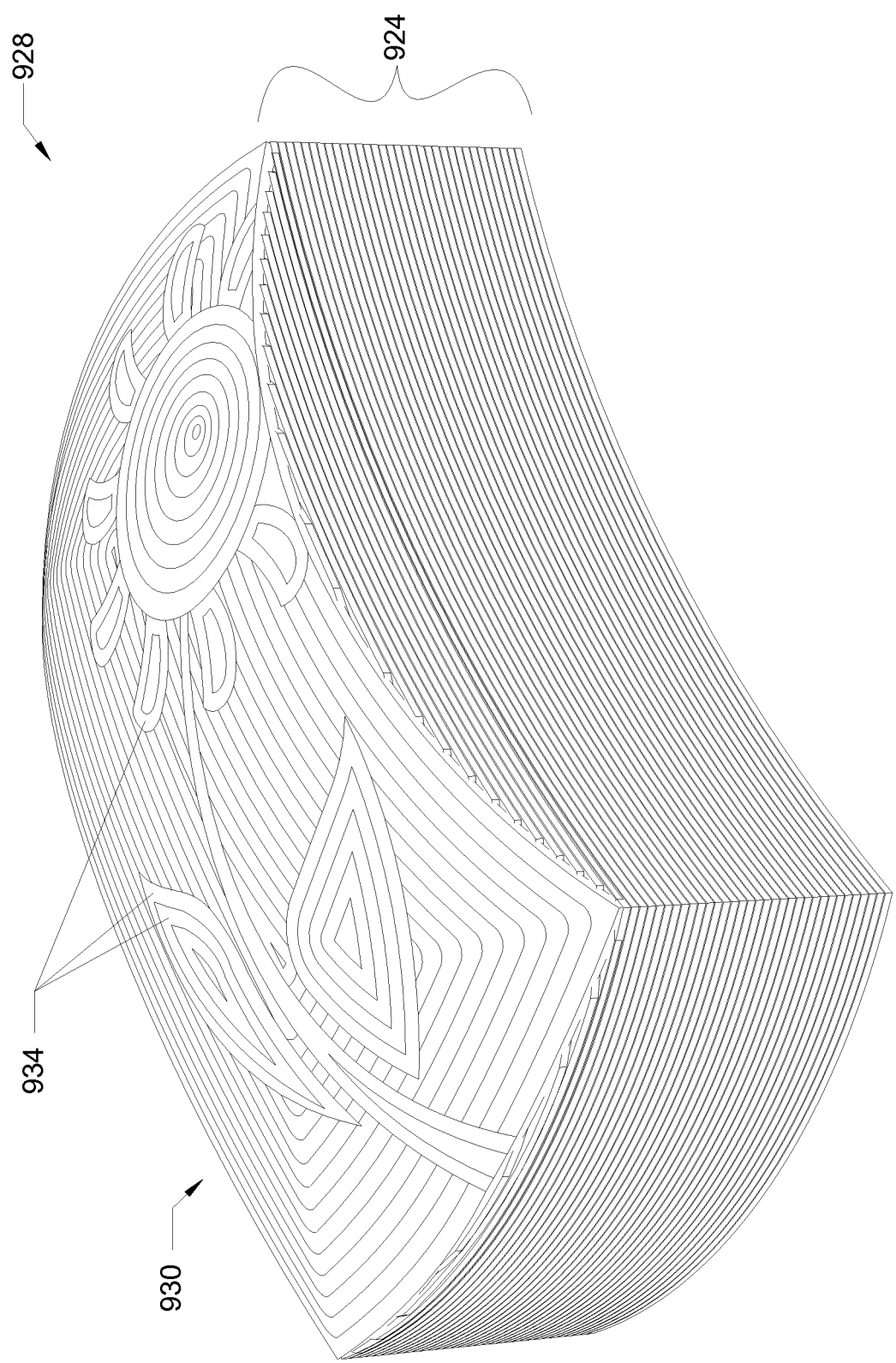
FIG. 9J shows an isometric view of an example completed part based on FIGS. 9A-9I.

FIG. 9J shows a completed part 928 made with improved FDM techniques and paths. Part 928 includes interlocking vertical layers 924 and non-planar upper surface filament pattern 930. In contrast to the stair-step surface 804 of FIG. 8A, filament pattern 930 more closely follows the ideal shape of part design 700 of FIG. 7. Additionally, filament pattern 930 includes shaped filaments 934, which are designed to follow the shape of graphic design elements 702 of ideal part design 700. Pattern 930 and shaped filaments 934 may include filaments of different colors and/or materials and are therefore able to represent visual graphic patterns much better than current FDM techniques.

Figure 9K:
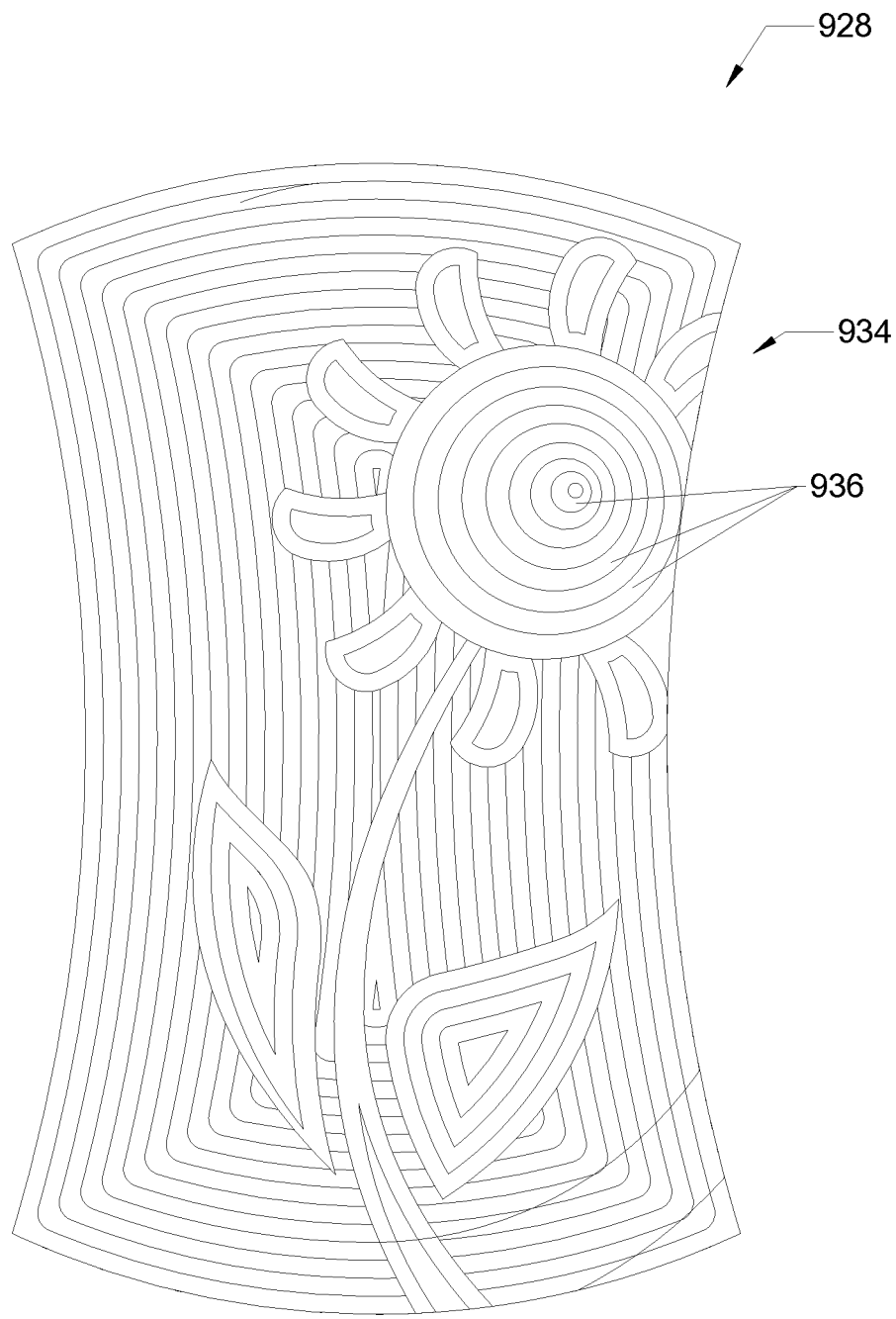
FIG. 9K shows a top view of the completed part in FIG. 9J.

FIG. 9K shows a top view of the completed part 928. Shaped filaments 934 include non-uniform width filaments 936. Filaments 936 have non-uniform cross section, even though they may have uniform thickness. Filaments 936 are created by depositing material along a path with a material deposition flowrate that varies along the path or profile of the filament. The material deposition flowrate is determined by a path planning algorithm that dynamically changes the flowrate according to the instantaneous, changing area of the filament to be created along the path.

Figure 10:
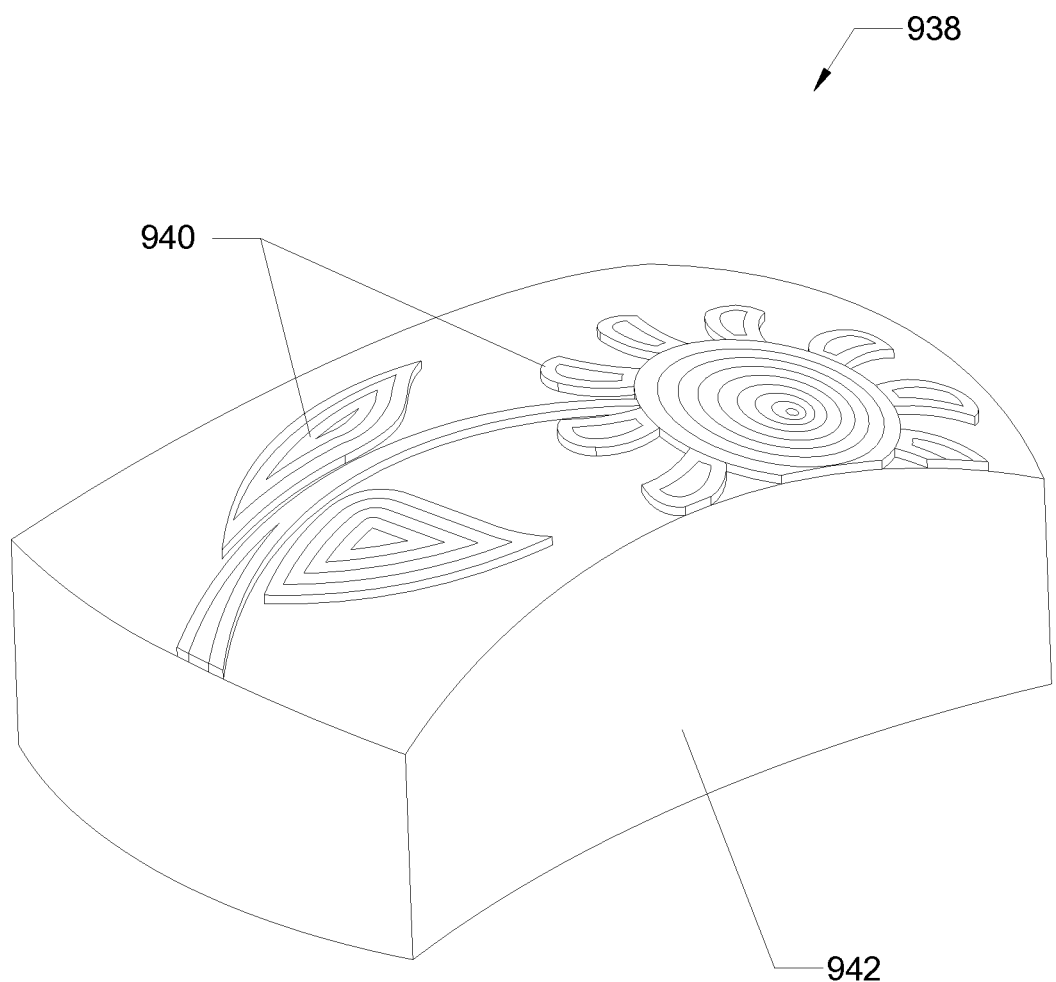
FIG. 10 shows an isometric view of an example part fabricated by depositing material with FDM processes onto a prefabricated base part.

FIG. 10 shows a part 938 created by applying filaments 940 to a base part 942. Filaments 940 may be applied by an FDM process. Base part 942 may be a pre-made molded part or a part made by another 3D printing technique such as SLS (selective laser sintering) or SLA (stereolithography) or it may be made by some other plastic manufacturing method or it may be wood or metal or some other material. Base part 942 may be a mass produced part where many identical base parts are produced, or base part 942 may be a unique, bespoke, or custom part. Filaments 940 may be applied after base part 942 is made. The pattern of filaments 940 may be custom, unique, or bespoke even if base part 940 is mass-produced.

Figure 11A:
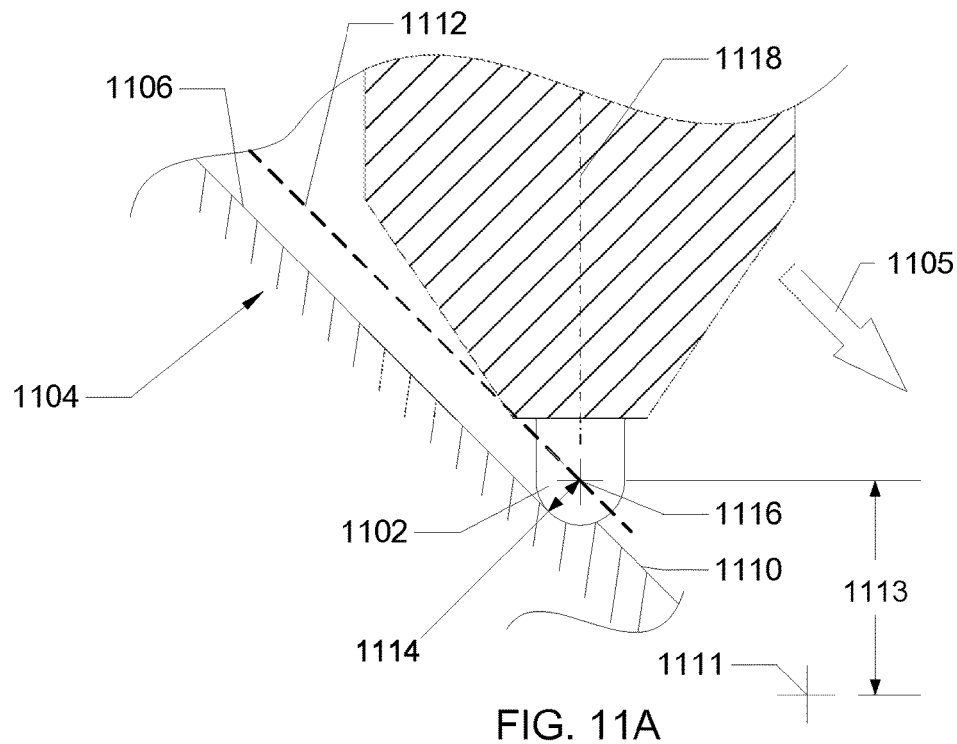
FIGS. 11A and 11B illustrate an example process of a milling machine milling a slope with a ball endmill.
Figure 11B:
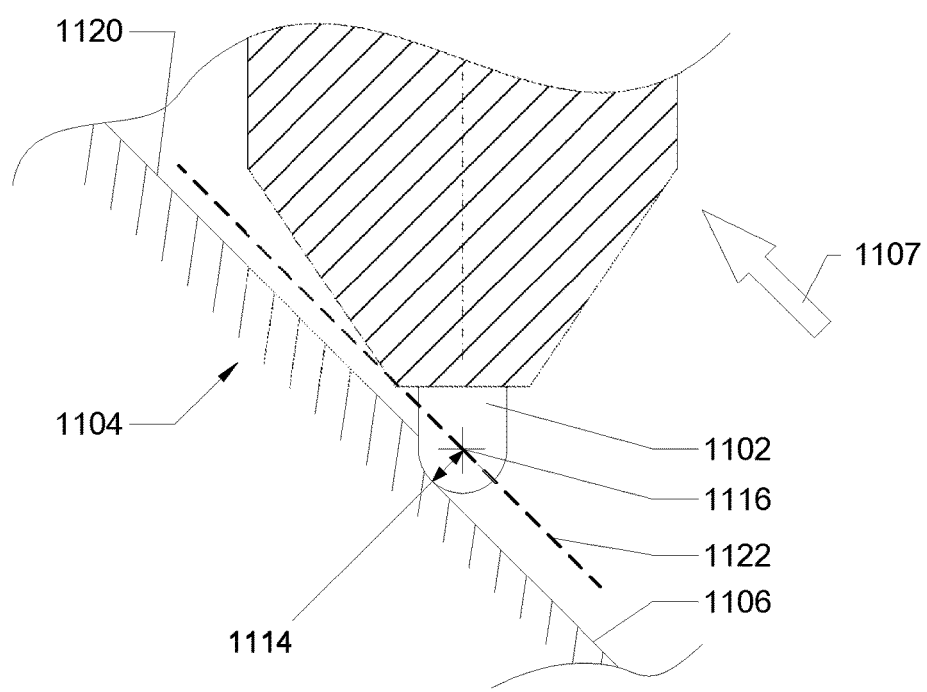

Referring now to FIGS. 11A and 11B, FIG. 11A illustrates a cross section view of a typical process of a milling cutter 1102 milling a part 1104 to create a desired sloped surface shape 1106. The cutter 1102 may spin about an axis 1118. In some cases, the milling cutter 1102 may be a ball endmill as shown in this figure. A ball endmill is a milling cutter that nominally cuts a semi-spherical shape when rotated in contact with a part. Milling cutter 1102 may be held in a holder.

As illustrated, an initial material surface 1110 is being removed by the cutter 1102 as it moves over the part 1104 with a direction of motion indicated by an arrow 1105 in the figure. Initial material surface 1110 is removed to create a desired surface shape 1106. To create the desired surface shape 1106, the cutter 1102 is moved such that a reference point 1116 follows a path 1112. In this case reference point 1116 lies at the center of the effective spherical shape of the end of the cutter 1102, and the path 1112 is chosen such that the reference point 1116 maintains a constant normal offset distance 1114 from the desired surface shape 1106. Distance 1114 is measured normal to (perpendicular to) the desired surface shape 1106. The position of the cutter 1102 may also be measured, planned, or tracked as distances or coordinates from an origin 1111, for example based on a vertical coordinate 1113.

In FIG. 11A, the cutter 1102 is shown travelling along the path 1112 which goes "downhill," i.e., in a downward sloping direction, as is conventionally done. Cutters may have different shapes such as flat endmills, bull-nose endmills, form cutters (such as chamfer cutters and ogee shapes), among others. In all such cases, a path similar to the path 1112 is created so that the cutter is moved such that the point on the cutter that protrudes the farthest toward the part when measured in a direction orthogonal to the desired surface (going from the cutter toward the desired surface) follows the desired surface. For some cutter shapes such as bull-nose endmills, the point on the cutter that creates the desired surface or the reference point used to create the path may change along the path trajectory.

FIG. 11B illustrates a cross section of the cutter 1102 milling a desired surface shape 1106 on a different portion of the part 1104. Here, the cutter 1102 is moving "uphill," i.e., moving along an upward slope in FIG. 11B along an arrow 1107. The cutter 1102 is shown removing an initial material surface 1120 in order to create the desired surface shape 1106. However, the cutter 1102 is moving uphill in FIG. 11B whereas it was moving downhill in FIG. 11A. The cutter 1102 travels along a path 1122 that maintains a constant normal distance 1114 between the desired surface shape 1106 and the reference point 1116 on cutter 1102. The path 1122 in FIG. 11B showing uphill motion of cutter 1102 to create desired surface shape 1106 may have the same path shape as path 1112 of FIG. 11A in which the cutter 1102 moves downhill to create the same desired surface shape 1106. The shapes of path 1122 and path 1112 may be the same even though the direction of motion of the cutter is different. The direction of motion, uphill or downhill therefore does not affect the shape of the required path to create a desired surface shape with a spinning milling cutter such as 1102. Direction-independence of path shape is true regardless of the shape of the spinning milling cutter.

Subtractive processes, such as the milling processes of FIGS. 11A and 11B, were the standard method of creating bespoke surface shapes prior to the advent of additive manufacturing such as 3D printing. Additive processes such as 3D printing have thus far primarily added material in horizontal planar layers. However, there may be advantages to adding material in non-horizontal or non-planar layers or other non-planar structures. The path planning for additive manufacturing and material deposition processes with non-horizontal paths and non-horizontal desired surfaces may be different than path planning for subtractive processes such as milling of non-horizontal paths and desired surface shapes to achieve desired or optimal results.

Figure 12A:
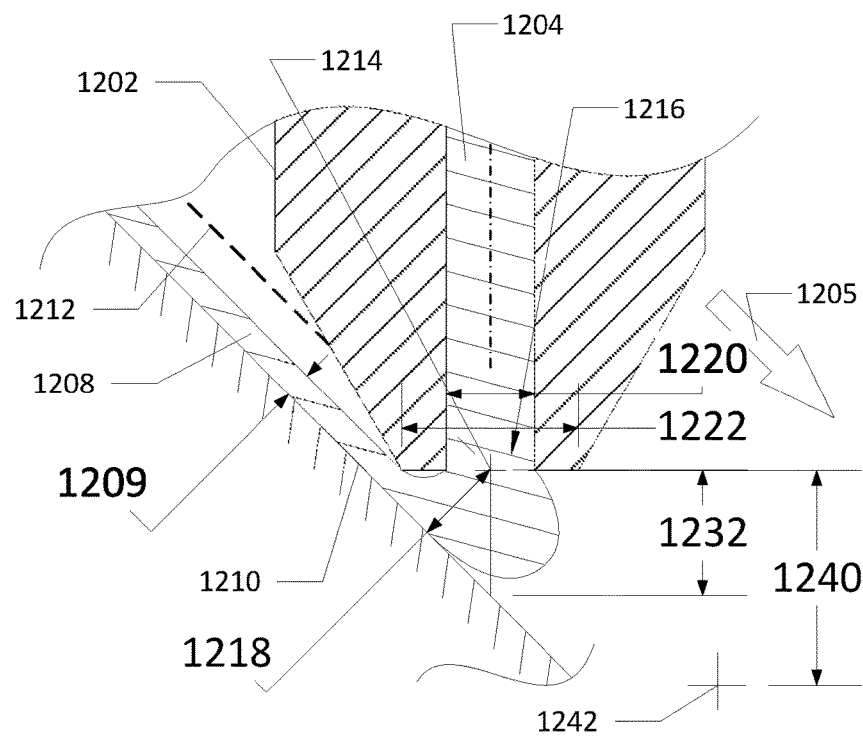
FIGS. 12A and 12B show a nozzle depositing material on a sloped surface.

Referring now to FIG. 12A, a nozzle 1202 is shown depositing material 1204 on a sloped part surface 1210 with a motion of travel in a downward sloping direction along part surface 1210. The nozzle 1202 may be a nozzle or it may be a different material deposition system such as a welding tip or electrode, syringe, adhesive material deposition system, material solidification system, material curing system or material pump, or combinations thereof. A material deposition process shown in FIG. 12A results in a deposited material shape 1208. The nozzle 1202 has an exit orifice 1216 with an orifice exit dimension 1220. Orifice exit dimension 1220 may be a diameter or it may be a width dimension if exit orifice 1216 is non-circular. The nozzle 1202 has a nozzle tip outer dimension 1222, which may be greater than orifice exit dimension 1220. Nozzle tip outer dimension 1222 may be an outer diameter if the tip of the nozzle 1202 is circular (i.e., if the nozzle 1202 is a revolved shape such as cone or cylinder), or it may be a width dimension if the tip of the nozzle 1202 is non-circular. An arrow 1205 indicates the direction of motion of the nozzle 1202 relative to part surface 1210. In practice, the nozzle 1202 may move or part surface 1210 may be moved or combinations thereof to create relative motion. A reference point 1214 is shown at the center of a material exit orifice 1216. In conventional material deposition, 3D printing processes and additive manufacturing, material is typically deposited in horizontal, flat layers, or planes.

In conventional material deposition processes, a nozzle is typically moved such that a reference point such as point 1214 is moved at a constant distance away from a surface such as part surface 1210 that material is being deposited onto. In conventional material deposition processes, the distance away from the surface onto which material is deposited, and therefore the path of nozzle motion, is independent of direction, similar to the way that distance 1114 is direction-independent in FIGS. 11A and 11B. The position of the nozzle 1202 may also be measured, planned, or tracked as a vertical distance 1232 from part surface 1210 or as a horizontal coordinate (not shown) and a vertical coordinate 1240 representing a vertical distance from an origin 1242. A desired material shape 1212 is shown in FIG. 12A as a dashed line. A resulting deposited material thickness 1209 is also shown. As illustrated, the nozzle 1202 is being moved along a path such that a distance 1218 from reference point 1214 to part surface 1210 is independent of whether the nozzle 1202 is moving uphill or downhill, i.e., independent of the slope of the path followed by the nozzle 1202. As a result, deposited material shape 1208 does not match desired material shape 1212, and the resulting deposited material thickness 1209 is not correct, i.e., is not equal to a desired result. This variation may occur because, as illustrated, a portion of the nozzle 1202 scrapes the depositing material 1204 as it exits the exit orifice 1216.

Figure 12B:
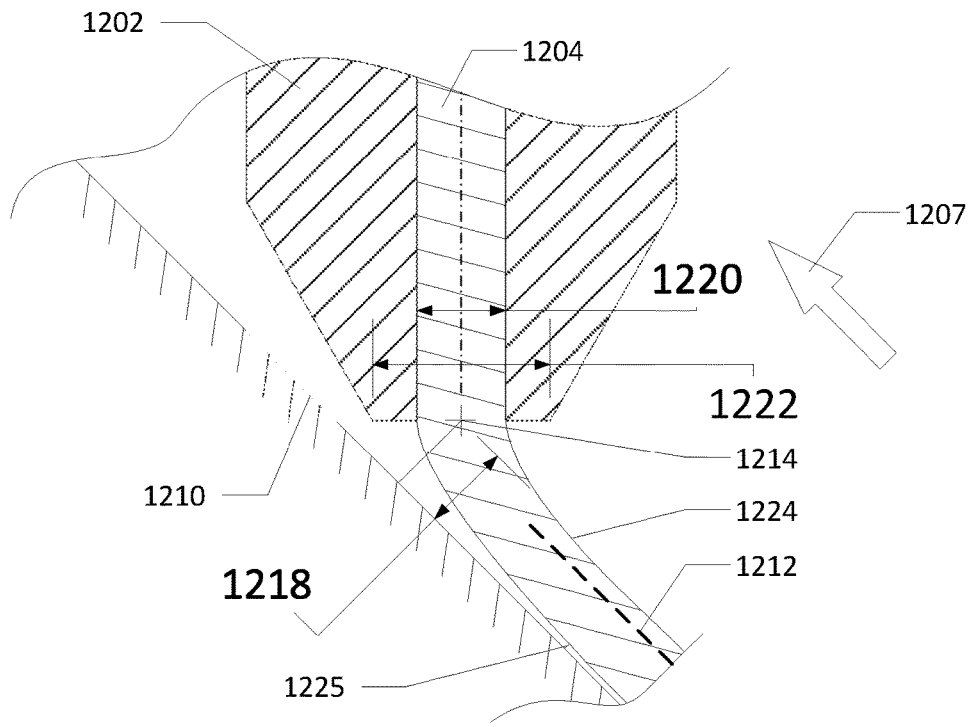

FIG. 12B shows the nozzle 1202 depositing material 1204 on the sloped part surface 1210 with a motion of travel in an upward direction along the part surface 1210. The nozzle 1202 is the same as the nozzle 1202 of FIG. 12A except that the nozzle 1202 is now shown moving uphill relative to the part surface 1210 instead of downhill as in FIG. 12A. The nozzle 1202 may be a nozzle or it may be a material deposition system such as a welding tip or electrode, syringe, adhesive material deposition system, material solidification system, material curing system or material pump or combinations thereof. A material deposition process shown in FIG. 12B can result in a deposited material shape 1224.

FIG. 12B shows an arrow 1207 to indicate the direction of motion of the nozzle 1202 relative to the part surface 1210. In practice, the nozzle 1202 may move or the part surface 1210 may be moved or combinations thereof. The desired material shape 1212 is shown as a dashed line. In FIG. 12B, the nozzle 1202 is being moved along a path such that distance 1218 from reference point 1214 to part surface 1210 is independent of whether the nozzle 1202 is moving uphill or downhill, i.e., independent of the slope of the path that the nozzle 1202 is moving along. As a result, deposited material shape 1224 does not match desired material shape 1212. In addition, deposited material making up shape 1224 may not meet or adhere well to part surface 1210 and may leave a gap 1226 between material shape 1224 and part surface 1210. The resulting deposited material shape 1224 of FIG. 12B created when the nozzle 1202 deposits material 1204 while moving uphill is different than the deposited material shape 1208 of FIG. 12A that is created when the nozzle 1202 deposits material 1204 while moving downhill, despite the path followed and distance 1218 from part surface 1210 to nozzle reference point 1214 being the same in both cases. The material shape created by a material deposition process on a non-horizontal surface or path may therefore be dependent on the direction of motion of a nozzle or deposition system or the sign (positive, zero or negative) of the slope of the path followed by the nozzle or material deposition system. This slope or direction dependency of the final result is different than conventional subtractive processes such as milling and also different from conventional additive manufacturing processes such as FDM in which material is deposited in horizontal layers and the thickness of the resulting material is generally not path, slope, or direction dependent. The path of the nozzle 1202 may also be measured with respect to the desired part shape 1212 rather than the part surface shape 1210; the resulting conclusions of path and slope dependency and resulting deposited material shapes are the same.

Figure 12C:
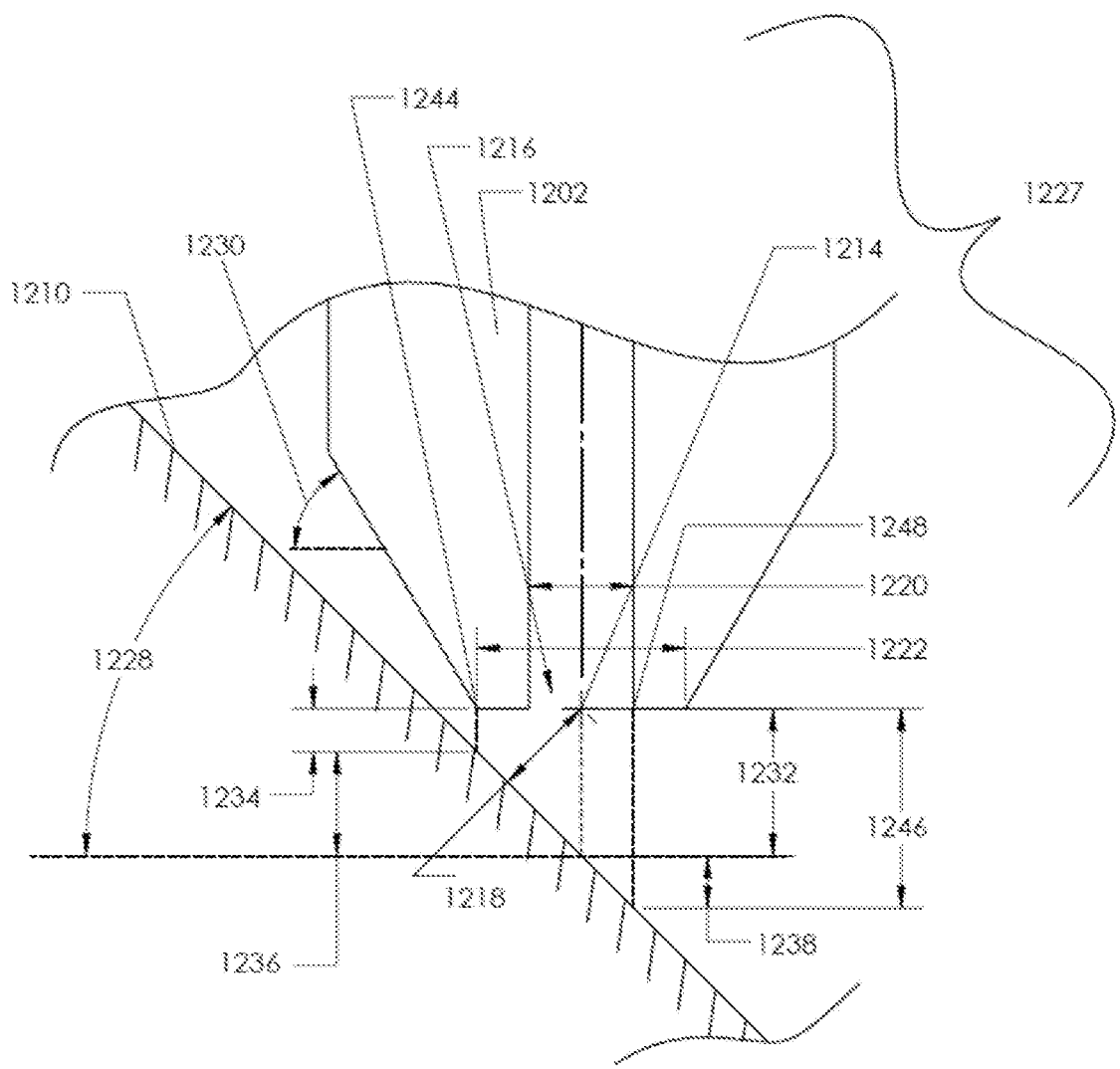
FIG. 12C shows a cross section view and related geometries of the nozzle and sloped surface in FIGS. 12A-B.

Referring also to FIG. 12C, a cross section view of a generalized material deposition system 1227 is shown. The nozzle 1202 may have a round, cylindrical, or conical or rotated form, or it may have a triangular, square, hexagonal or prismatic form. The part surface shape 1210 has an angle 1228 relative to horizontal. The nozzle 1202 may also have an effective shape angle 1230 relative to horizontal. Angle 1230 may in practice be any angle, but for the purposes of this example may be greater than or equal to angle 1228 so that a proximal point or edge 1244 on the nozzle 1202 which is the closest to part surface 1210 is at a closest edge of nozzle tip dimension 1222. As in FIGS. 12A and 12B, nozzle reference point 1214 lies at the center of the nozzle exit orifice 1216. The position and path of the nozzle 1202 may be measured, tracked, or planned according to the distance 1218 between reference point 1214 and part surface 1210 measured normal to (perpendicular to) part surface 1210 as in FIGS. 12A and 12B. Also as in FIGS. 12A and 12B, distance 1232 represents the vertical distance between point 1214 and part surface 1210. The position and path of the nozzle 1202 may also be measured, tracked, or planned via distance 1232. A distance 1234 represents a vertical distance from point 1244 to part surface 1210. A distance 1236 represents the difference between distance 1232 and distance 1234, which may also correspond to the difference between the vertical distance between the center of the tip of the nozzle 1202 and part surface 1210 and the vertical distance between closest point 1244 on the tip of the nozzle 1202 and part surface 1210. A distance 1246 represents the vertical distance between a distal point or edge 1248 on nozzle exit orifice 1216 that is the farthest point on nozzle exit orifice 1216 from part surface 1210. A distance 1238 represents the difference between distance 1246 and distance 1232, which may also be the difference between the vertical distance of the center of the tip of the nozzle 1202 and part surface 1210 and the vertical distance of the farthest point on exit orifice 1216 to part surface 1210.

The geometry of the system 1227 as illustrated in FIG. 12C may be used to calculate correction factors for the position and path of the nozzle 1202 or other material deposition system such that with correction factors applied, the resulting deposited material thickness may be similar or the same when the nozzle travels downhill or uphill or horizontally. In one method of correcting the position or path of the nozzle 1202, corrections may be made in the following way: a first nominal path or set of positions for the nozzle 1202 is computed independent of the direction of travel of the nozzle 1202 or the slope of the path of the nozzle 1202. The first nominal path may be similar or equal to path positions represented by dimension 1218 in FIGS. 12A and 12B and may be calculated by finding positions or a path for the nozzle 1202 such that dimension 1218 is kept constant along the first nominal path. Then a second path may be created by adjusting vertical position values (such as dimension 1232 or coordinate 1240 in FIG. 12A) by an amount dependent on the slope of the path of the nozzle 1202. The slope of the path may be defined as vertical distance moved over an interval divided by horizontal distance moved over the same interval, or as rate of instantaneous vertical motion divided by rate of instantaneous horizontal motion.

When the nozzle 1202 is travelling downhill, i.e., when its path has a negative slope, the vertical position of the nozzle 1202 at points along the second path may be adjusted such that a corrected version of distance 1234 may be equal to the dimension 1232 from respective points in the first nominal path. This is because when the nozzle 1202 travels downhill, the point 1244 may determine the thickness of the resulting deposited material.

When the nozzle 1202 is travelling uphill, i.e., when its path has a positive slope, the vertical position of the nozzle 1202 for the second path may be adjusted such that the corrected distance 1246 for the second path may be equal to the dimension 1232 as calculated for each point in the first nominal path. This is because when the nozzle 1202 travels uphill, the distal edge of the nozzle exit orifice as represented by the location of point 1248 may determine the thickness of the resulting deposited material.

In the case of downhill motion, a vertical coordinate or distance representing the vertical position of the nozzle 1202 in the second path may be found by adding the absolute value of dimension 1236 as calculated for each point of downhill (negative) slope on the first nominal path to dimension 1232 for each point on the first nominal path or to whatever other vertical coordinate is used for the first nominal path. The resulting second path will then be higher by an amount equal to the absolute value of dimension 1236 in areas with downhill slope.

In the case of uphill motion, a vertical coordinate or distance representing the vertical position of the nozzle 1202 in the second path may be found by subtracting the absolute value of dimension 1238 as calculated for each point of uphill (positive) slope on the first nominal path from dimension 1232 for each point on the first nominal path or from whatever other vertical coordinate is used for the first nominal path. The resulting second path will then be lower by an amount equal to the absolute value of dimension 1238 in areas with uphill slope.

In the case of zero slope (horizontal motion), no correction may be applied or a correction factor of zero may be found and subtracted from the first nominal path using the uphill calculation case with dimension 1238 equaling zero or the downhill calculation case with dimension 1236 equaling zero.

After the corrected path points have been found for points or regions of negative slope, positive slope and zero slope, the points or path regions may be combined in their respective path order to form a completed second path.

In some cases, the second path may be adjusted only for points that correspond to negative slope (i.e., without adjusting for points that correspond to positive slope). Alternatively, in some cases, the second path may be adjusted only for points that correspond to positive slope (i.e., without adjusting for points that correspond to negative slope).

In more detail, any two adjacent positions of the nozzle 1202 along a path of travel may be represented as cartesian coordinates (X1, Y1, Z1) for a first point and (X2, Y2, Z2) for a second point. The relative distance delta.XY between point1 and point2 as projected in the X-Y plane may be calculated as: delta.XY=SQRT((x2-x1)^2+(Y2-Y1)^2). Then for points where the path has negative slope, dimension 1236 which is used as the correcting factor between the first nominal path and the second path in areas of negative slope may be calculated as dimension_1236=ABS(((Z2-Z1)*dimension 1222/2)/delta.XY). Because the path has a negative slope in this case, the absolute value function is used to ensure a positive value for dimension 1238. For points where the path has positive slope, dimension 1238 which is used as the correcting factor between the first nominal path and the second path in areas of positive slope may be calculated as dimension_1238=((Z2-Z1)*dimension 1220/2)/delta.XY. Because the path has a positive slope in this case, Z1 will be less than Z2 and this calculation will yield a positive value for dimension 1238.

Another way to calculate a correction factors dimension 1236 and 1238 is to use the trigonometric tangent of angle 1228, where angle 1228 is defined as negative for downhill nozzle motion (negative slope) as shown in FIG. 12A and positive for uphill motion (positive slope) as shown in FIG. 12B. An alternate corrected value calculation for dimension 1238 for points of negative slope on a path for the nozzle 1202 may then be expressed as (−1*(dimension 1222/2)*tan(angle_1228)). An alternate corrected value calculation for dimension 1238 for all points on a path for the nozzle 1202 with positive slope may then be expressed as: dimension_1238=(dimension 1220/2)*tan(angle_1228)).

A first partial second path consisting of corrected values for distance 1232 may be calculated for points with negative slope on the path of the nozzle 1202 as: distance_1232_corrected=distane_1232_from first nominal path+dimension_1236. A second partial second path consisting of corrected values for distance 1232 may be calculated for points with positive or zero slope on the path of the nozzle 1202 as: distance_1232_corrected= distance_1232_from first nominal path—dimension_1238. The first partial second path and second partial second paths may then be combined to create a complete slope-corrected second path.

A second corrected path may also be calculated using any vertical coordinate or representation of vertical distance for each point in place of dimension 1232, for example vertical distance 1240 to an origin 1242 in FIG. 12A may be used in which case an alternate corrected path calculation may be distance_1240 _corrected=distance_1240_from first nominal path+dimension_1236, for areas of negative slope, and distance_1240_corrected=distance_1240_from first nominal path—dimension_1238, for areas of zero or positive slope.

The second path or set of positions as calculated by any of the methods above or combinations thereof may then be used to guide the nozzle 1202 to deposit material on sloped or horizontal part surfaces and may achieve a more constant resulting thickness of deposited material regardless of the slope of part surface 1210 and may also achieve improved adhesion of deposited material. This is an improved result compared to the inconsistent thickness of resulting deposited material shown in FIGS. 12A and 12B and the possible poor adhesion or gap 1226 as shown in FIG. 12B. Additional correction factors may also be applied, for example points on paths with positive slope may be adjusted downward even more by subtracting an optional base amount times an optional factor times the positive slope value from the Z coordinate values of points in the second path in order to promote further improved adhesion when the nozzle 1202 is traveling along a path with positive slope. Paths with upward, downward, or horizontal slopes may be further adjusted upward or downward to change or improve surface finish, texture, fill factor, density or fusing of deposited material. Additional adjustments may be made by calculating a third path or by including the calculations along with the initial slope adjustments in the process of creating the second path. Path adjustments do not need to be symmetric for paths of positive and negative slopes. Improvements to deposited material thickness, adhesion, surface finish, texture, fill factor, density, and material fusing may be obtained by adjusting paths with positive slopes differently than paths with negative slopes.

The calculation of correction factors for the position and path of the nozzle 1202, as described in the implementations above, may be performed and implemented by the controller 104. In some cases, a separate path planning system 130 (see FIG. 1) may perform the calculation of the correction factors and generate corresponding machine control instructions for controlling the movement path of the nozzle. The controller 104 may then receive and interpret such instructions, which incorporate the correction factors, and implement them by controlling the nozzle to move accordingly. In some cases, a data transfer system 140 (see (FIG. 1) may be used to transfer the generated machine control instructions from the path planning system 130 to the controller. The path planning system 130 may be, for example, a separate computer that calculates the correction factors and the resulting nozzle path prior to the fabrication process.

Figure 13:
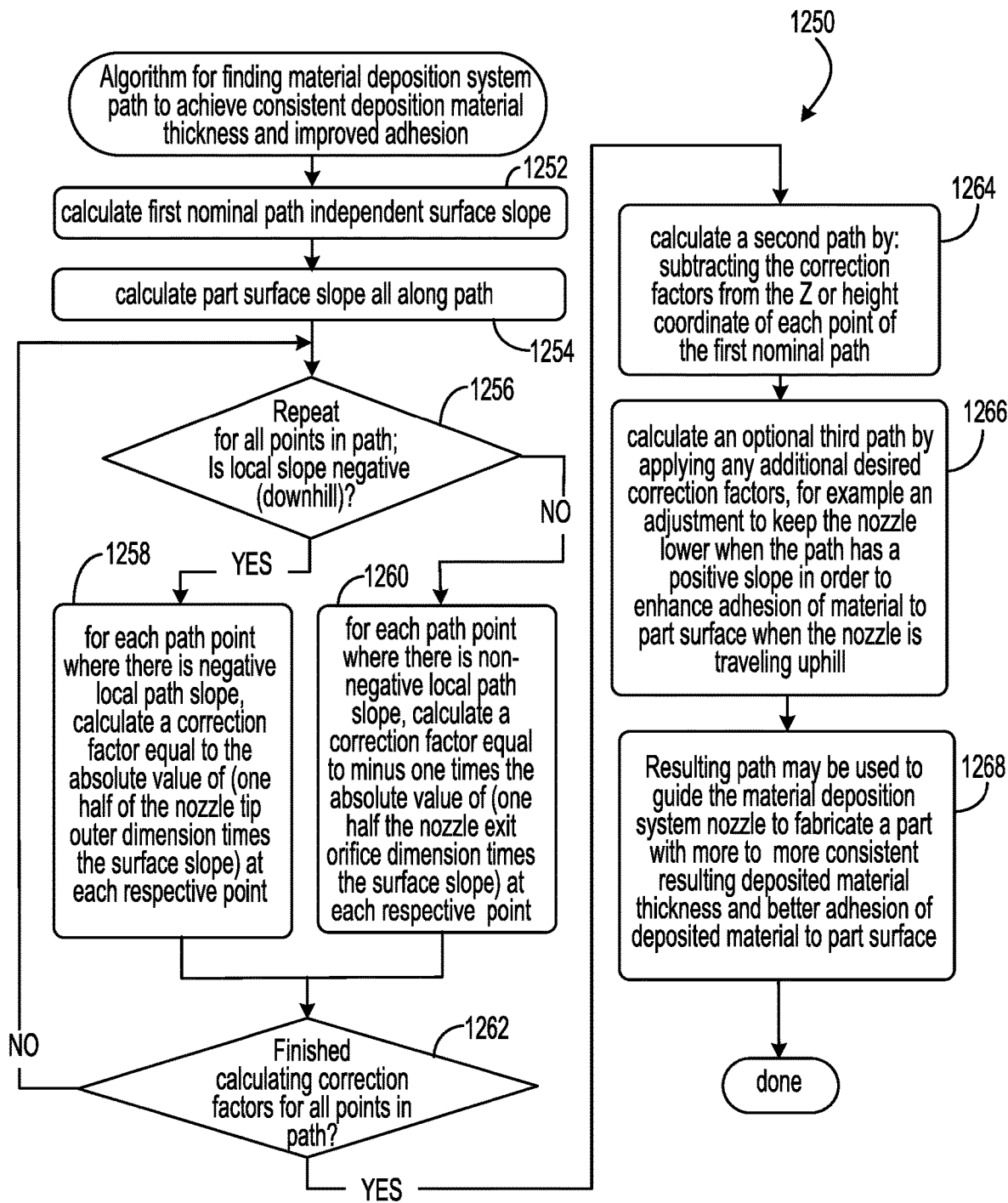
FIG. 13 shows a flowchart of an example path creation method for material deposition according to an implementation of this disclosure.

FIG. 13 shows a flowchart 1250 of an example of an algorithm for path correction and improved material adhesion for a material deposition system. In step 1252, a first nominal path is calculated independent of surface slope. The first nominal path may be made up of discrete points or it may include mathematical functions such as spline curves, polynomial curves, piecewise math functions, continuous math functions, or combinations thereof. Discrete points may be 3D Cartesian coordinates, or they may be 2D Cartesian coordinates. In some cases, the discrete points may be polar coordinates or spherical coordinates, or they may be 4D, 5D, 6D or higher level dimension coordinates, for example with additional dimensions containing information about extrusion ratio, color, material, density, rotational axis position, second rotational axis position, gimbal position, kinematic joint position, acceleration, velocity, mechanism stiffness, or mechanism precision at that point. In step 1254 the slope of the part surface onto which material is to be deposited is calculated for the path points, or a function for slope is found in the case of continuous or piecewise continuous paths.

In step 1256, in a set of repeated decisions for each point or region on the path, it may be determined if the local path slope is positive, negative, or zero. For each point or region on the path, if the local slope is negative, in step 1258, a correction factor may be calculated equal to the absolute value of (one half the nozzle tip outer dimension, for example a tip outer diameter or width, times the local part surface slope at that point). For each point or region on the path, if the local slope is non-negative, in step 1260, a correction factor may be calculated equal to minus one times the absolute value of (one half the nozzle exit orifice dimension, for example an exit orifice diameter or width, times the local part surface slope at that point). Correction factors for each point or region may be saved for use in later steps. In a repeated decision step 1262, it is decided whether correction factors have been calculated for all points or regions along the path. If correction factors have not been calculated for all points or regions on the path, step 1256 and the appropriate choice of steps 1258 or 1260 are repeated for the next path point or region. If correction factors have been calculated for all points or regions along the path, then step 1264 calculates a second path by subtracting the saved correction factors for each point or region along the path from the vertical coordinates of each point or region along the path. In an optional step 1266, an optional third path may be calculated by applying any additional desired correction factors for example additional adjustments to path vertical coordinates to keep the nozzle lower or closer to the part surface when the path has a positive slope in order to enhance adhesion of deposited material to the part surface when the nozzle is travelling uphill, or applying positive or negative adjustments to vertical path coordinates in order to enhance or change adhesion, texture, thickness, surface finish, fill factor or density of deposited material. In step 1268, the resulting path (the second or third path, whichever was final) may be used to guide the material deposition system which may include guiding a nozzle to fabricate a part with more consistent resulting deposited material thickness and better adhesion of deposited material to a part surface.

Figure 14A:
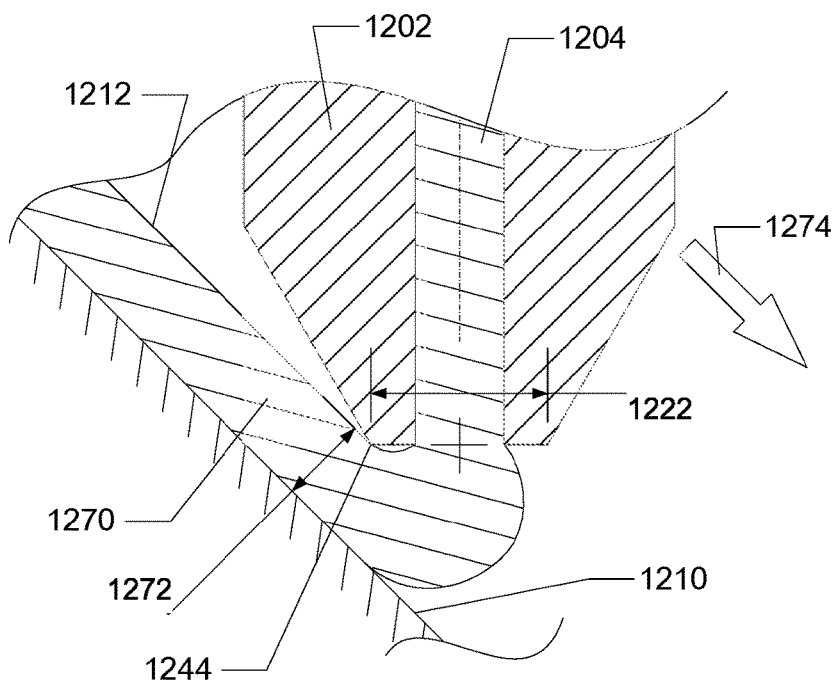
FIGS. 14A and 14B show a nozzle depositing material on a sloped surface with a path determined by a control algorithm according to an implementation of this disclosure.

FIG. 14A shows the nozzle 1202 depositing material 1204 onto part surface shape 1210 while moving along a path with negative slope and following a path with slope compensation as described above and in FIGS. 12C and 13. An arrow 1274 is included in the figure to show direction of motion of nozzle 1202. Because motion of nozzle 1202 shown in FIG. 14A is downhill (i.e., path with downward slope), deposited material thickness 1256 is largely determined by proximal point or edge 1244 of the tip of nozzle 1202. By following a path adjusted according to slope as described above, deposited material 1270 is able to match desired material shape 1212 and deposited material thickness 1272 matches a desired deposited material thickness even though nozzle 1202 is moving on a path with negative slope.

Figure 14B:
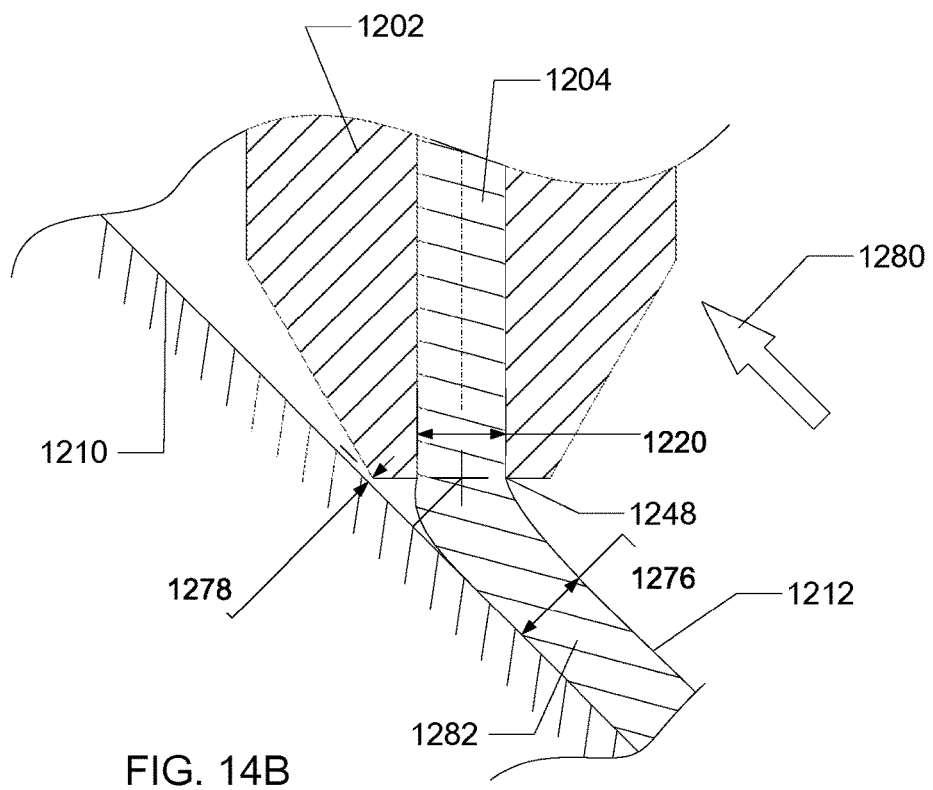

FIG. 14B shows the nozzle 1202 depositing material 1204 onto part surface shape 1210 while moving along a path with positive slope that has been slope-corrected according to the algorithms described above and in FIGS. 12C and 13. An arrow 1280 is included in the figure to show direction of motion of nozzle 1202. By following a path adjusted according to slope as described above, deposited material 1282 is able to match desired material shape 1212 and deposited material thickness 1276 matches a desired deposited material thickness even though nozzle 1202 is moving on a path with positive slope. Thickness of deposited material 1276 may be largely determined by point or nozzle exit orifice edge 1248. Additionally, the gap 1226 shown in FIG. 12B is not present in FIG. 14B and deposited material 1282 may have improved adhesion to part surface 1210. A distance 1278 is shown between nozzle 1202 and part surface 1210. Distance 1278 is desired to be positive, i.e., a gap is present, so that nozzle 1202 doesn't scrape or harm part surface 1210. Under certain geometry conditions path adjustments as described above and outlined in FIGS. 12C and 13 may result in distance 1278 being less than or equal to zero. Under such conditions, additional path adjustments may be applied to ensure that distance 1278 is greater than zero.

Figure 15A:
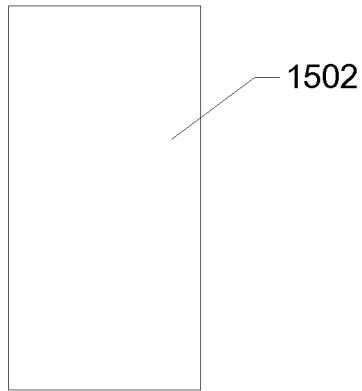
FIG. 15A shows a top view of an example desired part.
Figure 15C:
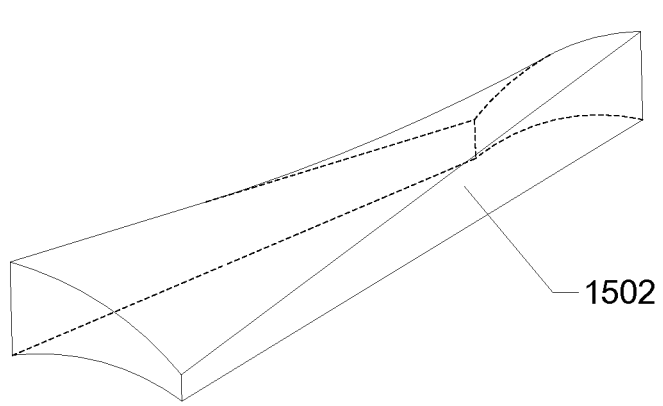
FIG. 15C shows an isometric view of the desired part.
Figure 15B:
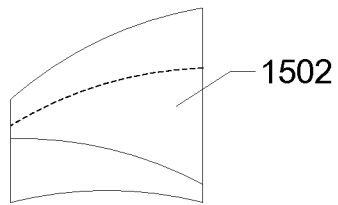
FIG. 15B shows a front view of the desired part.
Figure 15D:
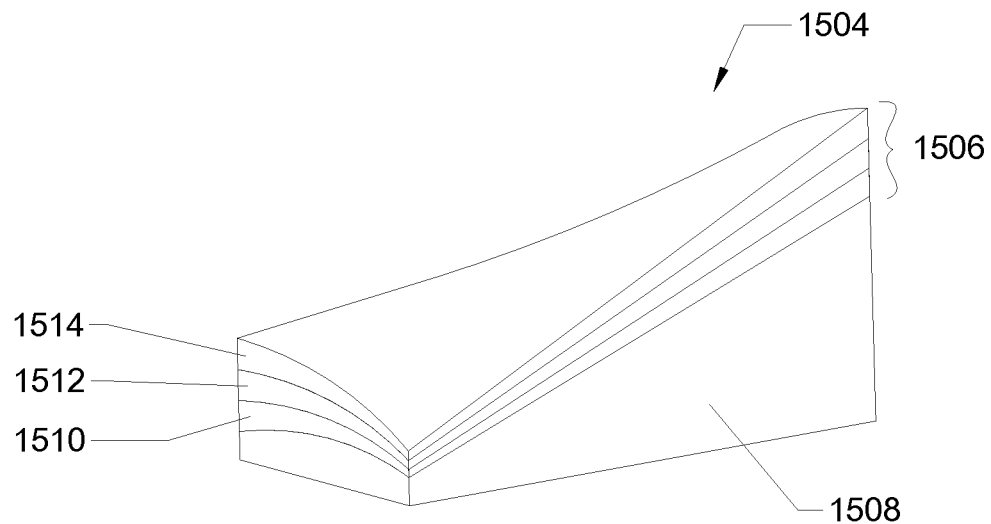
FIG. 15D shows a part shape divided into non-planar layers on top of a base part.

Referring now to FIGS. 15A-15D, FIG. 15A shows a top view of a desired part 1502, and FIG. 15B shows a front view of desired part 1502 (drawn with hidden lines dashed so that the non-planar shape of the part is visible), FIG. 15C shows an isometric view of the part 1502 (drawn with hidden lines dashed so that the non-planar shape of the part is visible), and FIG. 15D shows a part 1504 that is divided into non-planar layers 1506 on top of a base part 1508. The part 1504 represents a manufactured version of part 1502. The part 1504 is manufactured by depositing layers of material 1506 sequentially on top of the base part 1508. Layers 1506 may have non-uniform thickness, that is they may have a thickness that varies across each layer up to an optional maximum amount and down to an optional minimum amount. The part 1504 may be removed from the base part 1508 after fabrication of the part 1504 is complete. The base part 1508 may be a pre-fabricated part made by machining or molding or any 3D printing technique. The base part 1508 may be made of a material that releases from the material of the part 1504 or it may be a dissolvable or meltable material, or there may be an additional layer of release material (not shown) between the base part 1508 and the part 1504. Fabrication of the part 1504 by layers 1506 may be as follows: a layer 1510 is deposited first on top of the base part 1508, followed by a layer 1512, which is followed by a final layer 1514. The local number and thicknesses of layers 1506 may be chosen as follows: first a maximum layer thickness may be specified, then the local thickness of the outer shape of part 1504 may be divided by the maximum layer thickness. If there is no remainder from the division operation (i.e., the local thickness of the part 1504 is an integer multiple of the maximum layer thickness), then the result of the division operation may be used as the number of layers. If the remainder is non-zero, then the number of layers can be the result of the division operation plus one (i.e., an extra layer is added so that no layer is over the maximum thickness). In the manufacturing method described here, there may be a minimum thickness, but the layer thickness does not need to be constant across each layer and layers may have differing thicknesses from one another. In a simple case, layers may locally have the same thickness, and thickness may be determined by dividing the local thickness of the part 1504 by the number of layers determined for that location. The number of layers does not need to be constant across the area of the part 1504. For example, if the part 1502 is to be used as a shape on which to base the shape of the part 1504, the number of layers across the span of the part as shown in FIG. 15A does not need to be constant.

Using conventional FDM techniques, such parts would be fabricated in flat layers of constant thickness which do not represent the shape of the part very well. By using non-planar layers and layers of non-constant thickness as shown in FIG. 15D, however, the desired part shape 1502 can be better represented in the part 1504. The part 1504 may also be manufactured more quickly and be stronger.

Figure 15E:
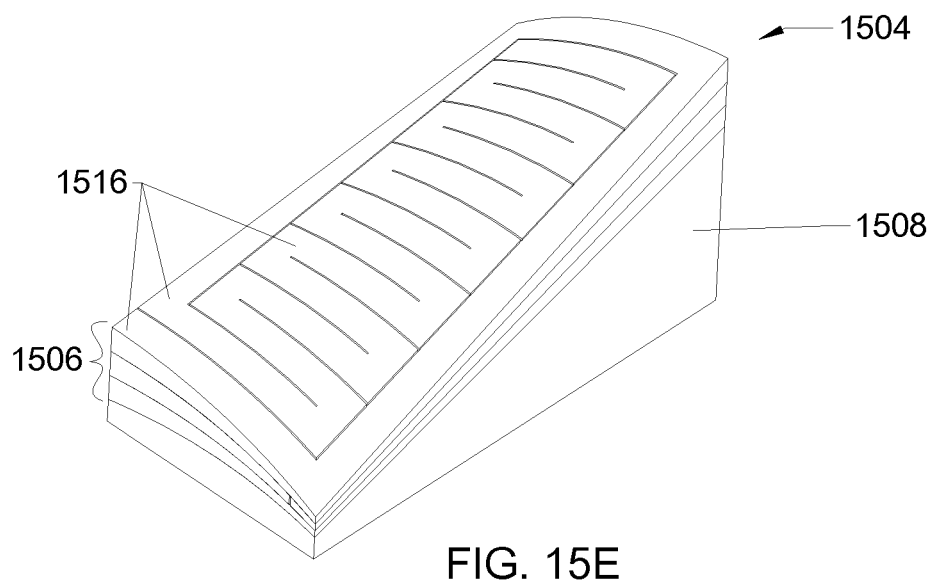
FIG. 15E shows a part shape divided into layers made up of material deposited along non-planar paths on top of a base part.

FIG. 15E shows layers 1506 as fabricated out of material filaments 1516 which have been deposited along non-horizontal and sometimes non-planar paths so they can follow the form of each layer. Filaments 1516 may be made by the FDM process. Filaments 1516 may have a constant width as shown in this figure, or they may have variable width. In this case, the deposition rate (volume of material deposited per linear distance moved by a material deposition device) changes along the filament length as it is created in order to achieve the varying filament thickness needed to match the varying thickness of layers 1506 while keeping the width constant as shown. Alternatively, the width of the filaments could be varied while keeping the material deposition rate constant in order to achieve a desired layer thickness. In some cases, both the width and material deposition rate can be varied along the length of the filament.

Figure 15F:
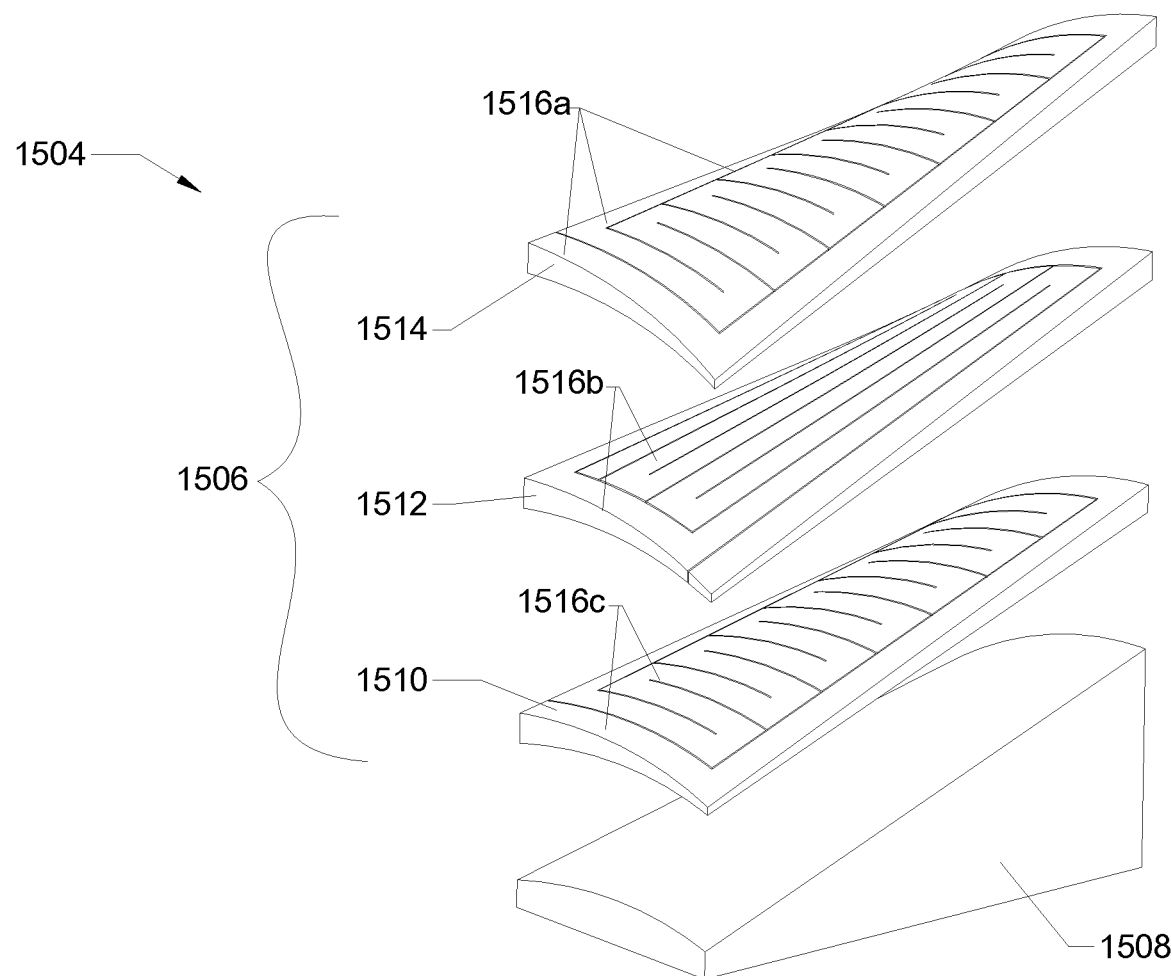
FIG. 15F shows an exploded view of the part construction of FIG. 15E.

FIG. 15F shows the part 1504 with layers 1506 exploded so the filament patterns 1516*a-c* are more clearly visible. Layers 1510 and 1514 have filaments 1516*a, c* arranged in a pattern that runs predominantly across the layer surface. The layer 1512 has filaments 1516*b* arranged in a pattern that is predominantly aligned with the long direction of the layer surface. Using filament patterns that cross or are close to orthogonal from one layer to another can create structural advantages. In practice, filaments may be arranged in other arrangements as well including filaments in all layers being aligned or filaments of every layer going in a different direction or some other arrangement.

Figure 15G:
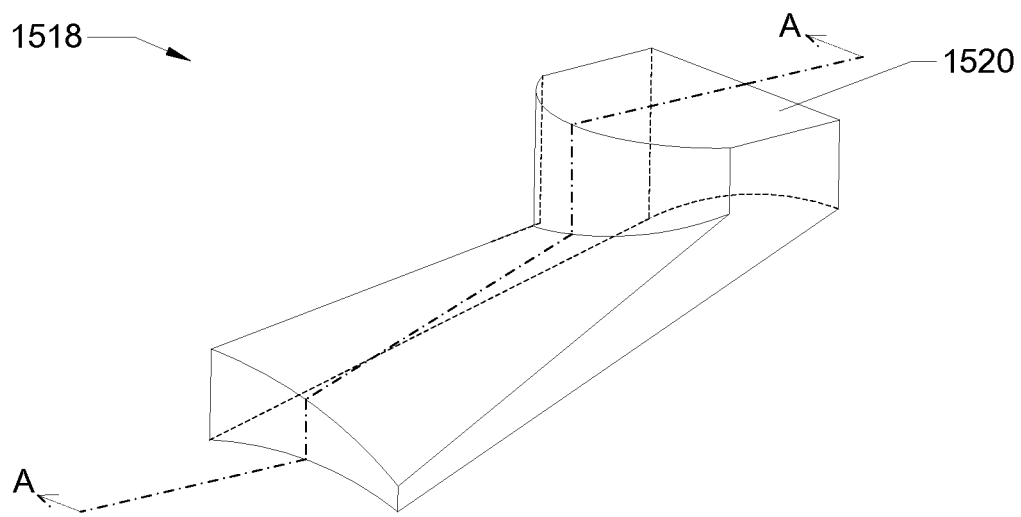
FIG. 15G shows an isometric view of another example desired part.

FIG. 15G shows an isometric view of a desired part 1518. Part 1518 is similar to part 1504 of FIGS. 15C-F except that it has a boss 1520 at one end which protrudes vertically from part 1518.

Figure 15H:
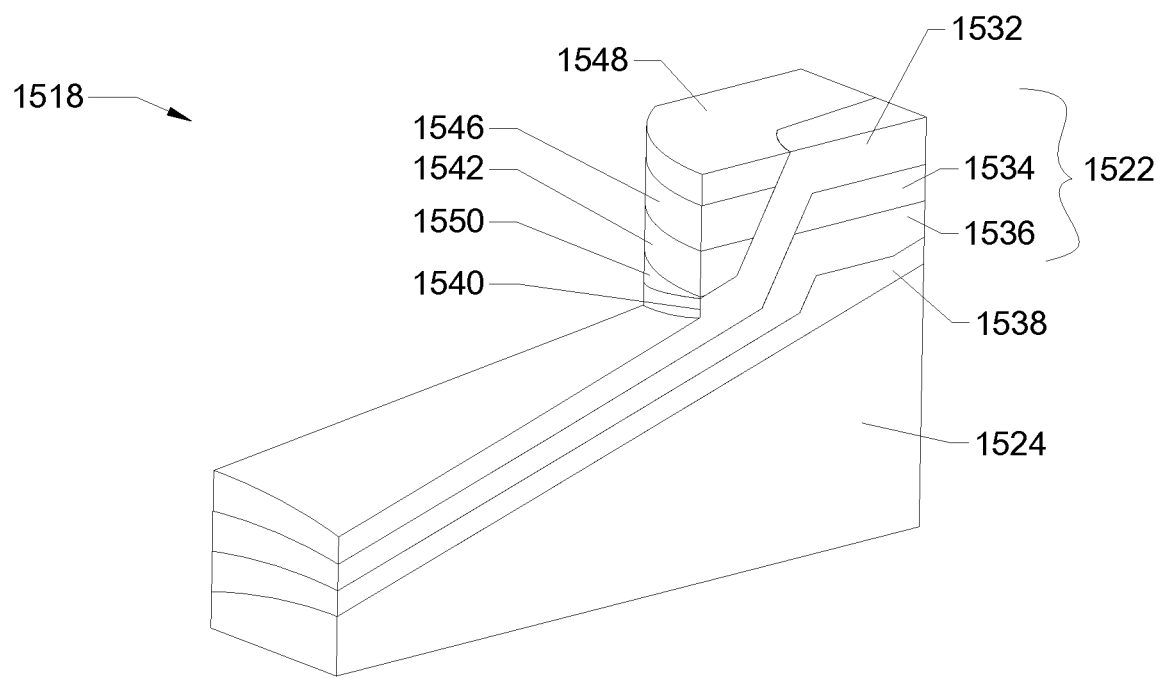
FIG. 15H shows an isometric section view of a part shape divided into nonplanar layers on top of a base part.

FIG. 15H shows an isometric section view, taken along section line A-A in FIG. 15G, of the part 1518 as divided into non-planar layers 1522 on top of a base part 1524.

Figure 15I:
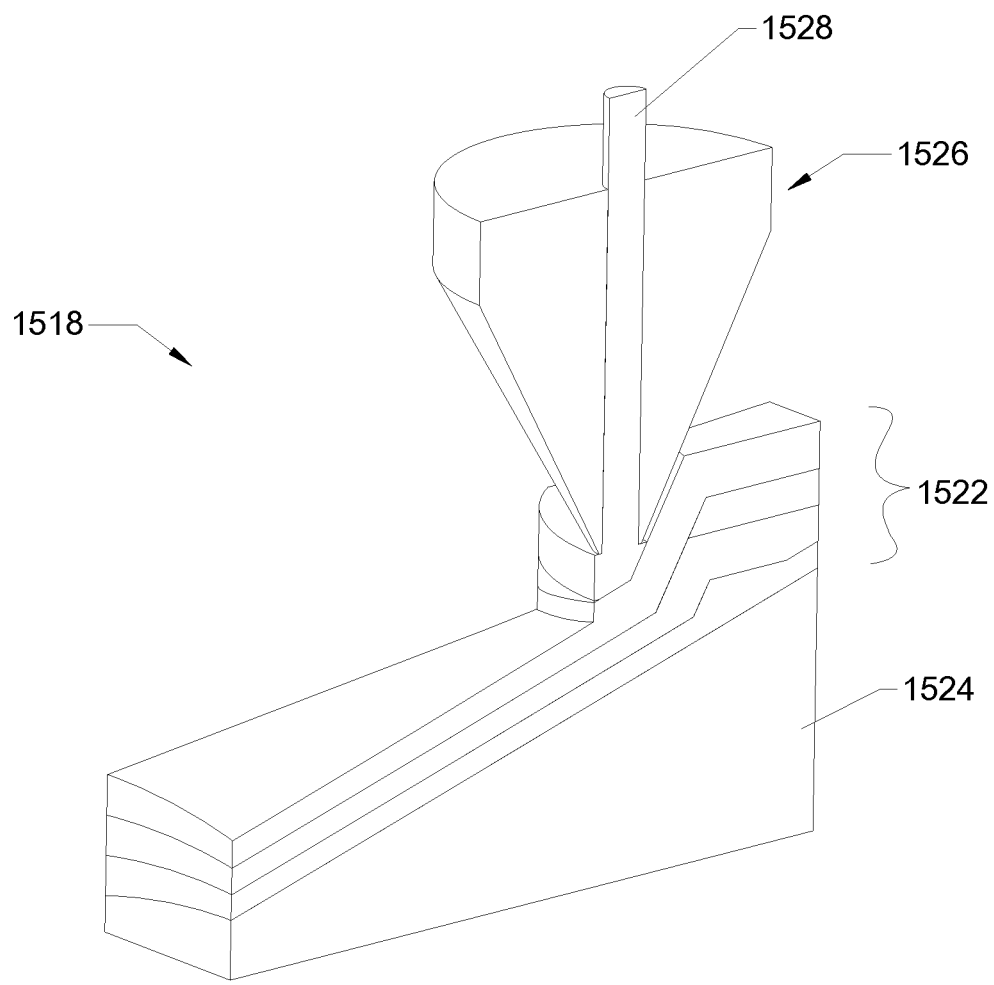
FIG. 15I shows an isometric section view of a part with non-planar layers being fabricated by depositing material from a nozzle.

Referring also to FIG. 15I, an example fabrication of the part 1518 with non-planar layers 1522 includes depositing material 1528 from a nozzle 1526.

Figure 15J:
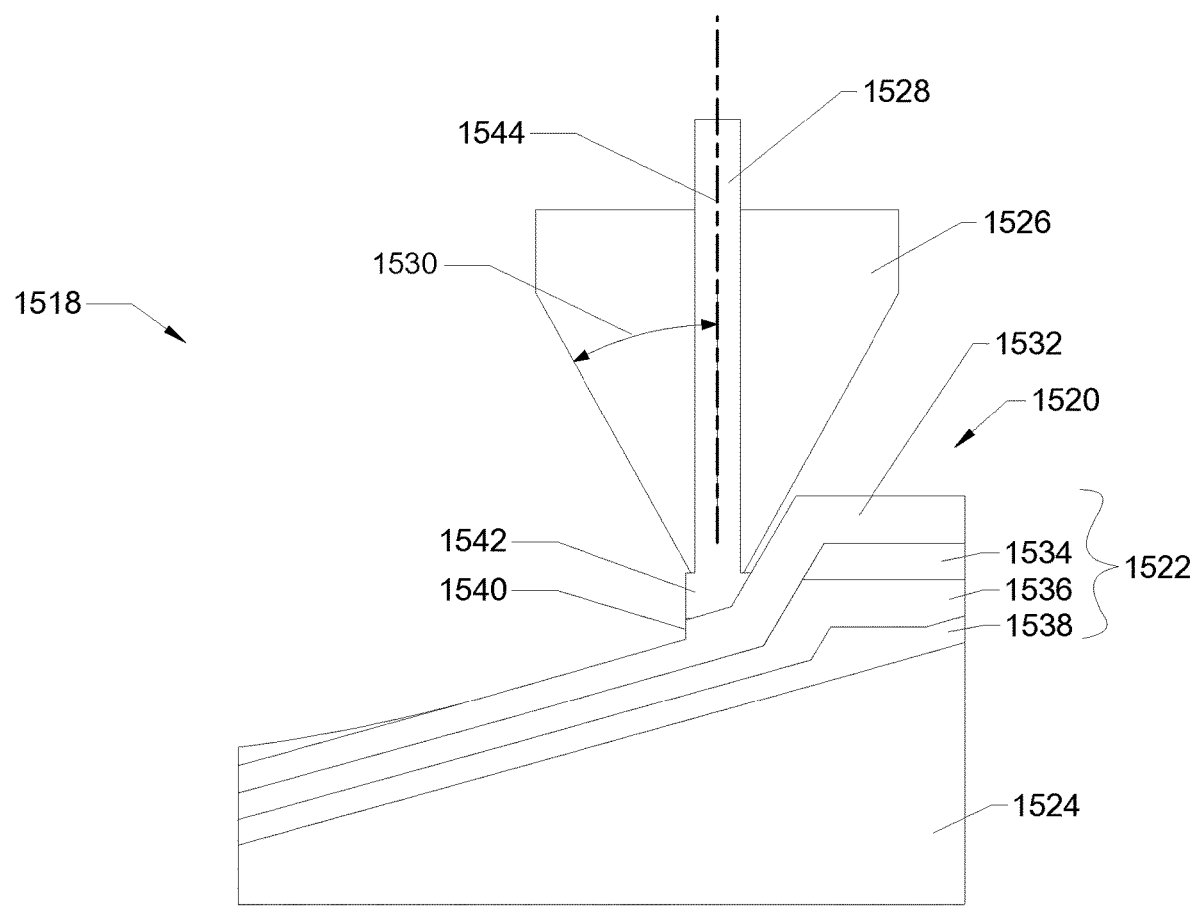
FIG. 15J shows a side view of a part with non-planar layers being fabricated by depositing material from a nozzle.

FIG. 15J shows a side view of part 1518 with non-horizontal and optionally non-planar layers 1522 being fabricated by depositing material 1528 from nozzle 1526. Nozzle 1526 has a side angle 1530 which determines the steepest angles of parts or layers or faces that it may operate immediately adjacent to or deposit material on. In FIG. 15J, a layer 1532 has an angled shape matching or nearly matching angle 1530 so that nozzle 1526 may operate immediately adjacent to it without crashing into it, and further nozzle 1526 may deposit material such as layer 1542 on to it including onto its angled face. Part 1518 and layers 1522 may be constructed with the following algorithm: first an upper spanning layer 1532 is planned which spans the area or horizontal extents of part 1518. Spanning layer 1532 may be non-horizontal or non-planar. A minimum angle from vertical for a layer 1532 is chosen which allows nozzle 1526 to operate immediately adjacent at any location above layer 1532. Layer 1532 is also designed to match the shape of the upper surface of part 1518 as closely as possible while not violating the minimum allowable angle from vertical (or alternately a maximum allowable angle from horizontal).

In some areas, the shape of layer 1532 matches the upper surface of part 1518 perfectly, and in other areas, layer 1532 must lie below the upper surface of part 1518 in order to stay at or above the minimum allowable angle. In areas where it does not match the shape of the upper surface of part 1518, more material layers such as layer 1542 will need to be deposited on top of layer 1532 in order to attain the full shape of part 1518. The thickness of layer 1532 is chosen as follows: a minimum number of spanning layers may be chosen (layers which span the area of part 1518 as projected on a plane perpendicular to an axis 1544 of nozzle 1526 such as layer 1532, layer 1536 and layer 1538), then a maximum layer thickness may be specified, then in a first division operation the local thickness in a direction parallel to axis 1544 of the shape of part 1518 may be divided by the maximum layer thickness. If there is no remainder from the first division operation (i.e., the local thickness of part 1518 is an integer multiple of the maximum layer thickness), then the result of the division operation may be used as the number of layers. If the remainder of the first division operation is non-zero, then the number of layers can be the result of the first division operation plus one or more layers (i.e., at least one extra layer is added so that no layer exceeds the maximum thickness).

The number of layers does not need to be constant across part 1518 (for example across the area of part 1518 as projected on a plane perpendicular to axis 1544). For example, if part 1502 (FIG. 15A) is to be used as a shape on which to base the shape of part 1518, the number of layers across the span of the part shown in FIG. 15A does not need to be constant. After the number of spanning layers and the number of local layers has been determined for all desired locations across part 1518, the specific local thicknesses and orientations of each layer may be planned. The number of upper spanning layers may be decided. In FIG. 15J, there is one upper spanning layer, layer 1532. The number of lower spanning layers may be decided. In FIG. 15J, layer 1536 and layer 1538 are the lower spanning layers (there are two lower spanning layers in this example). The shape of the uppermost spanning layer (in this case layer 1532) may be determined. The shape of the uppermost spanning layer may have an upper boundary which follows the shape of part 1518 wherever feasible and may deviate from the shape of part 1518 in areas where angle 1530 would prevent layer 1532 from being fabricated. Put another way, uppermost layer 1532 follows the shape of part 1532 everywhere except where its slope would be less than angle 1530 from vertical. A lower boundary of layer 1532 may be determined by offsetting inward from the upper boundary of layer 1532 by an amount equal to the desired local layer thickness at each local location. Shape and thickness information for layers may be continuous or it may be represented as data points at discrete locations.

In areas where the shape of part 1518 is less than the slope of angle 1530 from vertical, the upper boundary of uppermost layer 1532 may be shaped so that it is equal to or greater than angle 1530 from vertical so that nozzle 1526 may later traverse adjacent to layer 1532 and deposit additional material in those areas in the form of additional layers such as layer 1542. Layer 1532 may have a ledge 1540 in an area where the local thickness of layer 1532 may be locally increased without inhibiting motion of nozzle 1526 as it may deposit additional subsequent layers such as layer 1542. Once the shape of the uppermost spanning layer is determined, the shapes of any remaining upper spanning layers are determined. The shape of the upper boundary of next inward additional upper spanning layer (if it exists) may be the shape of the lower boundary of the layer lying immediately above (in this case layer 1532). The shape of a lower boundary of a next upper spanning layer may be determined by offsetting downward from the upper boundary of the layer by an amount equal to the local thickness for that layer. The shape of additional upper spanning layers may be similarly determined by offsetting the shape of the layer above downward by the desired local thickness of the layer whose shape is being determined. In this example, there are no additional upper spanning layers. The shape of the lowermost spanning layer 1538 may be determined by matching the lower boundary of the shape of part 1518 and adjusting the upper boundary of layer 1538 according to the determined local thickness for layer 1538. Layer 1538 may have the maximum layer thickness in some locations where that does not cause other layers to fall below a minimum thickness value. The shape of a next lower spanning layer 1536 is determined by using the upper boundary of layer 1538 as a lower boundary of layer 1536. An upper boundary of layer 1536 may be determined by offsetting the lower boundary of layer 1536 by the desired local thickness for layer 1536.

In some cases, the local thicknesses of the spanning layers may be determined. In the example shown in FIG. 15J, upper spanning layer 1532 was chosen to have the maximum layer thickness at all locations where there are locally more total layers than spanning layers.

In some cases internal fill layers may be used in some areas if a solid part is desired. Layer 1534 is an example of an internal fill layer. Layer 1534 may not span the area of part 1518. The thickness of internal fill layers may be determined by a third division operation in which the remaining unfilled thickness between upper spanning layer 1532 and lower spanning layer 1536 is divided by the maximum layer thickness or by a desired layer thickness. If the remainder of the third division operation is zero (i.e., the desired thickness used divides the remaining thickness evenly), then the result of the third division operation may be used as the local number of internal fill layers. If the remainder of the third division operation is not zero, then one or more layers may be added so that no layer exceeds the maximum or desired thickness value. Internal fill layers such as layer 1532 may be formed in any shape including non-flat, non-horizontal or non-planar shapes. Alternatively, they may be formed to be planar. A combination of planar fill layers and non-planar spanning layers may be used to increase part strength and eliminate any planar layer interfaces across any part cross section in any area. Internal fill layers may be added prior to upper spanning layers.

In some cases external fill layers may be used in some areas to achieve external part shapes with an angle less than the nozzle angle as measured from vertical such as angle 1530 of FIG. 15J (or greater than the side angle of the nozzle measured from horizontal). Referring also to FIG. 15H, layers 1550, 1542, 1546 and 1548 are external fill layers that may be added subsequent to upper spanning layers such as upper spanning layer 1532. External fill layers may be non-planar or non-horizontal or they may be horizontal. In this example they are shown to be horizontal and planar except for areas which interface with non-planar spanning layers below them. For example, layer 1550 has a lower boundary that is non-planar and follows the non-planar shape of spanning layer 1532 which lies below it. External fill layers may be added lowest layer first (such as layer 1550 or in some locations 1542), followed by next lowest and so on until an uppermost external fill layer is added, in this case layer 1548. External fill layers may have thickness that varies across the area of each layer.

While FIG. 15J shows layer thicknesses in a single direction, the number of layers and layer thicknesses may vary in any direction across the area of part 1518. In the layer planning method and manufacturing method described above, there may be a minimum thickness, but the layer thickness does not need to be constant across each layer and layers may have differing thicknesses from one another. In a simple case, layers may locally have the same thickness, and thickness may be determined by a second division operation in which the local thickness of part 1518 is divided by the number of layers determined for that location.

All layers including spanning layers, internal fill layers and external fill layers may be fabricated deposition of material. Material may be deposited via a nozzle in a pattern that closely approximates the desired shape of each layer.

Figure 16A:
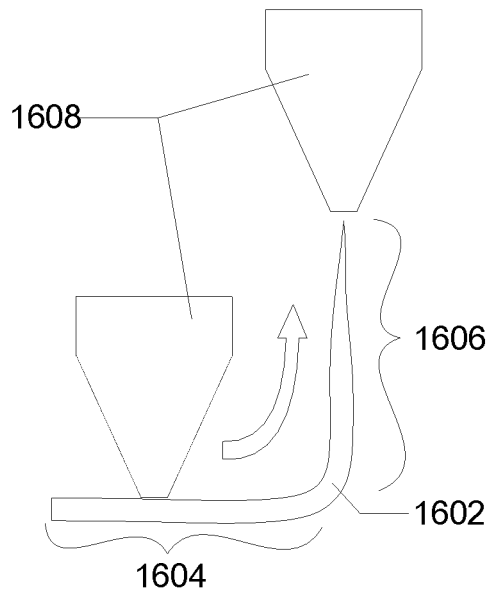
FIGS. 16A-16F show examples of connector members and structures made with connector members according to another implementation of this disclosure.

Referring now to FIG. 16A, a front view of one implementation of a connector member 1602 is shown. The connector member 1602 may have a portion 1604 that matches the shape of a surrounding material layer (not shown) and it may have a portion 1606 which protrudes in a different direction. Portion 1606 may protrude normal to a surrounding material layer, or it may protrude at some other angle. Connector member 1602 may be formed by a material deposition system such as nozzle 1608. The nozzle 1608 may follow a path which causes it to deposit portion 1604 first and thereby adhere portion 1604 to the surrounding material before changing direction of motion and forming portion 1606 which may protrude from surrounding material. A curved arrow is shown to represent the direction and path of motion that nozzle 1608 may follow. Connector member(s) such as 1602 may be used to interconnect or form a mechanical joining of material layers or material structures such as those produced by fused deposition modeling and other forms of 3D printing including material deposition, material solidification, SLA, SLS, DMLS, and material jet techniques such as Objet.

Figure 16B:
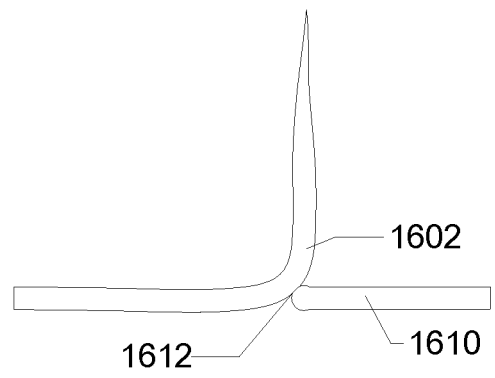

Referring also to FIG. 16B, the connector member 1602 with an optional auxiliary member 1610 is shown. Member 1610 may match the shape of a surrounding material layer and may be joined to member 1602 at a material junction 1612. Member 1610 may be formed or deposited prior to the forming of member 1602 so that as member 1602 is formed, it may be formed so that it touches member 1610 at junction 1612. Members 1602 and 1610 may be formed of polymer materials, and they may be hot when deposited (above a glass transition temperature or above a liquidus temperature) so that member 1602 may adhere to member 1610 at junction 1612. Members may also be formed of other materials such as wax, metal, carbon fiber composites, fiberglass composites, thermoset resins, wood composites, ceramic composites, or combinations thereof.

Figure 16C:
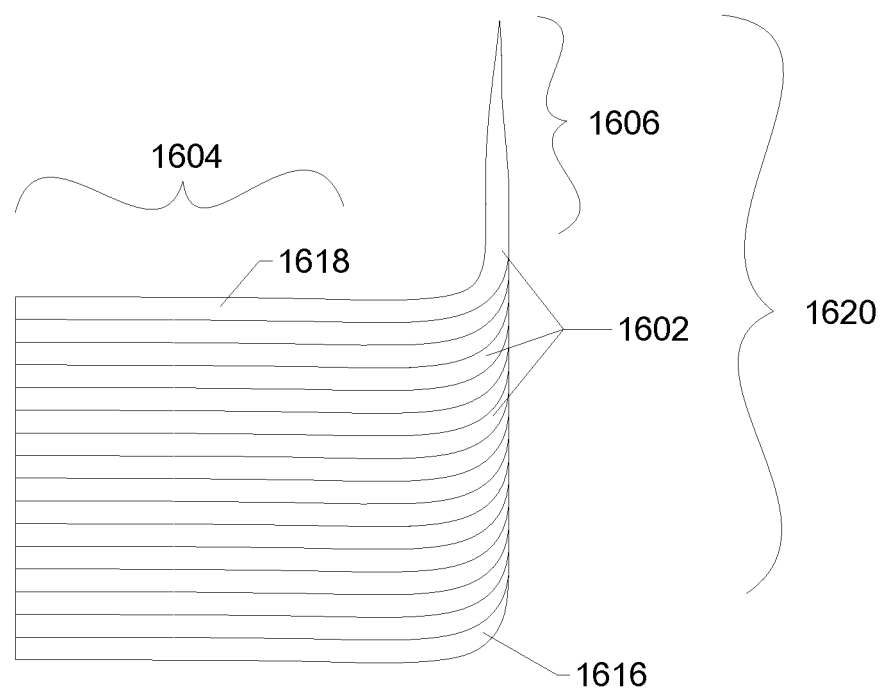

FIG. 16C shows a structure 1614 having multiple connector members 1602. Members 1602 may be formed sequentially starting with a lowest member 1616 and ending with an uppermost member 1618. Members 1602 may form a bond or adhesion at common boundaries between them when a member 1602 is formed on top of another member 1602. Each member 1602 may have a protruding region 1606. As the protruding region 1606 of each member 1602 is formed, the region 1606 may bond to or be mixed with or be interlinked with the region 1606 of the member 1602 that it is being formed on top of (i.e., the "prior member"). The protruding region 1606 of the prior member may be somewhat deformed by the nozzle 1608 as the next protruding region 1606 is being formed. Such deformation may be tolerable as long as regions 1606 become bonded, welded, or interlinked. The net result of combining multiple members 1602 and protruding regions 1606 may be that a region of continuous transverse bonding 1620 may be formed which may have a direction of structural integrity which is different than or orthogonal to the predominant material deposition direction of material regions 1604 and therefore be in a direction different than or orthogonal to the predominant material direction of members 1602 and structure 1614. In this way, the structure 1614 can be created which has strength across layers and has strength not only in a predominant material direction or plane, but also has strength in a direction transverse to the predominant material direction or plane.

Figure 16D:
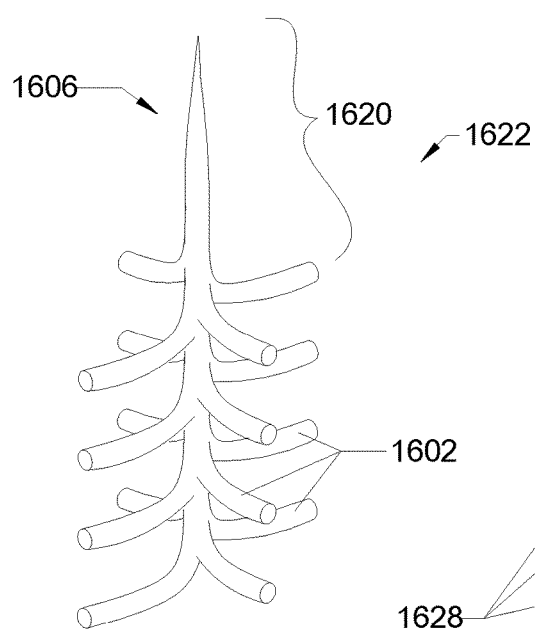

FIG. 16D shows another implementation of a transverse connected structure 1622 having connector members 1602. This structure is similar to structure 1614 of FIG. 16C except that in structure 1622, members 1602 have varying orientations. Protruding regions 1606 of members 1602 may be bonded, welded, or interlinked to form a region of transverse bonding 1620 as part of structure 1622, similar to region 1620 of structure 1614. Structure 1622 may be used alone or may be part of a larger or more solidly packed structure and may serve to provide strength transverse to a predominate material or structure direction or plane.

Figure 16E:
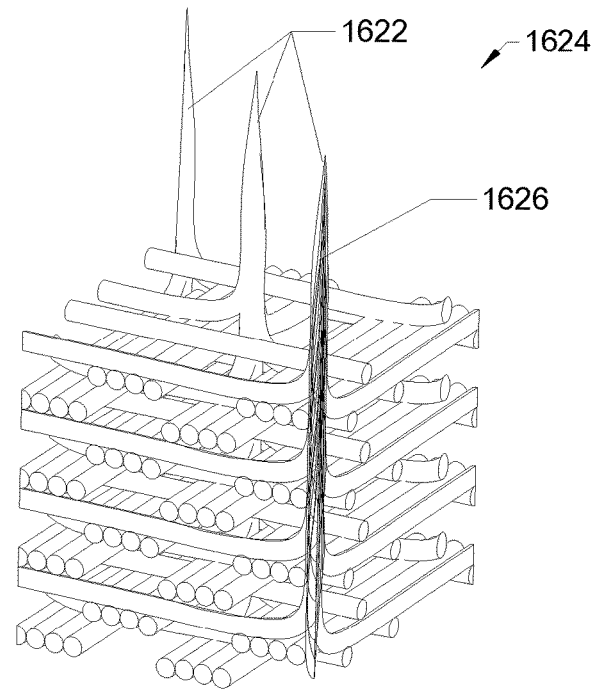

FIG. 16E shows a structure 1624 which incorporates many connector members 1602 and multiple transverse connected structures 1622. One structure 1622 is shown in cross section so the bonding or interlinking of the material of the multiple members 1602 is visible in an interlinking region 1626. Structure 1624 is shown partially populated with members 1628 which include the members 1602 which make up structures 1622. Members 1628 may also include additional members which are horizontal or other members which are not horizontal but do not have transverse regions like members 1602. While structure 1624 is shown sparsely populated for clarity in FIG. 16E, it is also possible to construct similar structures that are more solid, that is where all available spaces are occupied by members so that the structure behaves similarly to a solid or semi-solid material. The incorporation of transverse connected structures within structure 1624 can create transverse strength so that structure 1624 may have greater strength in a transverse direction than typical FDM structures which do not incorporate transverse connected structures. All members may have some degree of bonding, welding, or interlinking where they cross other members. Members may be of the same material or they may be of different materials so that different bulk properties may be created in different areas or in different directions. While transverse connected structures 1622 are shown protruding through the top of structure 1624 in FIG. 16E, the protruding elements of structures 1622 may be terminated at any desired level and smooth material or members or layers may be deposited over the top of structures 1622 which may enable structures similar to 1624 to have smooth or uniform surfaces.

Figure 16F:
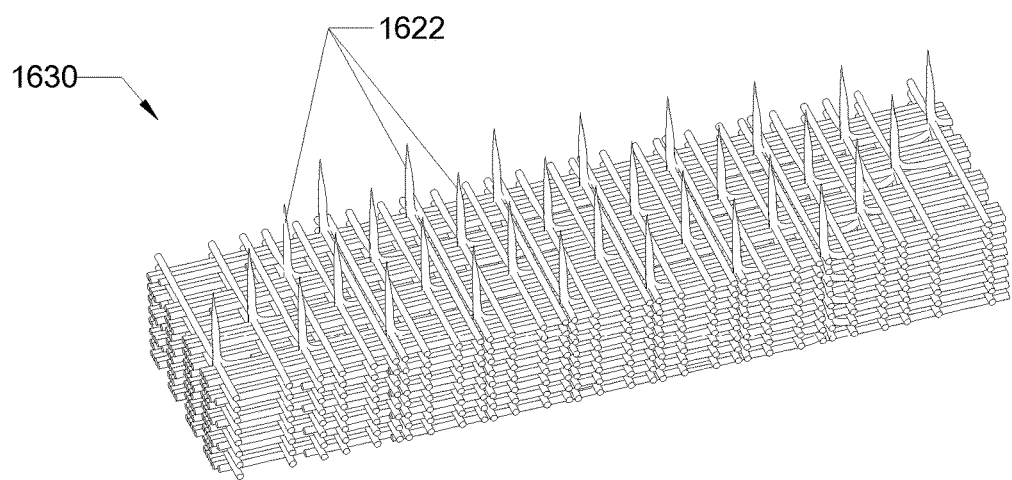

FIG. 16F shows a larger structure 1630 which incorporates multiple transverse connected structures 1622 and connector members 1602 (see FIGS. 16A-D). Structure 1630 is similar to structure 1624, but shows how a larger structure can be constructed that incorporates transverse connected structures 1622 based on similar principles.

Figure 16G:
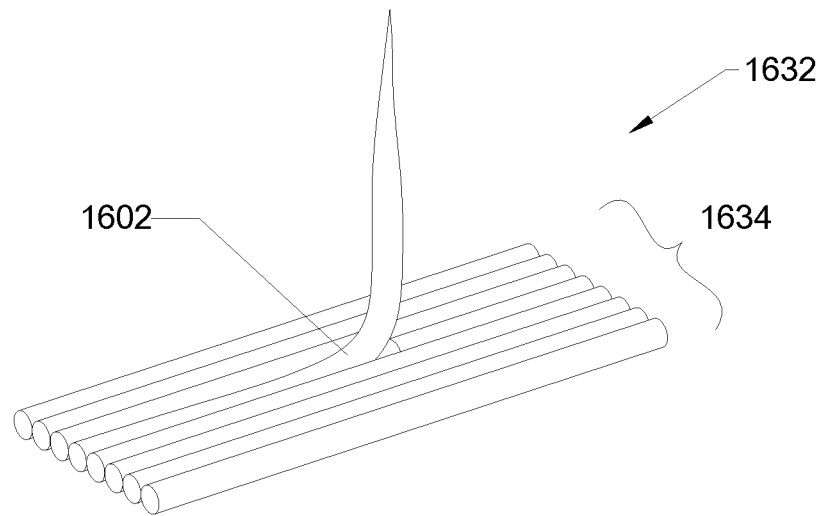
FIGS. 16G-L show an example inter-layer connection process.

FIG. 16G shows a structure 1632 having a connector member 1602. Structure 1632 has one layer of members 1634 which are aligned in a predominant direction. Connector member 1602 forms part of layer 1634 and may be bonded, welded, or interlinked with adjacent members as adjacent members are formed.

Figure 16H:
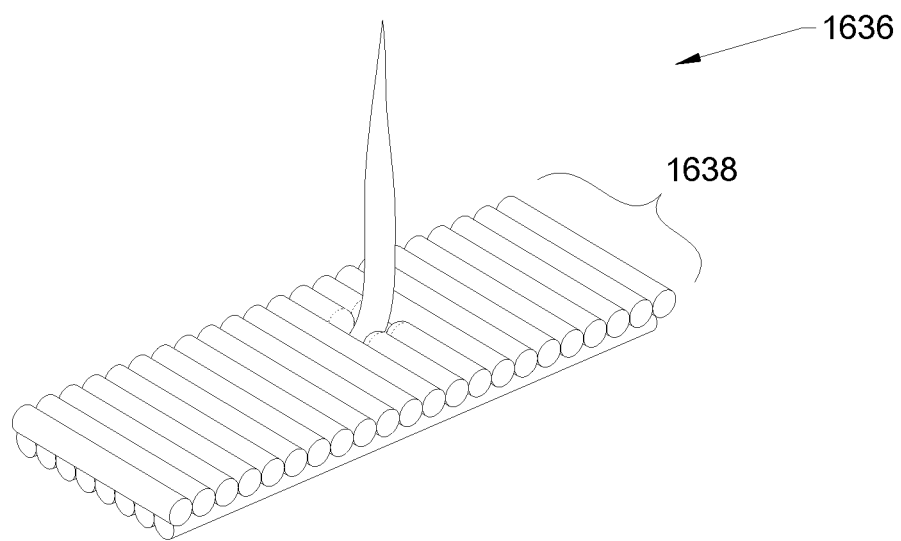

FIG. 16H shows a structure 1636 having a connector member 1602. Structure 1636 is the same as structure 1634 but further includes a second layer of members 1638. The members of layer 1638 may be oriented in a direction different than or orthogonal to those of layer 1634. Members of layer 1638 may bond to members of layer 1634, but nominal inter-layer strength may not be as high as desired due to the nature of the bond.

Figure 16I:
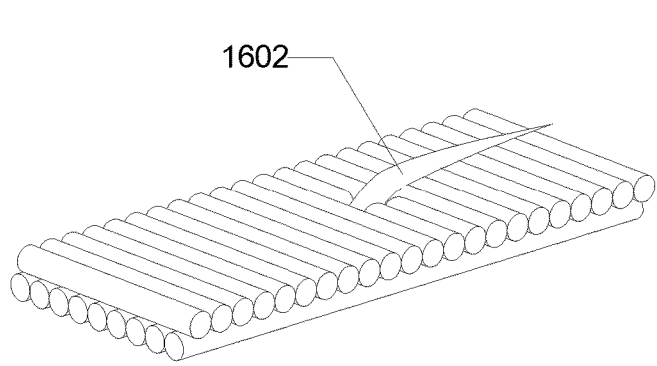
Figure 16J:
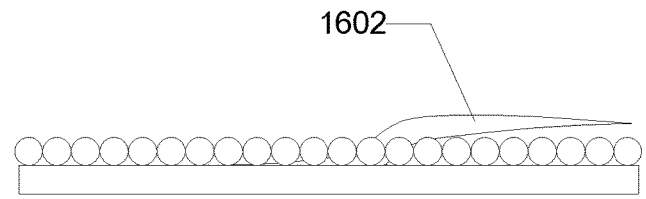

Referring further to FIGS. 16I and 16J, the structure 1636 is shown with the connector member 1602 reformed and bent over. Member 1602 may be reformed and bent over by a material deposition nozzle, for example.

Figure 16K:
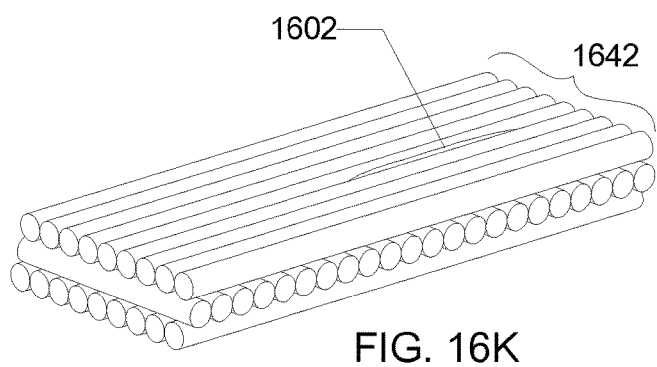
Figure 16L:
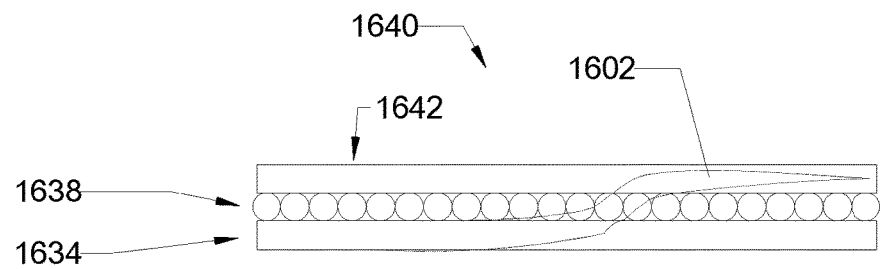

Referring further to FIGS. 16K and 16L, a structure 1640 includes the structure 1636 but adds a third layer of members 1642 on top of the second layer of members 1638. As members of layer 1642 are formed, they may bond, weld, or interlink with the bent portion of member 1602. The member 1602 may become effectively fused with layer 1642 as a result. That is, the connector member 1602 may become a continuous material connection between member layers 1634, 1638, and 1642. This type of inter-layer connection can add trans-layer strength to structures such as structure 1640 which may be lacking in layered structures typically created by conventional FDM processes. FIG. 16L shows a front view of the structure 1640. The deformed connector member 1602 is shown in dashed lines so that its shape and connection with layers 1634, 1638, and 1642 is more clearly visible.

Figure 17A:
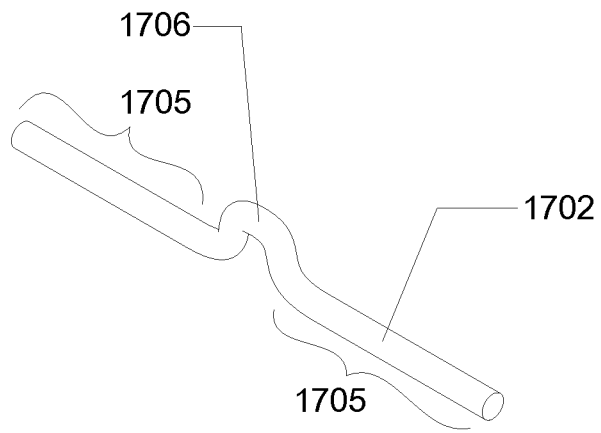
FIGS. 17A-D show an example inter-linking process.

Referring now to FIG. 17A, one implementation of a connector member 1702 is shown. The connector member 1702 may have regions 1704 which match the shape of surrounding material (not shown). Regions 1704 may be planar or horizontal, or they may follow a non-planar shape. Surrounding material (not shown) may be in the form of planar or non-planar layers and regions 1704 may make up part of the shape of the planar or non-planar layers. Connector member 1702 may have a protruding region 1706 which may protrude from or differ from the shape of any surrounding material or from the shape of regions 1704. The protruding region 1706 may protrude in an upward direction, a downward direction, or in a direction transverse to a predominant shape of regions 1704. Protruding region 1706 may be used to interlink connector member 1702 with other members, layers or regions in a structure (not shown in this figure).

Figure 17B:
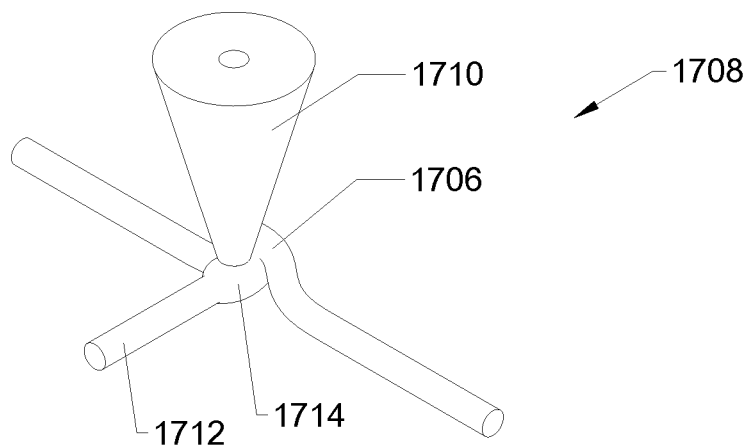

FIG. 17B shows a structure 1708, which includes the connector member 1702. A material deposition nozzle 1710 is shown depositing material to create an interlinking member 1712. Interlinking member 1712 may be formed by material deposition nozzle 1710 with material being deposited at a typical rate until nozzle 1710 comes close to member 1702 and protruding region 1706, at which time nozzle 1710 may deposit additional material to form an enlarged region 1714. By depositing additional material in proximity to protruding region 1706, enlarged region 1714 may grow and increase in size until it flows underneath protruding region 1706. Enlarged region 1714 may also bond, weld, fuse, or interlink with material from member 1702 and the protruding region 1706.

Figure 17C:
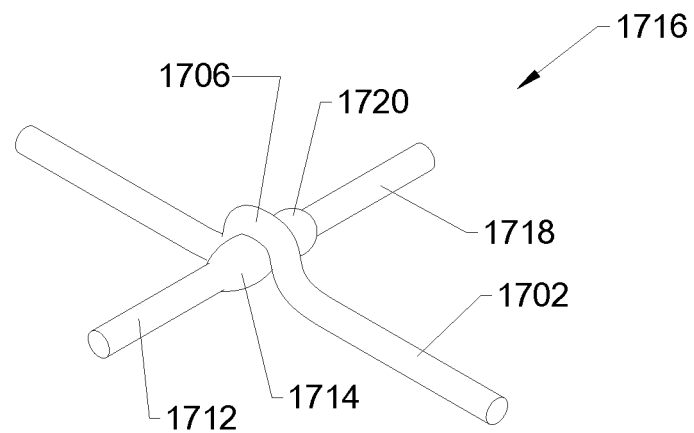

Referring further to FIG. 17C, a structure 1716 adds an additional interlinking member 1718 to the structure 1708. Interlinking member 1718 may be formed in the same manner as interlinking member 1712. Interlinking member 1718 may have an enlarged region 1720. When the enlarged region 1720 is formed, it may flow under protruding region 1706 of connector member 1702. The material of enlarged region 1720 may bond, fuse, weld, or interlink with material from enlarged region 1714 of interlinking member 1712 and with protruding region 1706 of connector member 1702. While additional members are not shown in this figure for clarity, in practice, interlinking members 1712 and 1718 may be formed on a layer in a different plane than connector member 1702. The fabrication of structure 1716 therefore represents a method of creating a strong bond, weld, interconnection, or interlinking of members and material layers on different planes that is stronger than typical weak inter-layer bonds created in structures made via conventional FDM techniques. Non-planar material members or layers may be similarly interlinked with connector members and interlinking members or combinations thereof creating structural links between adjacent non-planar layers.

Figure 17D:
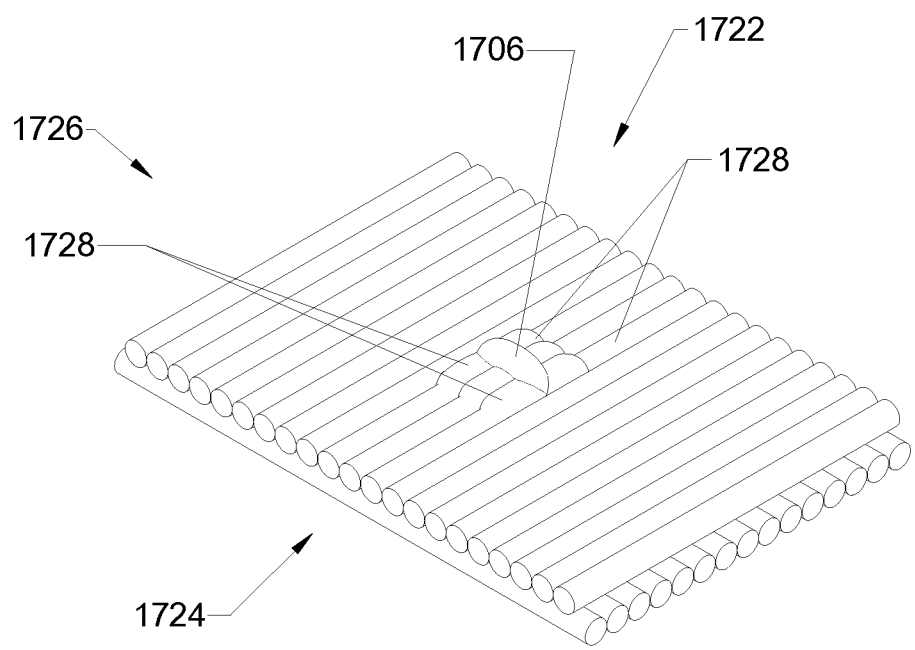

FIG. 17D shows a structure 1722, which includes the structure 1716 but adds additional members that make up a lower layer 1724 and an upper layer 1726. Upper layer 1726 includes additional interlinking members 1728 which have been formed so that they bond or fuse with protruding region 1706. Structure 1722 represents a structure in which material members or layers on different planes may be structurally interlinked in a way that is stronger than typical weak inter-layer bonds created by conventional FDM techniques.

Figure 18A:
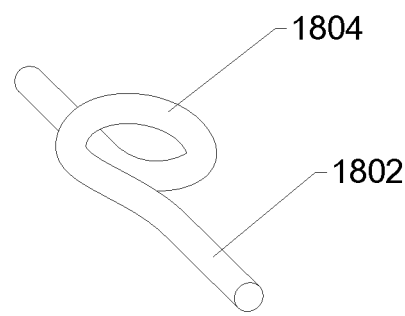
FIGS. 18A-D show another example inter-linking process.

FIG. 18A shows another implementation in the form of a connector member 1802. Connector member 1802 includes a protruding loop 1804. The protruding loop 1804 may protrude out of the plane of a surrounding material layer (not shown). Protruding loop may protrude upward or downward or in a direction transverse to connector member 1802.

Figure 18B:
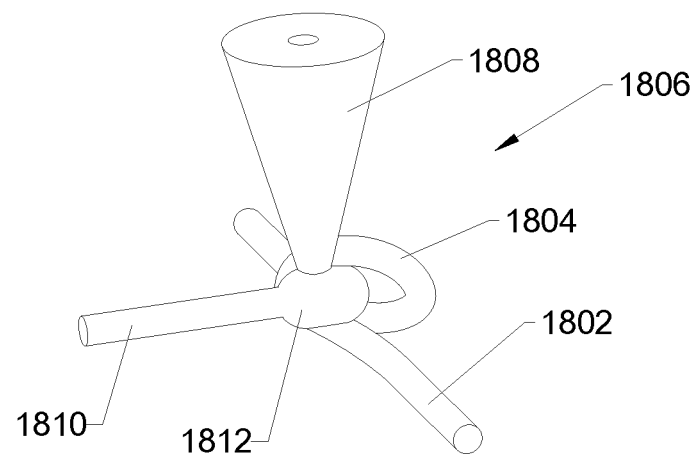

FIG. 18B shows an isometric view of a structure 1806, which includes the connector member 1802. A material deposition nozzle 1808 is shown depositing material to form an interlinking member 1810. The nozzle 1808 may deposit additional material in proximity to protruding region 1804 of connector member 1802 to form an enlarged region 1812. The material of enlarged region 1812 may bond, weld, fuse, or interlink with the protruding region 1804 and the member 1802. The member 1810 may lie in a different plane than the member 1802 if the members are planar. If members 1802 and 1810 are non-planar, they may lie adjacent to each another.

Figure 18C:
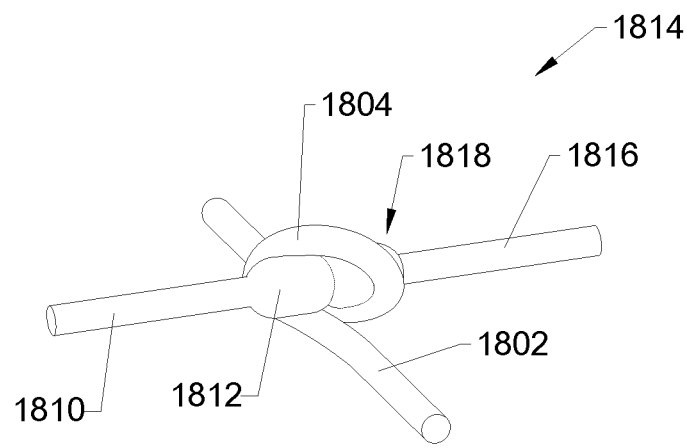

FIG. 18C shows a structure 1814, which the structure 1806 of FIG. 18B but adds an additional interlinking member 1816. The interlinking member 1816 may have an enlarged region 1818, similar to the enlarged region 1812 of interlinking member 1810. The material of enlarged region 1818 may form a bond, weld, fusion, or interlinking with adjacent material of other members including interlinking member 1810 and protruding loop 1804 of connector member 1802.

Figure 18D:
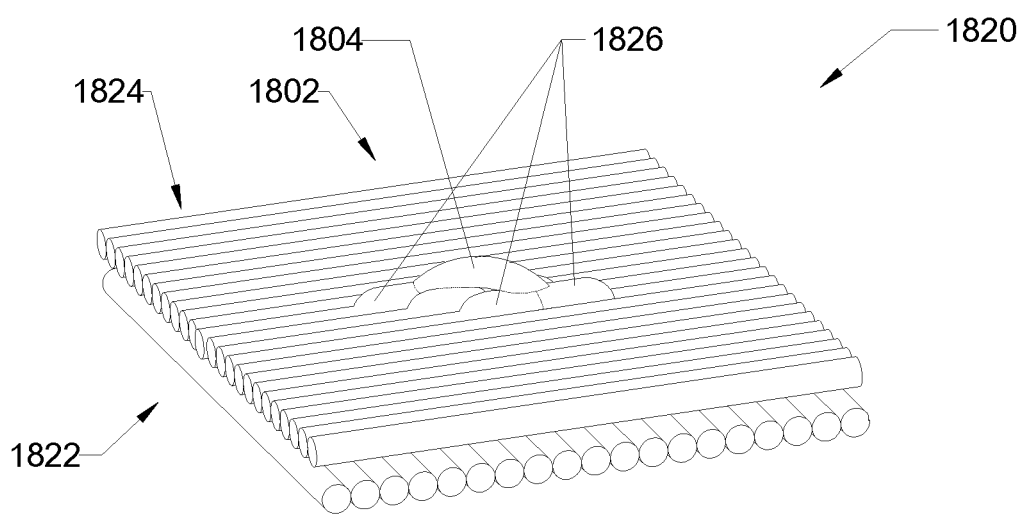

FIG. 18d shows a structure 1820, which includes the structure 1814 but adds additional members that have been formed to create a lower layer 1822 and an upper layer 1824. To create structure 1820, it may be necessary to form all members of lower layer 1822 before forming members of upper layer 1824. Additional interlinking members 1826 have been added as part of upper layer 1824. Interlinking members 1826 may bond, weld, fuse, or interlink with protruding loop 1804 and connector member 1802 as well as other adjacent members. Structure 1820 illustrates how a structure may be created that has structural interlinking between layers that is stronger than the typically weak inter-layer bonds that are formed in structures made via conventional FDM processes.

Figure 19A:
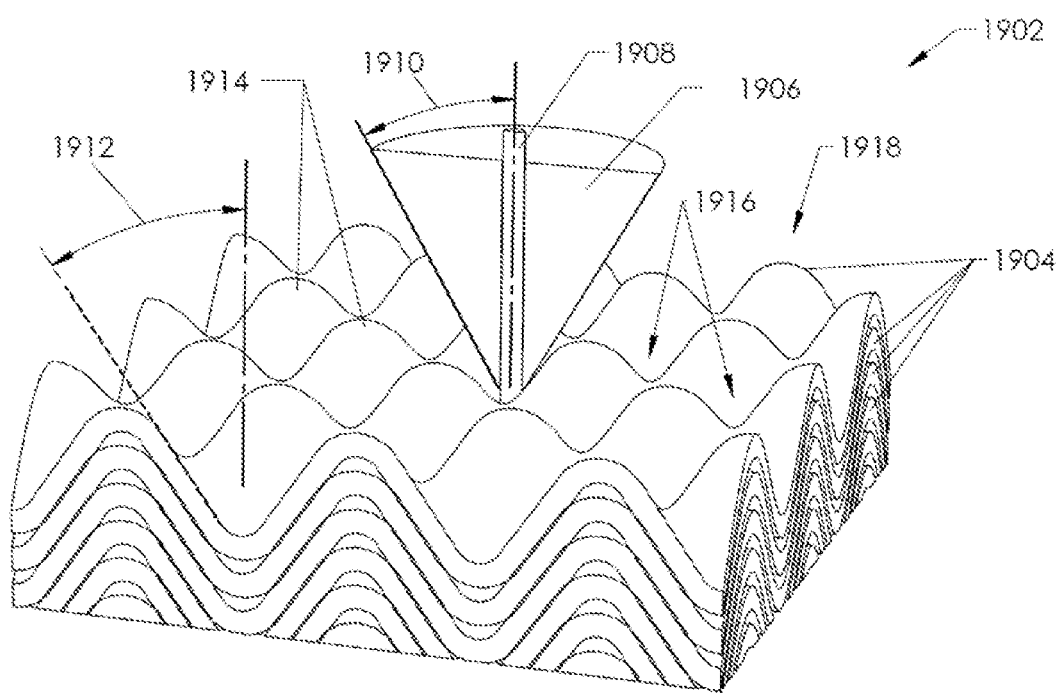
FIGS. 19A and 19B show isometric views of an example structure and method for forming parts by material deposition according to one implementation.

Referring now to FIG. 19A, a partially completed structure 1902 that is being formed by a material deposition system 1906 is shown. The structure 1902 may include non-planar material layers 1904. The material deposition system 1906, cross sectioned for clarity, is shown depositing material 1908 onto structure 1902. The material deposition system 1906 may be a nozzle. The material deposition system 1906 may have a side angle 1910, which is shown here measured with respect to vertical. Structure 1902 and layers 1904 are shown having an "egg-crate"-like form with protrusions 1914 and valleys 1916. The form of protrusions 1914 and valleys 1916 may have a limit angle 1912 which may be the minimum allowed angle as measured from vertical. Angle 1912 may be a determining factor of the form of layers 1904, protrusions 1914, and valleys 1916. Angle 1912 may be chosen to be as small as possible while not being less than angle 1910, or it may be chosen to be angle 1910 plus an incremental safety factor. By choosing angle 1912 to not be less than angle 1910, material deposition system 1906 mal be able to access an entire working upper surface 1918 of structure 1902. Working upper surface 1918 may be the exposed upper surface of whatever layer 1904 or combination of layers 1904 are exposed at a given time during the fabrication process of structure 1902. By choosing a form for layers 1904 with protrusions 1914 and valleys 1916 and angle 1912 as small as possible, bondable surface area of layers 1904 may be at or near a maximum achievable bondable surface area while still being accessible and fabricatable by material deposition system 1906. Additionally, a form as described with minimum angles 1912 may have no planes of cleavage between layers 1904. Both maximized bondable area between layers and elimination of cleavage planes between layers may allow structure 1902 to have higher inter-layer strength and greater resistance to delamination and improved structural properties as compared to structures fabricated via conventional material deposition techniques such as FDM with planar, horizontal layers.

Figure 19B:
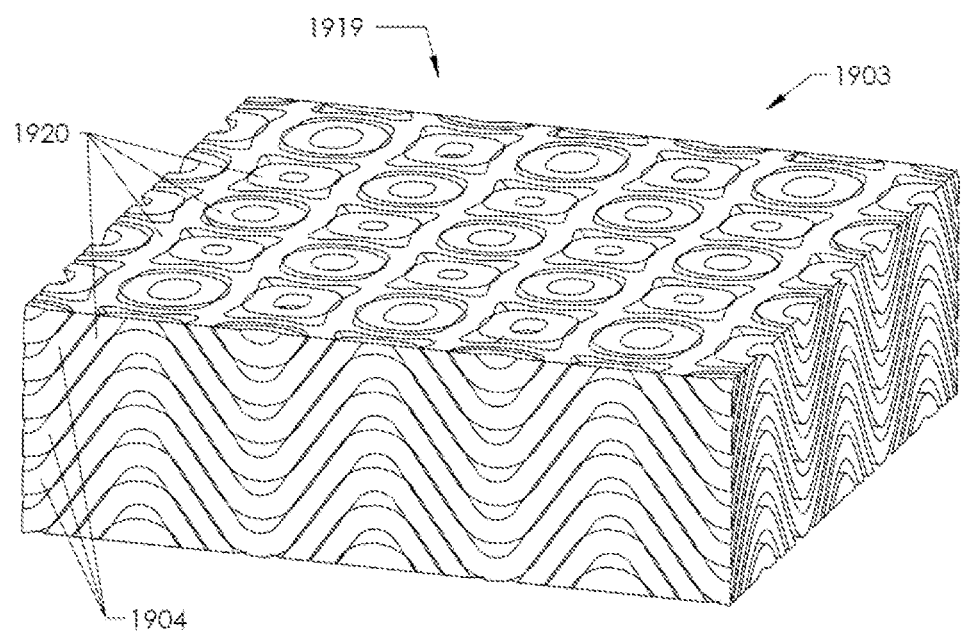

FIG. 19B shows a structure 1903, which adds additional layers 1904 to the structure 1902 including partial layers 1920 which may combine to form a flat upper surface 1919, which may alternatively take any desired shape. Structure 1903 depicts how non-planar layers 1904 plus partial layers 1920 can be used to form a structure with planar faces, non-planar faces, or any desired shape. Desired shapes with areas with slope angles less than angle 1910 of FIG. 19A may be formed with a combination of non-planar layers such as layers 1904 plus external planar layers as shown in FIGS. 15A-15J.

Figure 19C:
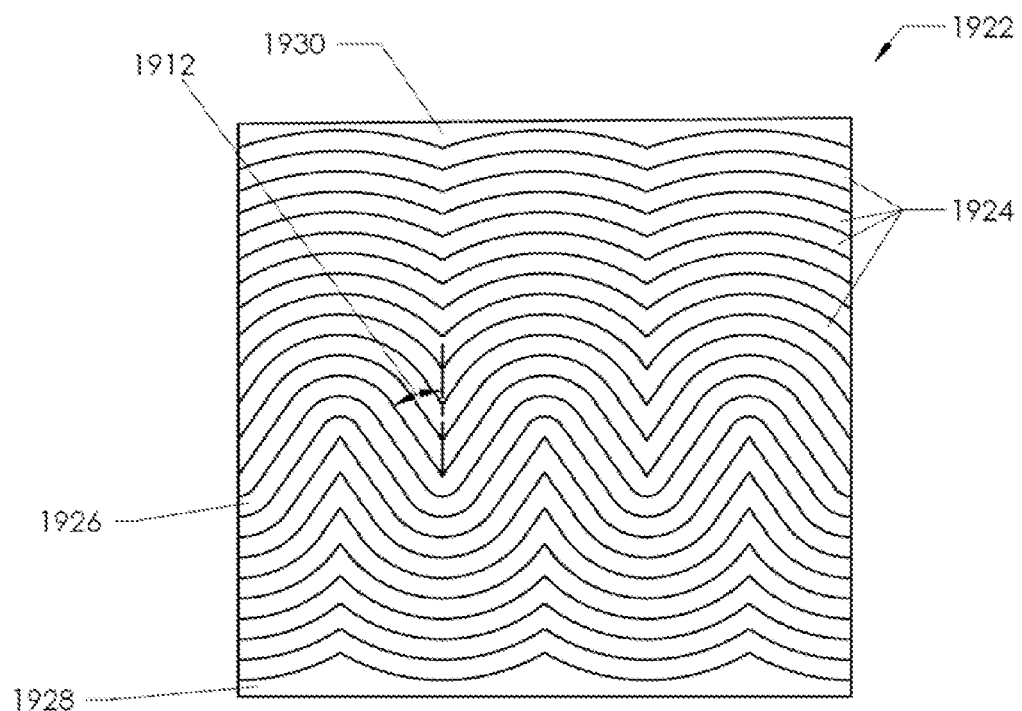
FIG. 19C shows a front view of another example structure formed by material deposition according this implementation.

FIG. 19C shows a front view of a structure 1922 having layers 1924. Structure 1922 is similar to structure 1903 of FIG. 19B except that layers 1924 have shapes chosen such that each layer 1924 has a constant thickness. A limiting layer 1926 may be included which has a shape designed according to minimal angle 1912 as in FIG. 19A. To keep layer thickness constant, the shapes of other layers 1924 are offset shapes from layer 1926 and therefore may have angles greater than angle 1912 over a larger portion of their extents. An optional bottom layer 1928 and an optional top layer 1930 are shown that have non-constant thickness. Layers 1928 and 1930 may be used to create smooth or planar or non-planar top and bottom surfaces.

Figure 19D:
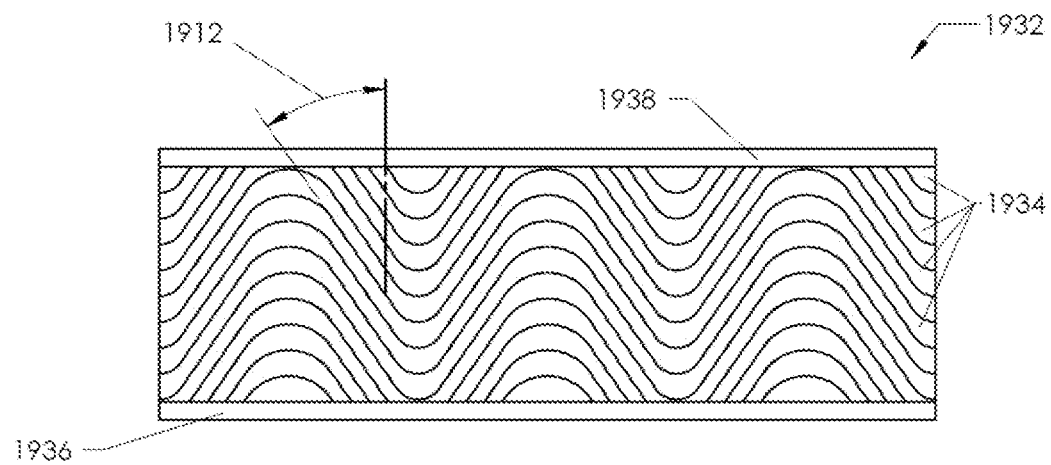
FIG. 19D shows a front view of yet another example structure formed by material deposition according to this implementation.

FIG. 19D shows a front view of a structure 1932 with layers 1934. Structure 1932 is similar to structure 1903 of FIG. 19B except that layers 1934 have shapes chosen such that the shape of each layer may be the same (except where they are incomplete to allow for top and bottom structure surfaces). Layers 1934 may have varying thickness in order to achieve the same shape for each layer 1934. Using layer shapes that are the same and are "stackable" may allow for smaller angles 1912 over greater extents of structure 1932 which may allow for bondable surface area to be maximized and may allow for the greatest deviation from planar layer shapes which may increase structure strength. Structure 1932 includes an optional bottom layer 1936 and an optional top layer 1938. Layer 1936 and 1938 may be planar layers and may have constant thickness and may serve to create smooth or aesthetic top and bottom surfaces.

Implementations of the subject matter described in this specification can be implemented in combination with digital electronic circuitry, or computer software, firmware, or hardware. Implementations of the subject matter described in this specification can be implemented in an additive manufacturing system that uses one or more modules of computer program instructions encoded on a computer-readable medium for execution by, or to control the operation of, data processing apparatus. The computer-readable medium can be a manufactured product, such as hard drive in a computer system or an optical disc sold through retail channels, or an embedded system. The computer-readable medium can be acquired separately and later encoded with the one or more modules of computer program instructions, such as by delivery of the one or more modules of computer program instructions over a wired or wireless network. The computer-readable medium can be a machine-readable storage device, a machine-readable storage substrate, a memory device, or a combination of one or more of them.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, a runtime environment, or a combination of one or more of them. In addition, the apparatus can employ various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented using a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations of the subject matter described in this specification can be implemented using a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described is this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other.

While this specification contains many implementation details, these should not be construed as limitations on the scope of the invention or of what may be claimed, but rather as descriptions of features specific to particular implementations of the invention. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the invention have been described. Other implementations are within the scope of the following claims.

What is claimed is:

1. A non-transitory computer-readable medium storing software comprising instructions executable by one or more computers, which, upon such execution, cause the one or more computers to perform operations for controlling a 3D printer, the 3D printer comprising an extruder for one or more deposition materials, the extruder comprising at least one nozzle having a nozzle tip that includes an exit orifice, the tip having a width that is equal to or larger than a width of the exit orifice, the operations comprising:
   calculating a correction factor based on a first path of the nozzle according to a slope of a surface of an object to be fabricated, wherein the correction factor for a positive slope is different from the correction factor for a negative slope, and the correction factor adjusts a distance between the nozzle and the surface of the object;
   calculating a second path by applying the correction factor to the first path to thereby adjust a vertical position of the nozzle relative to the first path by an amount dependent on the slope of the surface; and
   causing movement of the nozzle along the second path to deposit a material on the slope of the surface of the object, wherein the correction factor removes differences in thickness of the deposited material caused by the slope.

2. The non-transitory computer-readable medium of claim 1, wherein applying the correction factor comprises:
   based on the slope being negative, applying the correction factor that causes the nozzle to become farther from the surface of the object;
   based on the slope being positive, applying the correction factor that causes the nozzle to become closer to the surface of the object; and
   applying the correction factor based on the correction factor having been calculated for all path points along the first path.

3. The non-transitory computer-readable medium of claim 1, wherein based on the slope being negative, applying the correction factor moves the nozzle vertically upward by an amount equal to a half width of the nozzle tip multiplied by the absolute value of the slope.

4. The non-transitory computer-readable medium of claim 1, wherein based on the slope being positive, applying the correction factor moves the nozzle vertically downward by an amount equal to a half width of the exit orifice multiplied by the absolute value of the slope.

5. The non-transitory computer-readable medium of claim 1, wherein causing movement of the nozzle along the second path includes:
   forming at least a portion of a first layer of the object to be fabricated, the first layer defining a first gap; and
   forming a second and a third layer above the first layer, the second layer defining a second gap that overlaps with the first gap, the third layer including a protruded portion that at least partially fills the first and second gaps to thereby interlock the first, second, and third layers.

6. The non-transitory computer-readable medium of claim 1, wherein causing movement of the nozzle along the second path includes forming at least a portion of a first layer of the object to be fabricated and forming a second layer after the first layer, a portion of the first layer being extended vertically upward past the second layer.

7. The non-transitory computer-readable medium of claim 6, wherein causing movement of the nozzle along the second path includes connecting the vertically extended portion of the first layer with a vertically extended portion of the second layer.

8. The non-transitory computer-readable medium of claim 6, the operations further comprising causing the nozzle to bend the vertically extended portion of the first layer on top of the second layer with the nozzle.

9. The non-transitory computer-readable medium of claim 8, wherein causing movement of the nozzle along the second path includes forming a third layer on top of second layer and the bent portion of the first layer.

10. The non-transitory computer-readable medium of claim 8, the operations further comprising causing the nozzle to push and bend the vertically extended portion of the first layer with the nozzle.

11. The non-transitory computer-readable medium of claim 1, wherein causing movement of the nozzle along the second path includes forming at least a portion of a non-horizontal layer of the object to be fabricated on a separate core.

12. The non-transitory computer-readable medium of claim 1, wherein causing movement of the nozzle along the second path includes forming at least a portion of a non-planar layer of the object to be fabricated, further comprising dynamically adjusting a flow rate of deposition material while creating the non-planar layer to thereby vary a thickness of the non-planar layer.

13. The non-transitory computer-readable medium of claim 1, wherein causing movement of the nozzle along the second path includes forming one or more horizontal layers, and then forming one or more non-horizontal layers on the one or more horizontal layers.

14. The non-transitory computer-readable medium of claim 13, wherein forming the one or more non-horizontal layers includes forming a non-horizontal layer that crosses and adheres to adjacent horizontal layers.

15. The non-transitory computer-readable medium of claim 13, wherein forming the one or more non-horizontal layers includes moving the nozzle along three axes.

16. The non-transitory computer-readable medium of claim 1, wherein causing movement of the nozzle along the second path includes forming an angled surface whose angle matches a side angle of the nozzle, and then forming one or more layers on the angled surface.

17. A computer-implemented method performed using an extruder of a 3D printer, the extruder comprising at least one nozzle having a nozzle tip that includes an exit orifice and has a width that is equal to or larger than a width of the exit orifice, the computer-implemented method comprising:
   calculating a correction factor based on a first path of the nozzle according to a slope of a surface of an object to be fabricated, wherein the correction factor for a positive slope is different from the correction factor for a negative slope, and the correction factor adjusts a distance between the nozzle and the surface of the object;
   calculating a second path by applying the correction factor to the first path to thereby adjust a vertical position of the nozzle relative to the first path by an amount dependent on the slope of the surface; and
   causing movement of the nozzle along the second path to deposit a material on the slope of the surface of the object, wherein the correction factor removes differences in thickness of the deposited material caused by the slope.

18. The computer-implemented method of claim 17, wherein applying the correction factor comprises:

based on the slope being negative, applying the correction factor that causes the nozzle to become farther from the surface of the object;
based on the slope being positive, applying the correction factor that causes the nozzle to become closer to the surface of the object; and
applying the correction factor based on the correction factor having been calculated for all path points along the first path.

\* \* \* \* \*